United States Patent [19]
Murakami et al.

[11] Patent Number: 5,539,843
[45] Date of Patent: Jul. 23, 1996

[54] IMAGE PROCESSING SYSTEM

[75] Inventors: Tatsuya Murakami, Tachikawa; Masaaki Fujinawa, Tokyo; Hiromichi Fujisawa, Tokorozawa; Hidefumi Masuzaki, Odawara; Yasuo Kurosu, Yokohama, all of Japan

[73] Assignee: Hitachi, Ltd., Tokyo, Japan

[21] Appl. No.: 832,700

[22] Filed: Feb. 7, 1992

Related U.S. Application Data

[62] Division of Ser. No. 272,447, Nov. 17, 1988, Pat. No. 5,125,045.

[30] Foreign Application Priority Data

Nov. 20, 1987 [JP] Japan .................. 62-292026
Sep. 28, 1988 [JP] Japan .................. 63-240973

[51] Int. Cl.$^6$ .................. G06K 9/38; H04N 1/40
[52] U.S. Cl. .................. 382/270; 382/173; 382/237; 382/304; 358/456; 358/457
[58] Field of Search .................. 382/50, 47, 9, 382/173, 270, 304, 237; 358/433, 456, 457

[56] References Cited

U.S. PATENT DOCUMENTS 4,742,556  5/1988  Davis, Jr. et al. .................. 382/50
4,760,463  7/1988  Nonoyama et al. .................. 358/453
4,829,587  5/1989  Glazer et al. .................. 382/50

FOREIGN PATENT DOCUMENTS 62-107573  5/1987  Japan .................. H04N 1/40

Primary Examiner—Jose L. Couso
Assistant Examiner—Matthew C. Bella
Attorney, Agent, or Firm—Antonelli, Terry, Stout & Kraus

[57] ABSTRACT

An image processing system wherein for an inputted composite image composed of a line image and a dither image, both a line image processing and a dither image processing are carried out in parallel, and one of the processed results as selected in accordance with the image region discrimination result. The dither image processing is carried out through data conversion for calculating multivalued gray scale image from the inputted image data, gray scale data conversion for adjusting the gray scale image data so as to match an output device and obtaining such adjusted gray scale image data, and re-binarization for re-binarizing the gray scale image data after subjected to the gray scale conversion. The image region discrimination for discriminating if an image region is of a line image of a dither image is carried out based on a ratio of the number of black or white pixels within the region to the contour line length within the range. In ordered dither image through a screened type dither matrix is discriminated in accordance with a correlation between adjacent pixel trains each having a predetermined number of pixels.

5 Claims, 32 Drawing Sheets

F I G. 7A
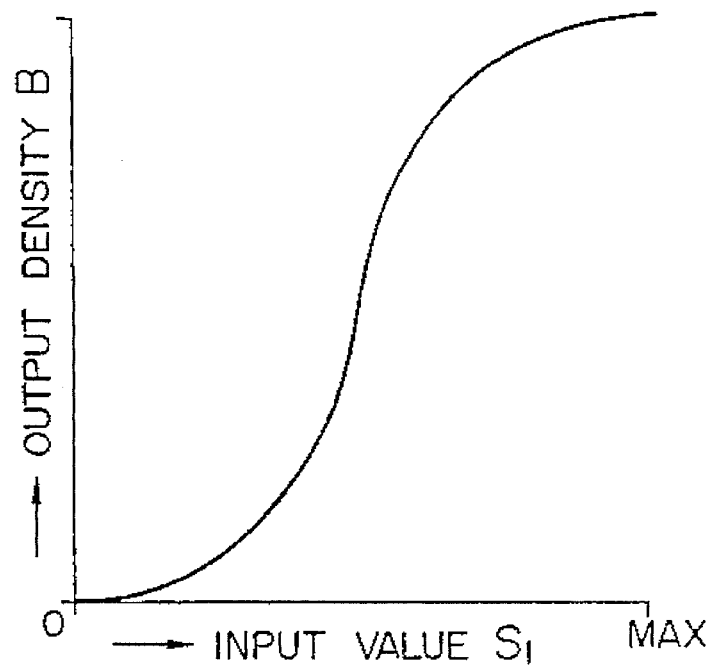
F I G. 7B
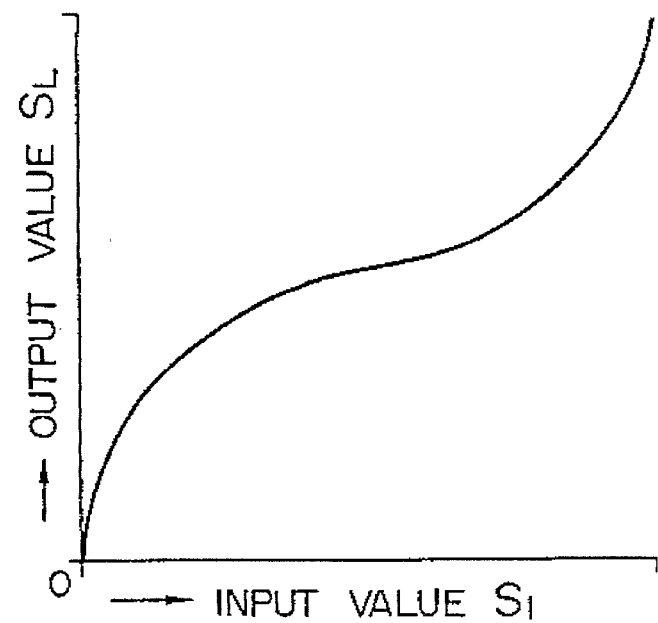

FIG. 13

| 1 | 2 | 2 | 1 |
|---|---|---|---|
| 2 | 4 | 4 | 2 |
| 2 | 4 | 4 | 2 |
| 1 | 2 | 2 | 1 |

FIG. 14A

| 4 | 8 | 4 | 2 |
|---|---|---|---|
| 8 | 16 | 8 | 4 |
| 4 | 8 | 4 | 2 |
| 2 | 4 | 2 | 1 |

FIG. 14B

| 2 | 4 | 8 | 4 |
|---|---|---|---|
| 4 | 8 | 16 | 8 |
| 2 | 4 | 8 | 4 |
| 1 | 2 | 4 | 2 |

FIG. 14C

| 2 | 4 | 2 | 1 |
|---|---|---|---|
| 4 | 8 | 4 | 2 |
| 8 | 16 | 8 | 4 |
| 4 | 8 | 4 | 2 |

FIG. 14D

| 1 | 2 | 4 | 2 |
|---|---|---|---|
| 2 | 4 | 8 | 4 |
| 4 | 8 | 16 | 8 |
| 2 | 4 | 8 | 4 |

FIG. 18

| S₁ | S₂ |
|---|---|
| φ | 0 |
| 1 | 2 |
| 2 | 4 |
| 3 | 6 |
| 4 | 8 |
| 5 | 10 |
| 6 | 11 |
| 7 | 11 |
| 8 | 12 |
| 9 | 12 |
| 10 | 13 |
| 11 | 13 |
| 12 | 14 |
| 13 | 14 |
| 14 | 15 |
| 15 | 15 |

FIG. 22
| 0 | 0 | 1 | 0 | 0 |
|---|---|---|---|---|
| 0 | 1 | 2 | 1 | 0 |
| 1 | 2 | ✻ | 0 | 0 |
FIG. 23
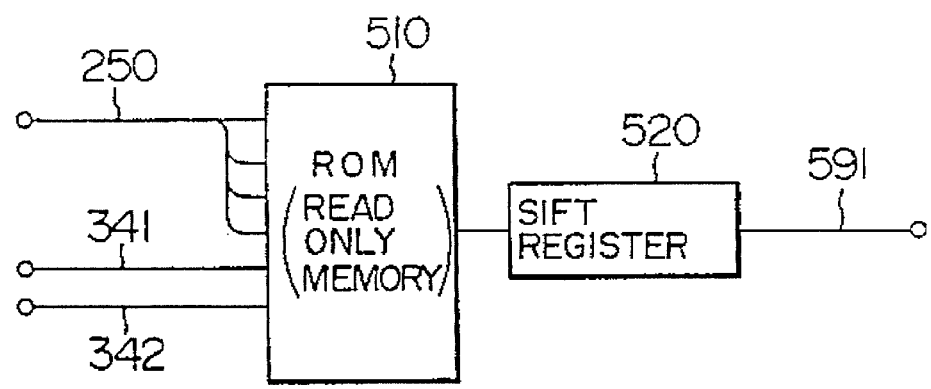
FIG. 24
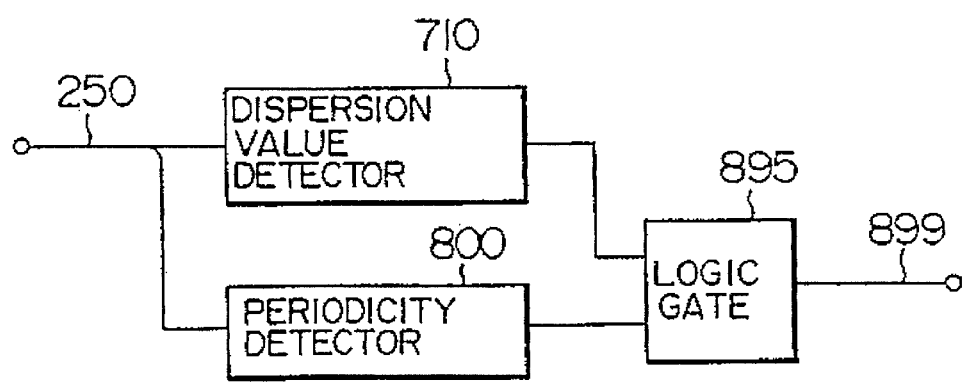

| ILC\DLN | 0 | 1 | 2 | 3 | 4 |
|---|---|---|---|---|---|
| 0 | 0 | 0 | 0 | 1 | 1 |
| 1 | — | 0 | 0 | 1 | 1 |
| 2 | — | — | 0 | 0 | 1 |
| 3 | — | — | — | 0 | 0 |
| 4 | — | — | — | — | 0 |

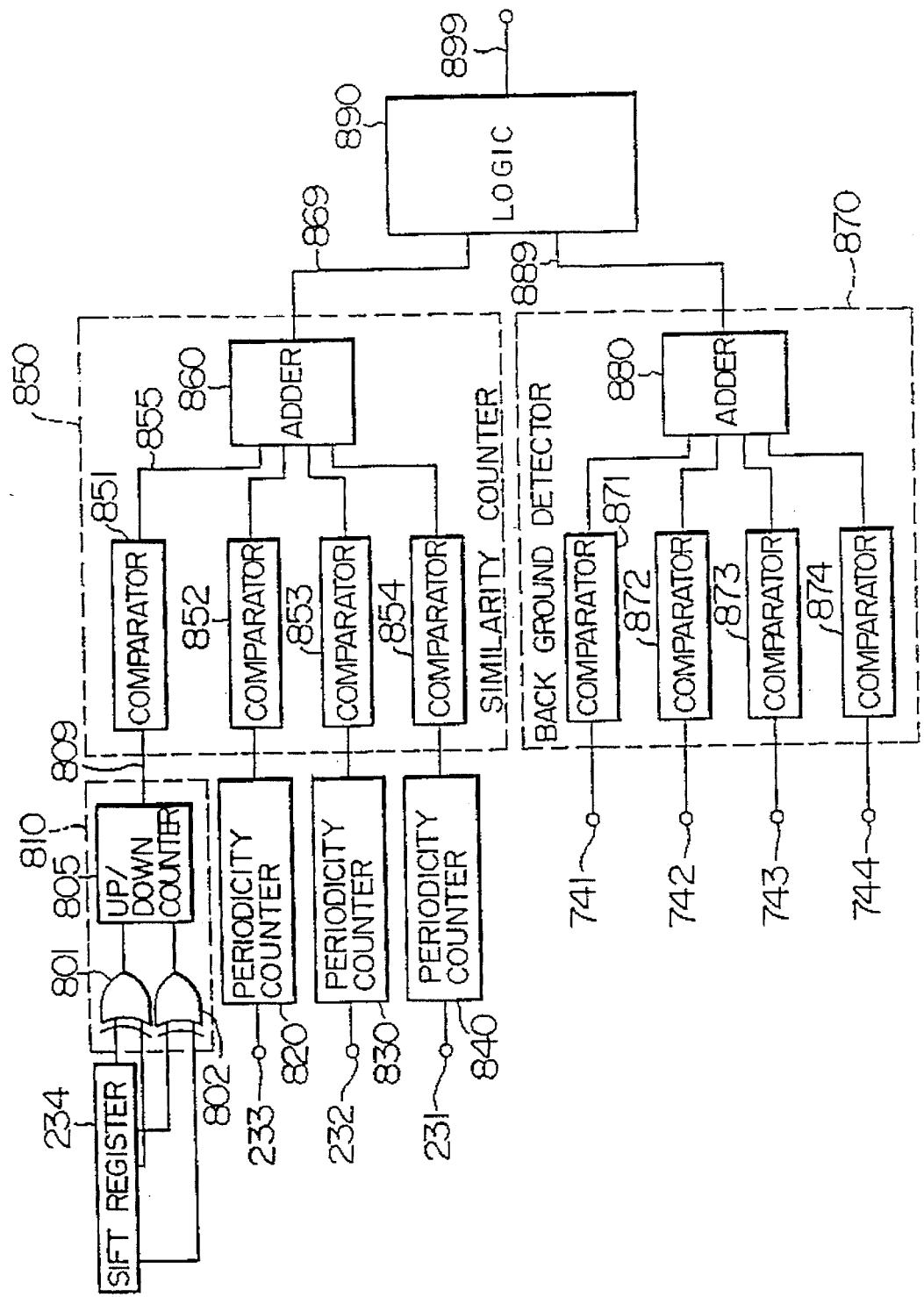

| 7 | 5 | 6 | 3 | 5 | 8 | 10 | 14 | 12 | 10 | 8 | 6 |
|---|---|---|---|---|---|----|----|----|----|---|---|
| 6 | 4 | 5 | 4 | 6 | 7 | 9  | 12 | 13 | 15 | 12| 7 |
| 7 | 7 | 6 | 3 | 8 | 10| 13 | 16 | 13 | 11 | 9 | 6 |
| 6 | 7 | 6 | 5 | 6 | 10| 12 | 13 | 11 | 9  | 7 | 6 |

| A | X-1 | X | X+1 | X+2 |
|---|---|---|---|---|
| Y-1 | 10 | 9 | 12 | 11 |
| Y | 12 | 14 | 9 | 7 |
| Y+1 | 14 | 13 | 7 | 6 |

| | X-1 | X | X+1 | X+2 |
|---|---|---|---|---|
| Y-1 | 13 | 0 | 12 | 11 |
| Y | 16 | 16 | 9 | 7 |
| Y+1 | 14 | 13 | 7 | 6 |

IMAGE PROCESSING SYSTEM

This is a divisional of application Ser. No. 272,447, filed Nov. 17, 1988 and now U.S. Pat. No. 5,125,045.

BACKGROUND OF THE INVENTION

The present invention relates to a system which processes an image such as a document as binary image data. More specifically, it relates to an image processing system having a function to input or store an image, a function to perform magnification, reduction, rotation or other operations with respect to an image, and a function to display an image on a display or print out an image from a printer, wherein a line image such as character, a dither image (hereinafter referred to a pseudo half tone image), or a composite image composed of line image and pseudo half tone image is subjected to optimum image processing to allow an image of high quality to be outputted.

Elements constituting a document includes a line image such as character, a gray scale image (hereinafter referred to a half tone image) such as photograph, and a screened half tone image generally used in a printed matter. In processing these images as binary image data constructed of black and white pixels, commonly adopted in the art is a system for binarizing a line image region by using a fixed threshold, and binarizing a photograph or a screened half tone image by using a dithering process (hereinafter referred to a pseudo half tone process). Thus, an obtained binary image characteristic differs greatly depending upon the applied binarization process.

However, a conventional apparatus for processing a document image is directed only to a line image, and a function to improve the quality of a pseudo half tone image has not been considered at all.

Further, although a conventional apparatus is provided as an image processing function with an affine transformation function such as magnification/reduction. However, such affine transformation function has been directed to a line image.

The principle of conventional affine transformation is as follows: Assuming that an original image is reduced in size to ⅔, first, pixels Q(x, y) of a reproducing image are disposed at 3/2 intervals of original image pixels P(x, y) as shown in FIG. 2. The values of pixels of a reproducing image such as at Q(0, 0) and Q(2, 0) are determined in accordance with the values of pixels of an original image at P(0, 0) and P(3, 0), whereas the values of pixels positioned between original image pixels such as at Q(1, 1) are determined through an interpolation process. A conventional apparatus directed to a line image has generally adopted such as an interpolation process a logical OR method, and a nearest point method. For example, refer to a paper "Estimation of Performance of Various Binary Image Magnification/Reduction Processes and Method of Improving Process Speed", by Hiroshi Masajima, the Proceedings of Information Processing Society in Japan. Vol. 126, No. 5, September 1985, pp. 920 to 925.

A magnification/reduction process for a pseudo half tone image on the other hand is known disclosed in "Study on An Enlargement and Reduction of Dithered Images", by Kim et al, the lecture paper 1–194 (November 1987) at the national meeting of the information and system section of the Institute of Electronics, Information and Communication Engineers of Japan, 1987. In this paper, a multivalued image is estimated from a pseudo half tone image binarized through an ordered dither method, the multivalued image is subjected to magnification or reduction and, thereafter, re-binarized through the ordered dither method. A known example of estimating a multivalued image from a pseudo half tone image is disclosed in JP-A-62-117072. According to this estimation, a ratio of black pixels relative to white pixels within a variable size window is used as an estimated value. The window size used in such estimation is selected based on a similarity of an image re-binarized from the estimated multivalued image to the original image.

In the present specification, an image composed of line image and pseudo half tone image is called a "composite image".

As described above, for processing a document as a binary image, there are two types of images, namely, a line image and a pseudo half tone image, which have a different image characteristic.

As a pseudo half tone process, an ordered dither method which uses a periodically changing threshold value is commonly used. However, this method when applied to a screened half tone image results in a poor image quality because moire is generated. In view of this, as a pseudo half tone process for a screened half tone image, a method called an average error dispersion method for example has been used.

Consequently, it becomes essential to provide an image processing system applicable to all types of images of a document obtained through various binarization processes, in order to allow various image processings. In addition, it is necessary to adjust the characteristic inherent in each of various images having a different characteristic, in accordance with the characteristic of an output device, in order to display/output an image of high quality.

Nevertheless, most of conventional systems for processing binary images have as their main object to process an ordinary line image such as character and figure. Thus, a function to improve the quality of a pseudo half tone image has not been considered at all, thus resulting in the following problems associated with image display/output.

Generally, a binary image output device such as display or printer is not linear in its density characteristic of an outputted pseudo half tone image. A conventional means for compensating for a nonlinear density characteristic, however, is directed to a multivalued image, and cannot be applied to an image after subjected to a binarization process.

Apart from the above, there occurs a case where an optimum pseudo half tone process must be changed depending upon an output device to which a pseudo half tone image is outputted. For instance, a certain laser beam printer (LBP) cannot display correctly a single isolated black or white pixel. If a Bayer type dither image having a number of isolated black and white pixels is outputted to such an apparatus, the image quality is considerably degraded. An effective countermeasure against this problem, however, is not present up to date.

Further, the number of pixels of an image display device such as CRT display is generally smaller than that of an image input device such as image scanner. In consideration of this, the number of pixels of an image to be outputted is reduced if the entirety of an inputted image is to be displayed. With a conventional apparatus, image data to be displayed are simply thinned in such a case, while also seeking to improve the display speed. However, thinning a pseudo half tone image results in considerably lowering the image quality. As a result, a pseudo half tone image having a high resolution is displayed sometimes as having a lower image quality than that of an image having the same resolution as that of a display device. If all image data are inputted, the display speed will be lowered. Thus, the image quality and the display speed are contradictory to each other. Although an effective countermeasure against this problem has been desired, there is no such countermeasure up to date.

Furthermore, the following problems also arise during image processing such as magnification/reduction.

First, if conventional image processing for a line image is applied to a pseudo half tone image, blank or crushed black pixels appear during an interpolation process thus to greatly degrade the image quality.

On the other hand, the conventional image processing for a pseudo half tone image incorporated in the foregoing as a known prior art performs a pseudo half tone process during the image processing. Therefore, if this process is applied to a composite image, the quality of the line image region thereof is deteriorated. Meanwhile, a coding process is generally effected for recording/communications of binary data. However, a coding process commonly used in the art has a low data compression efficiency for a pseudo half tone image. Therefore, if the conventional image processing for a pseudo half tone image is applied to a line image, the amount of data after coding increases greatly.

Still further, the conventional image processing for a pseudo half tone image has been directed to only an ordered dither image among pseudo half tone images. Each pseudo half tone image has a different characteristic depending upon the applied binarization process. Therefore, if the method, for example, of estimating multivalued data from the number of black pixels within a variable size window, incorporated in the foregoing as a known prior art, is applied to a pseudo half tone image other than an ordered dither image, it is not possible to correctly determine the window size and obtain an effective, estimated value.

SUMMARY OF THE INVENTION

It is an object of the present invention to provide an image processing system capable of subjecting a composite image composed of line image such as character and pseudo half tone image, to a conversion process such as arbitrary magnification/reduction, without lowering the image quality.

It is another object of the present invention to provide an image processing system capable of correctly discriminating between a line image and a pseudo half tone image within a composite image, to thus allow an optimum image processing of respective line image regions and pseudo half tone image regions.

It is a further object of the present invention to provide an image processing system capable of outputting a pseudo half tone image of high quality even if an output device having a different characteristic is used.

It is another object of the present invention to provide an image processing system capable of outputting a pseudo half tone image of high quality in accordance with user's arbitrary designation.

To achieve the above objects, according to the present invention, the following processes are carried out.

First, in order to perform an optimum image processing for both a line image and a pseudo half tone image, the line image processing and the pseudo half tone image processing are performed at the same time for inputted image data, and one of the processed results is selected in accordance with the type of an image region now concerned. The feature parameters of various pseudo half tone images are prepared to allow image region discrimination irrespective of the types of dithering processes performed at the time of inputting an image.

The pseudo half tone image process used at the time of inputting a document with an image scanner or the like (such a process is called hereinafter a type of dithering process at the time of image input) is broadly classified into a method of periodically changing a threshold value (e.g., an Ordered Dither) and a method of dispersing black and white pixels (e.g., an Error Diffusion method). An image binarized through the periodically changing threshold value method has a very high periodicity in association with a threshold value. On the other hand, an image binarized through the black and white pixel dispersion method has a number of isolated black and white pixels. Therefore, by detecting the periodicity and the black/white pixel dispersion, it is possible to discriminate between the line image and pseudo half tone image irrespective of the types of dithering process at the time of image input.

Next, a method of solving the problems arising from the image processing for a pseudo half tone image will be explained.

Magnification, reduction, rotation or the like of a pseudo half tone image has conventionally resulted in lowering the image quality. The reason for this is that both the pseudo half tone image and line image are processed in the same manner.

Line image information such as character is expressed by a pattern of black and white pixels. Namely, each point itself of a line image constitutes the line image information. Therefore, an affine transformation is directly applied to a binary line image. Contrary to this, important information of a pseudo half tone image is a density or gray level of each pixel. Therefore, a pseudo half tone image information is expressed not by a pattern of black and white pixels but by the density of black pixels within a predetermined area. It is not proper to perform an affine transformation or the like process to each pixel of such a pseudo half tone image, in the similar manner as of the ordinary binary image. In order to obtain a reproduced image of high quality after magnification, reduction or the like, it is necessary to process image data using not only its pattern information but also its density information.

The problem of lowering an image quality as conventional can be solved by performing for a line image an ordinary affine transformation, and performing for a pseudo half tone image a new image processing which uses stored image density information to be described later. This new image processing is hereinafter called in this specification a "dither image processing".

The fundamental principle of the dither image processing is that the value of each pixel after coordinate conversion is obtained as half tone data which are re-binarized through a pseudo half tone process to obtain a reproduced image.

To realize the dither image processing, it is necessary to obtain multivalued density information from binary pseudo half tone image irrespective of the dither process at the time of image input. This process is called "half tone conversion or data conversion". The data conversion can be realized by calculating density information in a similar manner to the mechanism that a person senses the density of a pseudo half tone image. A person senses the density of a pseudo half tone image without noticing the size of a dither matrix. In this case, a density at a point on a pseudo half tone image is determined depending upon the values of neighbouring pixels and the distances from a point to be processed.

Therefore, the density of each pixel can be determined in such a way that the distribution of neighbouring black and white pixels is checked, and each density is weighted in accordance with the distance from a point to be processed.

Thus, multivalued half tone image data nearly equal to a person's sense of sight can be obtained for a pseudo half tone image irrespective of the type of dither method at the time of image input.

A function to compensate for the density characteristic of an output device can also be realized through the dither image processing. In particular, multivalued half tone data obtained through the half tone conversion or data conversion are subjected to a conversion process of adjusting the data in accordance with the density characteristic of the output device. This conversion process is called a "grey scale image processing" hereinafter. With this grey scale image processing, it becomes possible to obtain various images matching a user's intention, by setting a desired conversion characteristic.

In the dither image processing, the final half tone image data are re-binarized. Therefore, it is possible to select a desired pseudo half tone process to be performed during re-binarization or change the threshold matrix during an ordered dither method, in accordance with the characteristic of an output device. Accordingly, it is possible to provide a function to select an optimum pseudo half tone process suitable for an output device to which a pseudo half tone image is outputted.

Also, the problem of lowering the image quality in case where an image having a resolution higher than that of an output device is displayed, can be solved by changing the line density during the dither image processing. Further, in order to eliminate the contradiction between image quality and display speed, an image resion is discriminated if it contains a pseudo half tone image or not at each scan line. If it contains only a line image, thinning the image data is carried out. Accordingly, in displaying a composite image, it is possible to prevent lowering a display speed considerably.

The operation principle of the present invention will be described hereinunder.

The dither image processing is composed of a data conversion whereby multivalued half tone image data Sp are calculated based on binary image data P, a grey scale conversion whereby the half tone image data Sp are subjected to compensate for the density characteristic of an output device to thus obtain half tone image data Sq, and a re-binarization process whereby the half tone image data Sq are subjected to a pseudo half tone image processing.

The dither image processing will be described in particular using an affine transformation by way of example wherein a pseudo half tone image $P(x, y)$ of $m_1 \times n_1$ pixels is reduced in size to obtain binary output image $Q(x, y)$ of $m_2 \times n_2$ pixels.

(1) Half Tone Image Conversion Processing (Data Conversion Processing)

Binary original image data P are stored in a buffer memory and scanned using a scan window of M×N pixels to calculate multivalued half tone image data of $m_2 \times n_2$ pixels. Data calculation is performed at each re-sampling point using a conversion factor to thus realize coordinate conversion. The value of half tone image data is determined at each re-sampling point in accordance with the sum of multiplications of neighbouring pixel parameters by distances.

(2) Grey Scale Conversion Processing

Half tone image data Sp are subjected to a primary conversion to obtain half tone image data Sq. If the inverse of the density characteristic of an output device connected to the system is used as the content of such conversion, the density characteristic of the device can be compensated. Also, by measuring the histogram of the half tone image data Sp, the frequency distribution can be normalized.

(3) Re-binarization Processing

Half tone image data Sq after subjected to the grey scale image conversion processing are rebinarized through a pseudo half tone process to thus obtain binary image data Q. If a plurality of different type pseudo half tone processes are prepared, it is possible to select an optimum pseudo half tone process depending upon an output device or an image. For instance, for a device which cannot output an isolated pixel stably, a screened type ordered dither method can be used.

With the above processings (1), (2) and (3), a pseudo half tone image is subjected to an affine transformation process, a density adjustment process suitable for an output device, and an optimum pseudo half tone process, to thus obtain a binarized image. Therefore, an output image can be obtained with high quality.

For a line image, various known image processings heretofore proposed can be adopted to realize such conversions.

Next, the principle of discriminating between a line image and a pseudo half tone image within an original image will be described. A pseudo half tone image is generally constructed of a collection of isolated black or white pixels. The ratio of the number of black pixels to the contour line length of pixels concerned is large for isolated pixels as compared to that of a line image. Therefore, a line image and a pseudo half tone image can be discriminated using as a feature parameter the ratio of the number of black or white pixels within a certain region to the contour line length within the region. Of pseudo half tone images, an ordered dither image obtained using a screened type dither matrix has a relatively small ratio. However, in this case, the periodicity of image data is very high. Therefore, the ordered dither image can be discriminated using as a feature parameter the corelation between adjacent pixel trains having a predetermined length.

The above two discrimination methods are used complementally so that the line image region and pseudo half tone image region can be discriminated irrespective of the type of dither method at the time of image input.

Such image region discrimination at each scan line can be realized in accordance with the discrimination results of all pixels on this scan line. In particular, if pixels judged as in a pseudo half tone image region are densely present on a scan line, then this scan line is judged as containing a pseudo half tone image. Therefore, an image portion of a composite image where a pseudo half tone image is not contained can be displayed at high speed through a thinning process. A pseudo half tone image portion can be displayed with high quality by using a density dispersion method.

As described above, the present invention allows an optimum image processing of any type of binary image including a pseudo half tone image so that an output image with high quality can be obtained even if it is subjected to magnification, reduction, rotation or the like. Further, a grey scale conversion process can be applied to a binary image, although such an application has been impossible heretofore. Furthermore, since an optimum pseudo half tone process can be changed, a pseudo half tone image can be converted while taking the output device characteristic into consideration so that it can be outputted with high quality.

BRIEF DESCRIPTION OF THE DRAWINGS

FIGS. 7A and 7B show an example of a density characteristic of an output device such as a printer from which a pseudo half tone image is outputted, and an example of a density characteristic of a grey scale conversion table to be used for compensating for the output device density characteristic;

FIG. 13 shows an example of weight coefficients used in half tone image conversion;

FIGS. 14A to 14D show examples of the positions of weight coefficients which positions are changed with relative positions of an output image relative to an input image;

FIG. 18 shows an example of a conversion table used by the grey scale data converter;

FIG. 22 shows an example of weight coefficients used by an average error minimum method which is applied to the re-binarization process;

FIG. 23 is a block diagram showing an example of a circuit arrangement of a line image processing unit;

FIG. 24 shows an example of a fundamental structure of a discrimination unit of this invention;

FIG. 29 is a block diagram showing an example of a circuit arrangement of the periodicity detector in the discrimination unit;

DESCRIPTION OF THE PREFERRED EMBODIMENTS

Preferred embodiments of the present invention will be described in detail with reference to the accompanying drawings. In the following, first the overall structure of the system will be described, and then the operation of the system will be described for each particular process. Lastly, the image processor for realizing its functions will be described in detail while giving particular circuit arrangements and their operations.

Figure 1:
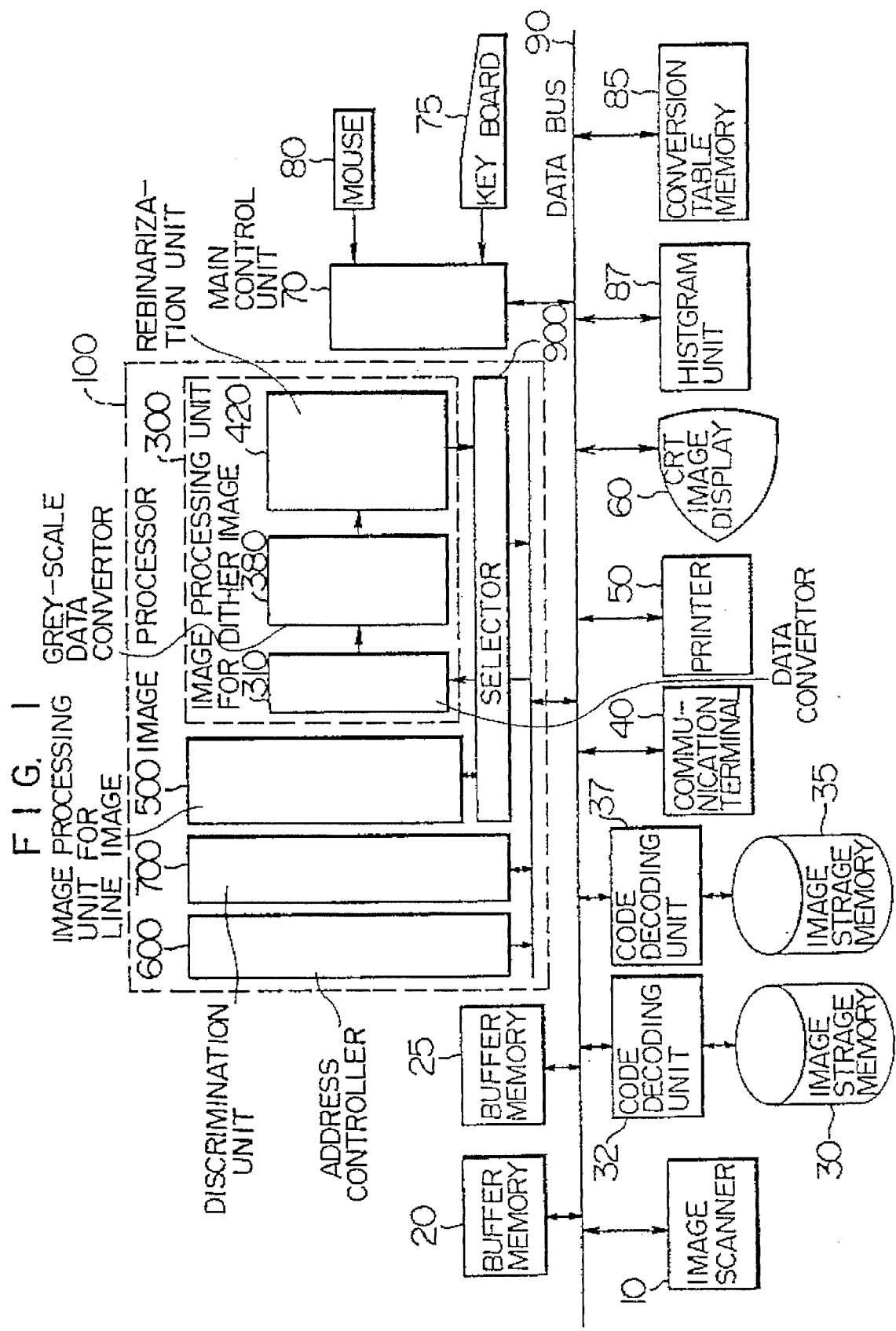
FIG. 1 is a block diagram showing an example of a fundamental circuit arrangement of the image processing system of this invention.

FIG. 1 is a block diagram showing an embodiment of the fundamental circuit arrangement of the image processing system of this invention.

In the image processing system shown in FIG. 1, an image scanner 10 optically reads a document or the like in a known manner and outputs digital, binary image data. A buffer memory 20, 25 temporarily stores binary image data. An image storage memory 32, 37 stores digital image data in an optical disk for example. A coding/decoding unit 32, 37 encodes and decodes data in a known manner. A communication terminal 40 is used for transfer of data to and from another system. An output device 50 such as a laser beam printer (LBP) outputs binary image data. An image display 60 such as a high precision cathode ray tube (CRT) displays binary image data in the buffer memory. A main control unit 70 controls the entire system. An input device 75 such as a keyboard is used for input of instructions to the system. A coordinate input unit 80 such as a mouse is used for input of coordinate information to the system. A conversion table memory 85 is provided with a plurality of different type conversion tables for compensation of the density characteristic of an output device connected to the system. A histogram unit 87 is used for measuring a histogram of multivalued data during image processing. A data bus 90 is used for transfer of data. An image processor 100 performs various image processings of binary image data stored in the buffer memory and outputs processed binary image data.

One of the characteristic features of this invention is performed by the image processor 100. As shown in FIG. 1, the image processor 100 is constructed of a dither image processing unit 300 for performing an optimum image processing suitable for a pseudo half tone image to be processed, a line image processing unit 500 for performing an affine transformation process in a known manner, a discrimination unit 700 for judging which one of the outputs from the two image processing units 300 and 500 is to be selected for each pixel to be processed, an address controller 600 for controlling input/output of image data, and a selector 900. The selector 900 selects one of the outputs from the dither image processing unit 300 and line image processing unit 700 in accordance with an output from the discrimination unit 700. The dither image processing unit 300 is constructed of a data converter 310 for obtaining multivalued half tone image data based on inputted binary image data, a grey scale data converter 310 for performing a conversion process of the half tone image data obtained by the data converter, and a re-binarization unit 420 which has a plurality of different type means for re-binarizing the converted half tone image data.

The characteristic features of the image processor 100 are summarized as follows:

a) Multivalued half tone image data $S_1$ are obtained from inputted binary image data P.

b) The grey scale of multivalued half tone image data $S_1$ is converted into multivalued half tone image data S c) There are provided a plurality of different type means for re-binarizing multivalued half tone image data $S_2$ to obtain binary image data $Q_1$.

d) There is provided a function to make inputted binary data P undergo affine transformation to thus obtain binary image data $Q_2$.

e) It is checked if each pixel of an image to be outputted is within a pseudo half tone image region or not, to thus determine a discrimination result flag FLG.

f) During processing a composite binary image containing a pseudo half tone image, one of the two binary image data $Q_1$ and $Q_2$ is selected for each pixel to be processed.

The particular circuit arrangements realizing the above functions will be described later in the description for the structure and operation of the image processor 100.

With the image processor 100 having the above-described functions, the image processing system of this invention can perform the following various image processings.

Next, the operation of the entire system will be described with reference to FIG. 1.

Figure 3C:
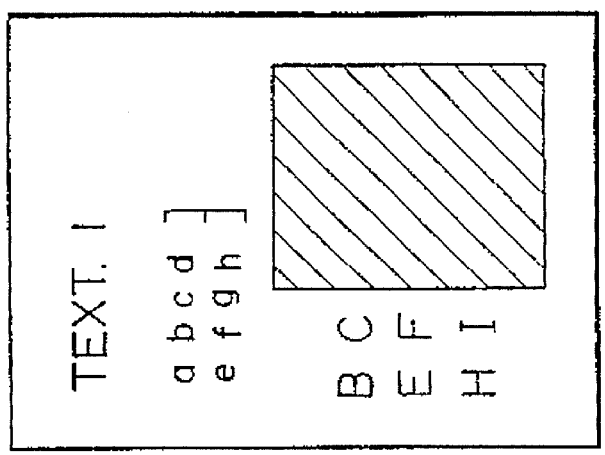
FIGS. 3A to 3C illustrate the procedure of executing a magnification process for a composite image.
Figure 3B:
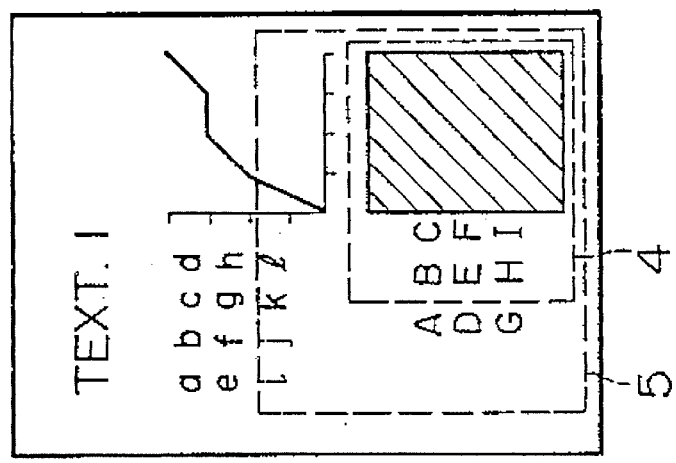
Figure 3A:
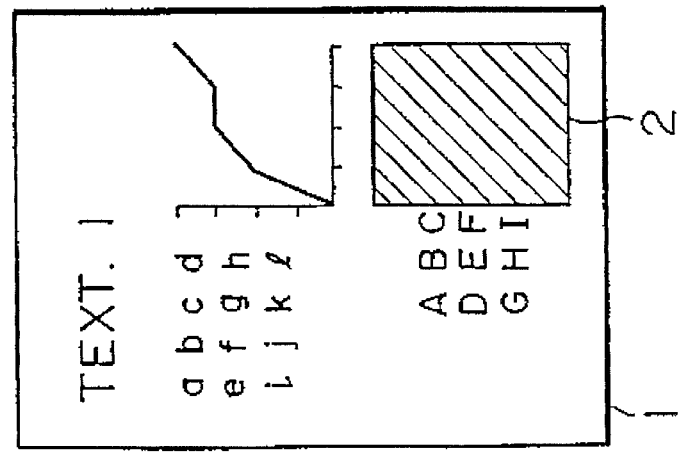

The system operation will be described taking as an example a process of magnifying a part of an image stored in the image storage memory 30. A user first designates an image to be processed from the keyboard 75. A known search method is used in designating an image, for example, designating an image by using a specific number assigned to each image. Upon this designation, the main control unit 70 transfers objective digital binary image data from the image storage memory 30 to the buffer memory 20. In most cases, binary image data are generally subjected to a particular coding process and, thereafter, the coded data are stored in a data base or the like. In such a case, the coded data from the image storage memory 30 are decoded by the coding/decoding unit 32 and then written in the buffer memory 20. The image data in the buffer memory 20 are transferred via the bus line 90 to a bit map memory in the image display 60 and displayed on the screen. An example of a display is shown in FIG. 3A. Reference numeral 1 in FIG. 3A denotes a displayed image. Reference numeral 2 denotes a pseudo half tone image region within the image 1, and the other portion is a line image region.

A user observes the image on the image display 60 and designates the region to be processed using a mouse for example. A magnification factor may be inputted directly by the keyboard, indirectly by designating a region after magnification with a mouse, or by other methods. It is now assumed that the region 4 shown in FIG. 3B is magnified and written in the region 5.

After designation of the region to be processed, the main control unit 70 causes the data of the objective region within the image data in the buffer memory 20 to be inputted to the image processor 100 sequentially along a scan line. Both the line image processing unit 500 and dither image processing unit 300 in the image processor 100 execute the magnification process at the same time. The processes performed by both the units will be described later in detail. The discrimination unit 700 discriminates if each resampling point during the magnification process is within the pseudo half tone image region or within the line image region, based on the criterion to be described later. The selector 900 selects one of two types of binary image data supplied from the two image processing units 500 and 300, depending upon an output from the discrimination unit 700. The selected binary image data are outputted to the bit line 90, and transferred to the bit map memory in the image display 60 for the display of the image data which may also be written in the second buffer memory 25 which is used to temporarily store the image processed results. In this case, if the initial image from the image storage 30 is also written in the buffer memory 25, the composite image with the magnified image can be written in the buffer memory 25. An example of a composite image is shown in FIG. 3C. Generally, the inputted binary image after magnification is overwritten on the previously written image in the bit map memory of the image display 60 and in the buffer memory 25. However, the logical operation result of the two types of image data may be written upon designation by the keyboard.

After display on the image display, a user checks the displayed image on the image display 60. If the user designates a storage of the image data, the image data in the buffer memory 25 are transferred to the image storage memory 35 and written in a recording medium thereof such as an optical disk. In this case, code information identifying the image data and other information are written as well. In writing into the image storage memory 35, the binary image data may be encoded by a known coding method at the coding/decoding unit 37 to reduce the amount of data. Since the image outputted after the data processing is composed of binary image data, the image can be printed out on a medium such as paper by using the output device 50 such as LBP.

With the above processes, a binary image is read from the image storage memory 30, a desired region of the image is processed at an optional magnification factor, and the processed result can be displayed, printed out, or written in the image storage memory 35. A reduction, rotation and other processes can be executed in a similar manner. The image storage memories 30 and 35 may be a single memory.

In the above example, the magnification process has been described wherein a part of an image stored in the image storage memory 30 is magnified. However, an image just inputted with the image scanner 10 may be processed in a similar manner after storing the binarized data of the image in the buffer memory 20. It is obvious that a similar process may be executed not only for a part of an image but also for the entire thereof.

Next, a line density conversion process will be described wherein an image inputted at a certain line density and stored in the image storage unit 30 such as an optical disk is subjected to line density conversion to obtain image data having a different line density. The line density conversion process is executed, for example, for the case where an image with a resolution of, e.g., 400 dpi (dot/inch) stored in an image data base is to be converted to an image of, e.g., 16 line/mm. The process procedure is similar to that of the above-described magnification process. However, after a conversion factor is once set, it is possible to arrange such that a further user designation is not required during the processing until the image is processed completely.

Figure 4:
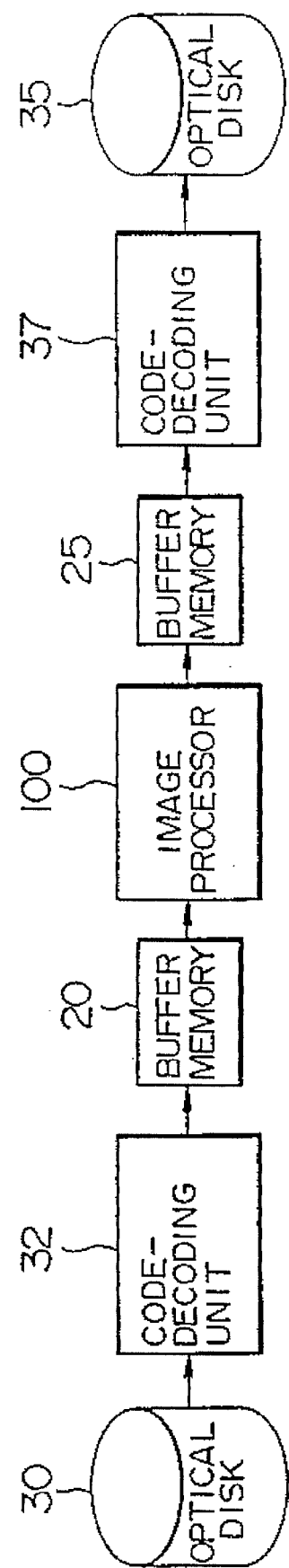
FIG. 4 shows a data flow wherein data stored in an image storage memory are subjected to line density conversion.

First, a user designates a conversion factor and an image to be processed from the keyboard 75. However, if the entire surface of an optical disk is processed, or in other cases, image designation may be unnecessary. Also, if the line densities of both the source and destination optical disks have been written already, it is not necessary for a user to designate the conversion factor. First of all, the main control unit 70 causes single image data to be transferred from the image storage memory 30 to the buffer memory 20. Data transferred in the buffer memory 20 are sequentially inputted to the image processor 100 to be subjected to line density conversion. The process performed by the image processor 100 is similar to the above-described magnification process in that one of the outputs from the image processor 100 is selected depending upon the discriminated image region. The outputted image data are stored in the buffer memory 25 and in the image storage memory 35. The binary image data stored in the buffer memory 25 may also be stored in the image storage memory 35 in the form of image data encoded by a known coding method. The flow of the image data in the above process becomes as shown in FIG. 4.

After completion of processing the first image data, the second and following image data are sequentially subjected to line density conversion upon instruction from the main control unit 70.

In case where a plurality of images are processed, data input from the image storage memory 30 to the buffer memory 20 may be executed in a pipe line fashion with data output from the buffer memory 25 to the image storage memory 35, to thus improve the processing speed. In the above manner, the line density conversion for a great amount of image data whose images contain pseudo half tone images can be executed automatically.

Next, the case where the resolution of an inputted image is different from that of an output device will be described.

It is now assumed that an image (hereinafter called image A) with a resolution of 400 dpi is stored in the image storage memory 30, and the resolution of the image display 60 connected to the system is 200 dpi. A user designates the main control unit 70 to image A by using the keyboard 75. The main control unit 70 is being supplied with a signal indicating that the resolution of the image display 60 connected to the system 70 is 200 dpi. This signal value may be determined by a combination of switch settings when the image display 60 is connected to the system, or by a known method such as sending a control signal from the image display 60 to the main control unit 70. On the other hand, the resolution of image A has been written already in the image A data itself in the image storage memory 30, or in the code data in each medium such as an optical disk. The resolution data is supplied to the main control unit 70 when the image A data are transferred to the buffer memory 20. If the resolution of an inputted image is always fixed, the resolution data is held previously in the main control unit 70. The main control unit 70 determines the conversion factor in accordance with given resolutions of an input image and the image display 60. In this example, the resolution of an inputted image is 400 dpi and that of the image display 60 is 200 dpi so that the conversion factor is ½ for both main and sub scan line directions. The process after determination of a conversion factor is similar to the above-described line density conversion process. Namely, the image with a resolution of 400 dpi inputted from the image storage memory 30 to the buffer memory 20 is subjected to ½ reduction in pixel number by the image processor 100, and transferred via the bus line 90 to the image display 60 for the display of the image. As above, it is not necessary for a user to take notice of the resolution of image data and those of peripheral units constituting the system. Accordingly, without performing special user operation, images containing pseudo half tone images can be displayed on the image display having a different resolution.

A conventional line density conversion by means of directly thinning the amount of data to be read from the buffer memory 20 or the like has an effect that a display is performed at high speed. However, it becomes necessary to read image data of all pixels in performing the above line density conversion process. In view of this, the above line density conversion process is performed only for pseudo half tone images, and the thinning process is performed for the remaining image region, to thereby avoid a considerable speeddown of displaying a composite image. In particular, for the display of a composite image, first a conventional thinning process is performed to read data, e.g., every second pixel from the buffer memory. While displaying the read-out data, each scan line is discriminated if it contains a pseudo half tone image region or not, and this region discrimination result is outputted as a binary data $JL_1$ which takes a value, e.g., as in the following:

$JL_1$=1: containing a pseudo half tone image

0: not containing a pseudo half tone.

If the region discrimination result $JL_1$ at each scan line takes consecutive is more than predetermined $DT_1$ times, the associated scan line is considered as containing a pseudo half tone image region, and an area discrimination result JV of binary value becomes "1". Thus, the thinning process is stopped, and an output from the dither image processing unit 300 subjected to the line density conversion process is displayed. After the process is switched to the line density conversion process, the region discrimination at each scan line continues. If the discrimination result $JL_1$ takes consecutive 0s more than predetermined $DT_2$ times, it is considered that the display of the region containing a pseudo half tone image region has been completed, and the area discrimination result JV becomes "0". Then, the thinning process restarts, and the output thereof is displayed. While the thinning process is stopped, the result of line density conversion by the image processor 100 is transferred to the image display 60 for the display thereof.

The stop and restart of the thinning process delay by times corresponding to $DT_1$ and $DT_2$ scan lines, respectively. However, there is no problem in practical use. On the contrary, if the $DT_1$ and $DT_2$ delays are not allowed, both the processes are frequently switched so that the display speed is made correspondingly low. In order to eliminate such delays, the data to be displayed may be made to have delay to thus switch the display beforehand.

Figure 5:
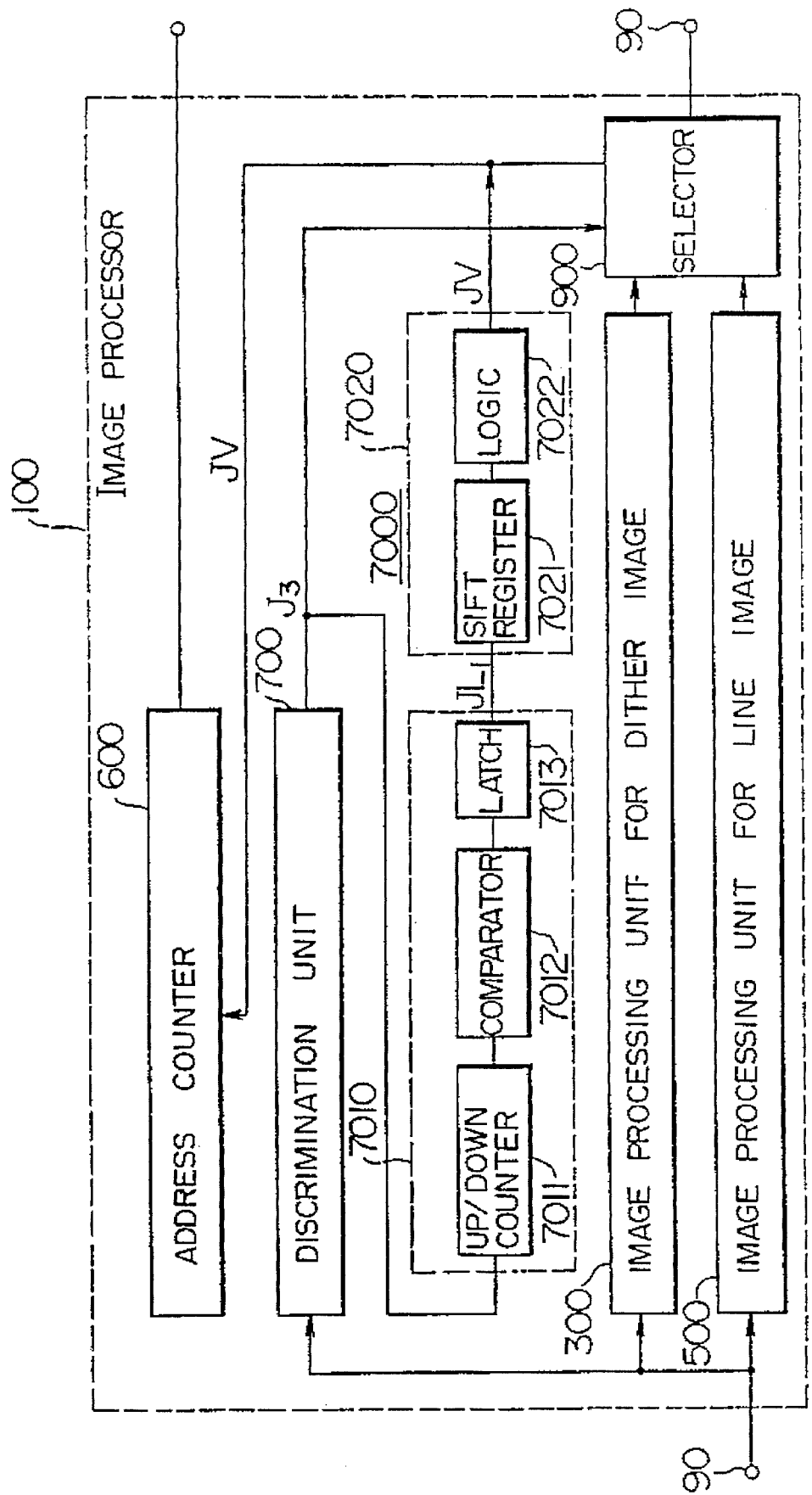
FIG. 5 shows an example of a circuit arrangement realizing high speed display of a composite image.

A means for executing the above-described series of processes will then be described. It is now assumed that an image of 400 dpi in the buffer memory is displayed on the image display of 200 dpi. FIG. 5 is a block diagram showing an example of a circuit arrangement of this invention by which the above conversion function is realized. In the Figure, reference numeral 100 denotes an image processor which includes a thinning discrimination unit 7000 for discriminating if thinning is executed or not. The thinning discrimination unit 7000 is constructed of, as shown in FIG. 5, a line discrimination unit 7010 and an area discrimination unit 7020. The line discrimination unit 7010 outputs a discrimination result $JL_1$ at each scan line, in accordance with a discrimination result $J_3$ at respective pixels outputted from the discrimination unit 700. The area discrimination unit 7020 outputs a final discrimination result JV in accordance with the discrimination result $JL_1$ at each scan line. $J_3$, $JL_1$ and JV take a value of "1" when it is discriminated that a pseudo half tone image region is contained, and "0" in the other case.

At the initial condition, $JL_1=0$ and JV=0. Starting from this initial condition, an address controller 600 outputs a value incremented every second pixel both in main and sub scan line directions. Therefore, image data in the buffer memory 90 thinned ½ in both main and sub scan directions are sent onto the bus line 90. Next, when a pseudo half tone image within the image now concerned is inputted, the binary data $J_3$ outputted from the discrimination unit 700 of the image processor 100 becomes 1. As shown in FIG. 5, the line discrimination unit 7010 is constructed of an up/down counter 7011, comparator 7012 and latch 7013.

The up/down count UDC of the up/down counter 7011 changes as follows:

$UDC=UDC+1: J_3=1$ $UDC=UDC-1: J_3=0$ where UDC is equal to or larger than 0. The comparator 7012 compares UDC with the predetermined threshold value $DP_1$, and outputs a binary data $JL_1$ as in the following:

$JL_1=1: UDC \geq DP_1$ $JL_1=0: UDC < DP_1$

In other words, if pixels discriminated as included in a pseudo half tone image region are present consecutively and collectively, $JL_1$ becomes 1.

The binary data $JL_1$ is inputted to the latch 7013 which holds $JL_1=1$ until the next scan line process starts. Therefore, $JL_1$ indicates for each scan line if a pseudo half tone image region is included therein.

The binary data $JL_1$ is inputted to the area discrimination unit 28 which is constructed of, e.g., a shift register 7021 and logic 7022 as shown in FIG. 5. JV outputted from the area discrimination unit 7020 takes a value of "0" at the initial condition, and a value of "1" when the discrimination result $JL_1$ at each scan line stored in the shift register 7021 takes consecutive 1s more than the predetermined threshold value $DT_1$. After the value is changed to JV=1, it is maintained until the discrimination result $JL_1$ at each scan line takes consecutive 0s more than the predetermined threshold value $DT_2$.

With the above circuit arrangement, the discrimination result JV representative of the start/stop of the thinning process can be obtained using an output from the discrimination unit 700 of the image processor 100.

Upon this discrimination result JV, the operation of the respective circuit elements changes as in the following. First, the output from the address controller 600 is incremented by the amount corresponding to two scan lines when JV=1, and by the amount corresponding to one scan line when JV=0. As a result, data sent from the buffer memory 20 to the data bus 90 are thinned every second pixel in both main and sub scan lines when JV=0, and all data are sent to the data bus when JV=1. In this case, the selector 900 operates with a priority of an output from the area discrimination unit 7020 over an output from the discrimination unit 700. If the final result is JV=0, an output from the line image processing unit 500 is selected, whereas if the final result is JV=1, an output from the dither image processing unit 300 is selected. In this case, the line image processing unit 500 outputs the inputted image data as they are.

Accordingly, in displaying a composite image, the contradictory conditions of preventing degrading the quality of a pseudo half tone image and of speeding up an image display can be both satisfied.

The above processes concern an affine transformation of binary image. According to the present invention, the affine transformation for a pseudo half tone image is executed in such a manner that a multi-valued half tone image is restored from an inputted pseudo half tone image and, thereafter, a binarization process is again performed. In this connection, the pseudo half tone image has been once subjected to a pseudo half tone process at the time of inputting the original image. Therefore, of the pseudo half tone processes, if a cyclic process such as an ordered dither method is repeated plural times, moire will occur because of a difference among cyclic periods, thus considerably deteriorating the image quality.

Therefore, in performing an affine transformation of an image binarized through an ordered dither method at the time of inputting the original image, it is necessary to adopt a pseudo half tone process which has no cyclic nature, such as an average error minimum method, when the second binarization process is performed. Apart from the above, a screened half tone image in a document is essentially cyclic in nature so that a pseudo half tone process without cyclic nature is required also at the time of inputting an original image.

In view of the above, it is necessary for a screened half tone image to be processed by a pseudo half tone process without cyclic nature, such as an average error minimum method, both at the times of inputting an original image and performing a pseudo half tone process. For a half tone image such as a photograph, a pseudo half tone process with cyclic nature, such as an ordered dither method can be used once during the times of inputting an original image and of image processing. Therefore, the re-binarization unit 420 may have a plurality of pseudo half tone process functions which can be selectively used upon user's designation in accordance with the type of image and the characteristic of an output device. With the provision of a plurality of such pseudo half tone process functions, the following processing becomes possible.

In an actual system, the output image quality may sometimes considerably be deteriorated depending upon the characteristic of an output device connected to the system. For instance, a certain type of LBP is difficult to print an isolated black or white pixel. In such a case, as an output pseudo half tone image, an image through a screened type dither process is more suitable than an image through an average error minimum method which is likely to generate an isolated pixel. Next, a process of selectively using a pseudo half tone process depending upon an output device will be described.

It is assumed now that an image B stored in the image storage memory 30 shown in FIG. 1 is outputted to the printer 50 having a poor performance in printing an isolated pixel. Image B is assumed as containing a pseudo half tone image binarized by the average error minimum method.

A user first designates image B desired to be outputted, using the keyboard 75. Designated image B is transferred from the image storage memory 30 to the buffer memory 20, and at the same time written in the bit map memory of the image display 60. Next, the user checks the displayed image and issues a printer output command from the keyboard or the like, as well as an image data transformation command. Upon reception of the printer output command by the system, the image processor 100 executes an equal magnification affine transformation process for the image data in the buffer memory 20. The processed result is stored in the buffer memory 25. With the equal magnification affine transformation, the line image processing unit 500 outputs image data same as the original image. On the other hand, the dither image processing unit 300 restores a multivalued half tone image and, thereafter, executes again a binarization process through the ordered dither method. Thus, the image data in the buffer memory 25 represent a pseudo half tone image through the ordered dither method. An output of relatively high image quality can thus be obtained even if the printer 50 has a poor performance in printing an isolated pixel. In the above example, a suitable pseudo half tone process is selectively used to compensate for the poor printer performance. However, any other process preferred by a user may be selected in the similar manner as above.

Also in the above embodiment, a user designates a selection of a suitable pseudo half tone process at the time of outputting to the printer. However, this designation can be automatically performed if the information that such a selection is necessary when a pseudo half tone image in image data is outputted, is written in a part of the image data or in a specific location of the directory. Contrary to the above, if an output device connected to the system does not require such selection, it is possible to arrange such that a predetermined specific code is supplied to the main controller so as not to execute such a selection. A flag in the header indicating if such a selection is necessary or not is called herein a "dither process selection flag".

Figure 6:
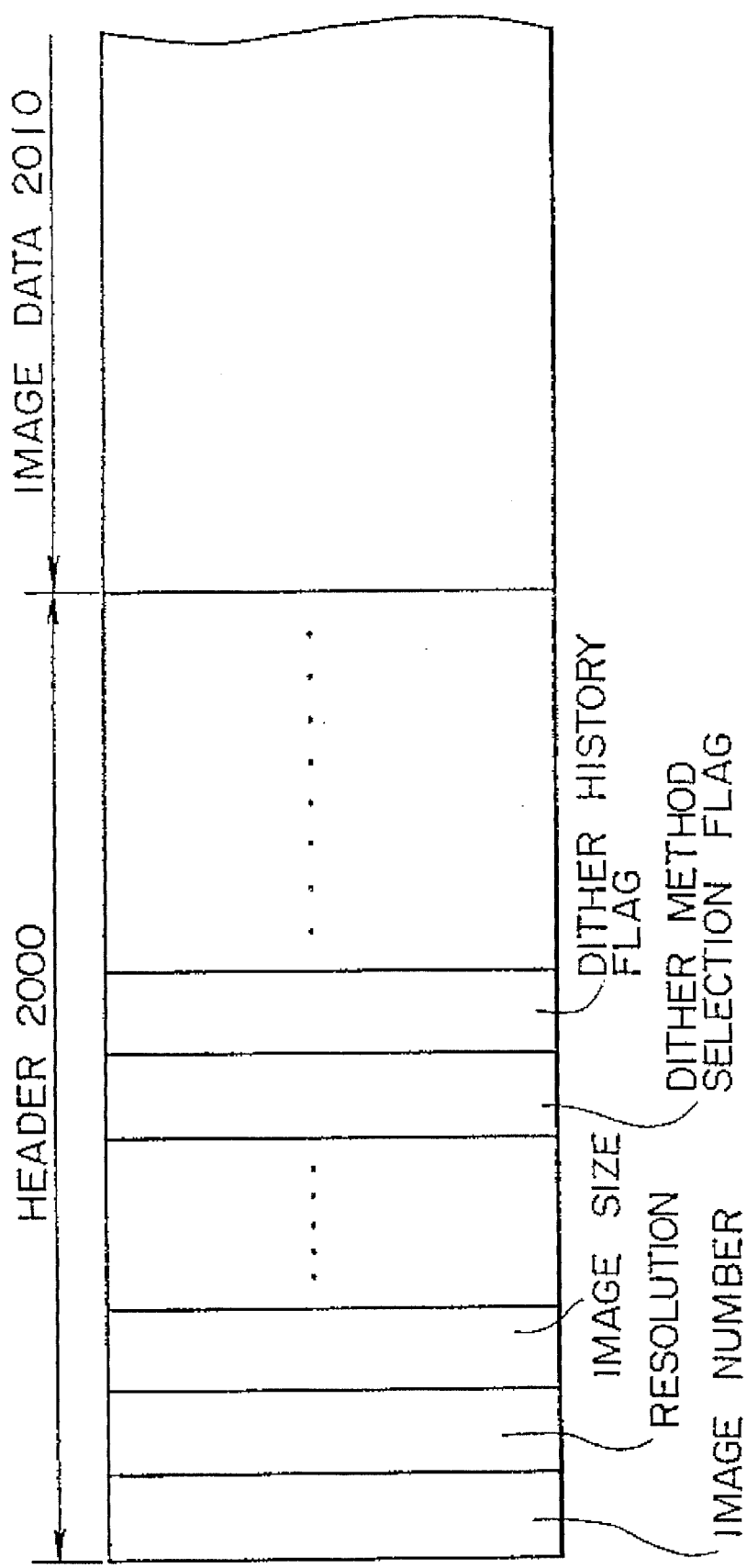
FIG. 6 shows an example of a format of data stored in an image storage memory.
Figure 8A:
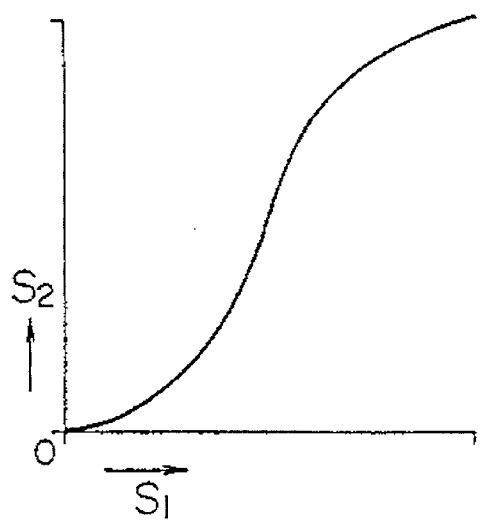
FIGS. 8A to 8D show examples of the characteristics of conversion tables used by a grey scale data converter.
Figure 8B:
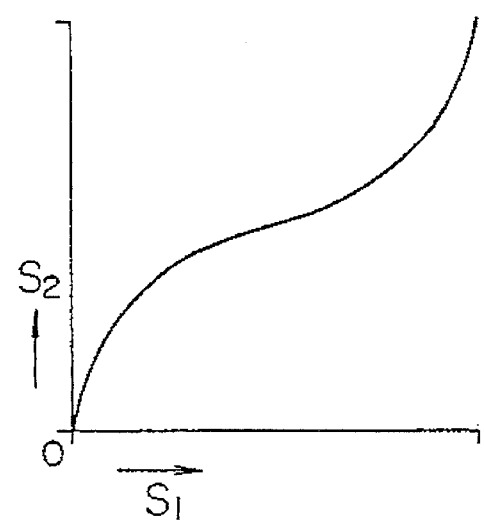
Figure 8C:
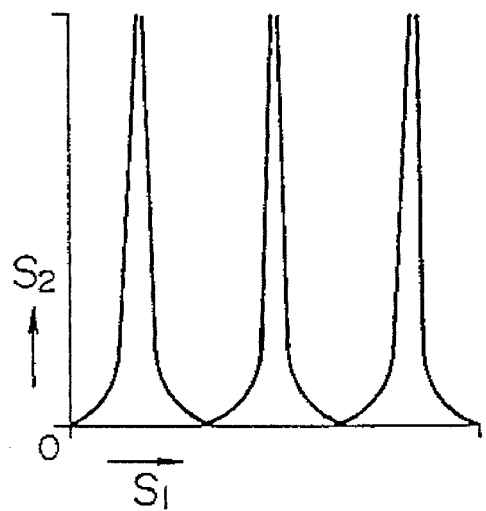
Figure 8D:
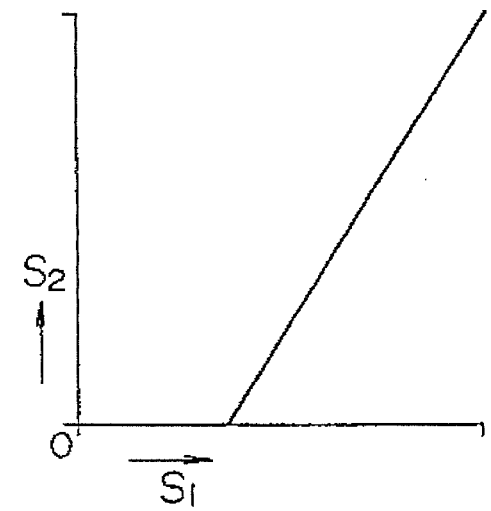

Next, an embodiment of an automatic selection process using the dither process selection flag will be described. FIG. 6 shows an example of data format stored in the image data storage memory. Data are constructed of coded binary image data 2010 and a header 2000, the latter including the structural information of the image data, such as a size, resolution, data amount after coding, and the like. In an actual system, the image data and header may be written consecutively in the physical sense of view in an optical disk, separately in a same optical disk, or in different disks. In this example, as shown in FIG. 6, it is assumed that the image data and header are consecutively written in the image storage memory.

In the case where a printer connected to the system has a poor performance in printing an isolated pixel as described previously, a specific control signal is supplied to the main control unit 70. This control signal may be supplied from the printer, or from a particular combination of key switch settings. If an image is to be outputted, a user first designates the image to thus fetch the corresponding image data inclusive of its header from the image storage memory 30. The header information of the image data is inputted to the main control unit 70. Next, upon issuance of a printer output command, the main control unit 70 checks the content of a dither process selection flag in the header. If a code indicating that an ordered dither process is to be selected at the time of outputting the image data, is written in the flag, and if a control signal indicating that the printer cannot print an isolated pixel, is being supplied to the main control unit 70, then the above-described suitable pseudo half tone process is selected, and the processed result is outputted to the printer 50. However, if the printer connected to the system does not require a selection of a suitable pseudo half tone process, the image data in the buffer memory 20 are directly transferred to the printer 50 because of absence of the control signal instructing such a selection. A user's designation may be used to perform such a selection.

In order to prevent generating moire during image processing, it is necessary to avoid executing plural times a cyclic pseudo half tone process such as an ordered dither method. To realize this, the following process for example may be used. For an image already subjected to binarization through an ordered dither method at the time of inputting an original image or during image processing, or for a screened half tone image, a code prohibiting a use of an ordered dither method is written beforehand in a specific flag in the header. This flag is in this specification called a dither history flag. During image processing, for an image having a code in the dither history flag prohibiting a use of an ordered dither method, a pseudo half tone process without cyclic nature such as an average error minimum method is used during the re-binarization process. With the above process, it is possible to output a pseudo half tone image without moire.

The above process can be conducted through detection of the content of the dither history flag by the main control unit 70, similar to the above-described selection process for a suitable pseudo half tone image process. Also, where an inputted image is once subjected to an affine transformation and written again in the image storage memory 30, with an ordered dither method having been used during image processing, the content of dither history flag in the header of the image to be outputted is changed to a code prohibiting a use of the ordered dither method.

In the above manner, it is possible to avoid using twice the pseudo half tone process through an ordered dither method.

In the actual system to which an image input means for inputting a document or the like, such as the image scanner 10 shown in FIG. 1, is connected, image data are processed as in the following to obtain a high precision image quality. A document image is inputted using the image scanner 10 in the form of multivalued digital data which has been binarized at a binarization unit 11 provided in the image scanner 10. In this case, a line image region of the document image is binarized using a fixed or invariable threshold, whereas a half tone image region is subjected to a pseudo half tone image process. Switching between them may be effected by various known means.

In the present embodiment, as the pseudo half tone image process, a pseudo half tone image process without no cyclic nature, such as an average error minimum method is used. Binarized image data are stored in the image storage memory 30 such as an optical disk. The image in the line image region is subjected to a known encoding process at the coding/decoding unit 32 so as to be stored as coded data. On the other hand, the pseudo half tone image data are stored as they are without subjecting them to a coding process. Switching between them can be effected also using known means. Thus, data can be efficiently stored in the image storage memory 30.

In case where the stored composite image data are to be outputted after magnification or reduction, first the image data to be outputted are transferred from the image storage memory 30 to the buffer memory 20. Next, the composite image data in the buffer memory 20 are subjected to an affine transformation at the image processor 100 in the manner as described previously, and outputted to the printer 60 or the like. During the above image processing, the pseudo half tone image in the composite image is binarized through an ordered dither method at the re-binarization unit 420.

As a result, even if a half tone image such as a photograph stored as pseudo half tone image data is magnified or reduced at a desired magnification factor, it is possible to output a pseudo half tone image through an ordered dither method without moire. In other words, according to the present invention, even after an image has been stored as a pseudo half tone image, a screened half tone image can be obtained at a desired magnification. Therefore, if a document or the like is once stored in the image storage memory 30, a screened half tone image can be obtained thereafter at any magnification factor. Thus, an original size image data only suffice no matter what size image is needed thereafter.

Next, a process of converting a density of a pseudo half tone image will be described by way of example with reference to FIG. 1. A particular operation during a pseudo half tone image process will be described later in detail with respect to the dither image processing unit 300.

First, the description is directed to the case where the density of a pseudo half tone image is converted in accordance with the characteristic of an output device. Generally, the density characteristic of an outputted pseudo half tone image is not linear. Thus, this density conversion process is used to adjust the density of a pseudo half tone image in accordance with the characteristic of an output device.

It is assumed by way of example that an image (hereinafter called image C) inclusive of a pseudo half tone image stored in the image storage memory 30 is outputted to an output device 50 such as a printer. A user first designates the main control unit 70 to objective image C, using the keyboard 75. Upon this designation, the main control unit 70 transfers the image C data from the image storage memory 30 to the buffer memory 20. The data inputted to the buffer memory 20 are sequentially inputted to the image processor 100. In the image processor 100, the line image processing unit 500 and dither image processing unit 300 performs respective processes. In the dither image processing unit 300, the data converter 310 calculates a multivalued dither image data $S_1$ based on the inputted binary image data. At the gray scale data converter 380, the data $S_1$ are converted into multivalued dither data $S_2$ so as to match the density characteristic of the printer and, thereafter, the data $S_2$ are binarized through a pseudo half tone process selected at the re-binarization unit 420. On the other hand, the line image processing unit 500 outputs the inputted image data as they are, while regarding the process as an equal magnification.

Similar to the magnification process and the like described previously, one of the outputs from the line image processing unit 500 and dither image processing unit 300 is selected for each pixel in accordance with the discrimination result, and outputted to the printer 50 as the output of the image processor 100. Therefore, a pseudo half tone image after the density conversion is outputted from the printer 50.

The conversion characteristic of the gray scale data converter 380 is set in accordance with the characteristic of an output device. For instance, if the characteristic of a printer connected to the system is as shown in FIG. 7A, the gray scale converter 380 performs a conversion process in accordance with the input/output characteristic shown in FIG. 7B to thereby adjust the density characteristic of a pseudo half tone image to be outputted from the printer.

Taking the density characteristic of a printer as $B=f(S_1)$ and the input-output characteristic g as $S_2=g(S_1)$, then a relation between f and g is given by:

$$g(x)=1/f(x)$$

In an actual system, a plurality of different type output devices having a different characteristic are connected to the system. Therefore, a plurality of different type conversion data for those output devices which are likely to be connected to the system are prepared in a conversion table memory 85 so that data suitable for a particular output device can be down loaded into the conversion table in the gray scale converter 380. The above process may be performed automatically in such a way that a signal specific to each printer is supplied to the main control unit 70, and the data corresponding to the signal are down loaded.

Further, the values in the conversion table of the gray scale converter 380 may be set as desired or may be set in accordance with the calculation result of image data. By doing so, the following output image can be obtained.

First, use of the conversion tables with the input/output characteristics as shown in FIGS. 8A to 8D, results in the following output images. A high contrast image can be obtained with the input/output characteristic of FIG. 8A, and a low contrast image with FIG. 8B. An image whose particular portions only at specific densities are made black, nearly like an image with contour lines, can be obtained with FIG. 8C. An image, e.g., a white background photograph image converted from a gray background image, can be obtained with FIG. 8D. The values of these conversion tables and those of the conversion tables for respective printers may be multiplied together at the main control unit 70 to use the resultant values for conversion tables.

Next, as an example of a process of setting the content of a conversion table through calculation of image data, the case where a part of the histogram of an image is normalized, will be described. First, image data to be processed are transferred to the buffer memory and displayed on the image display 60. A user designates a region of the displayed image to be referred to, by using a mouse or the like. The main control unit 70 causes the data of the designated region to be inputted to the image processor 100 to thereby generate multivalued image data at the grey scale converter 320 in the dither image processing unit 300. The multi-valued image data are inputted to a histogram unit 87 whereat a histogram of the inputted multivalued image data is formed by a known means. After the half tone image data have been obtained for each pixel in the designated region, the main control unit 70 calculates a conversion table for normalizing the histogram formed by the histogram unit 87 and transfers it to the conversion table in the grey scale converter 380. The following process is similar to that of the density conversion process described previously.

In the present embodiment, various image processings have been described by using image data already stored in the image storage memory. If only the image data are binary digital image data, the invention is also applicable to such image processings. Thus, image data already stored in an image data base, or image data inputted through a communication line, may be used. Also usable are image data which are inputted as digital image data through an electronic camera, video camera, or image scanner and converted into binary image inclusive of a pseudo half tone image.

Figure 9:
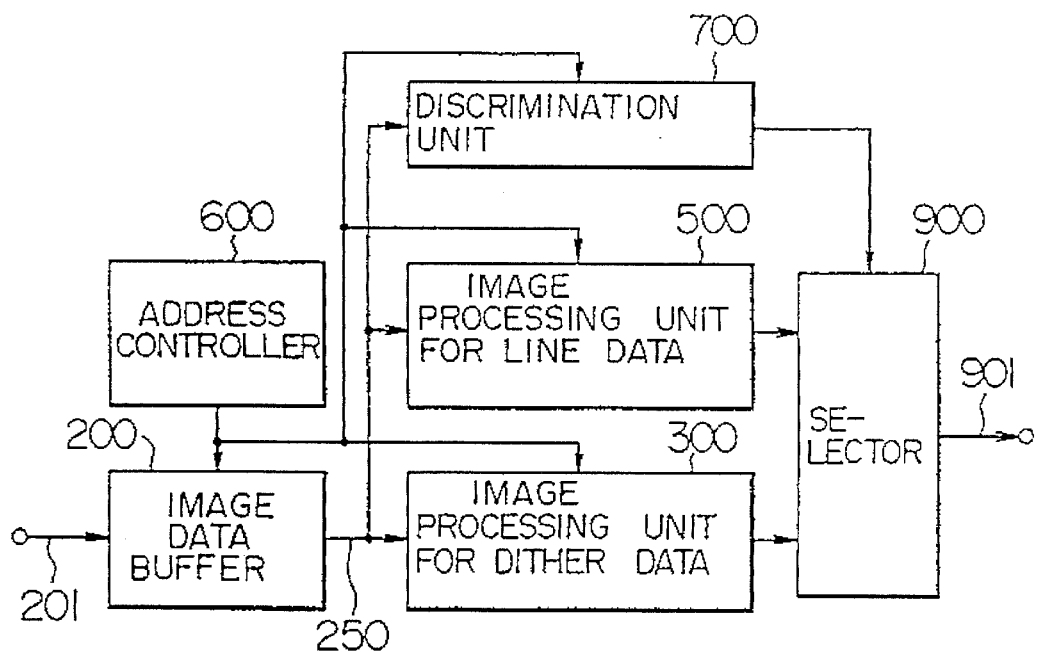
FIG. 9 is a block diagram showing an example of the circuit arrangement of an image processor of this invention.

Next, the image processor 100 will be described in detail. FIG. 9 is a block diagram showing an example of the circuit arrangement of the image processor 100. In the image processor 100, an image data buffer 200 stores inputted binary image data by the amount of scan lines necessary for image processing, and outputs the binary image data of the necessary local region at a time. A data bus 250 is used for parallel transfer of binary image data of a plurality of pixels sent from the image data buffer 200. The dither image processing unit 300 performs various pseudo half tone processes for binary data suitable for a particular pseudo half tone image. The line image processing unit 500 performs affine transformation such as magnification, reduction, rotation or the like for binary data suitable for a particular line image such as a character. The discrimination unit 700 discriminates if each pixel of an image to be outputted is included in a pseudo half tone image or in a line image. The address counter 600 supervises an address of image data to be inputted and outputted. The selector 900 selects one of the outputs from the dither image processing unit 300 and line image processing unit 500 depending upon an output from the discrimination unit 700 and outputs the selected one. Thus, the inputted image can be outputted after subjected to a suitable process.

First, the image data buffer 200 will be described.

Figure 10:
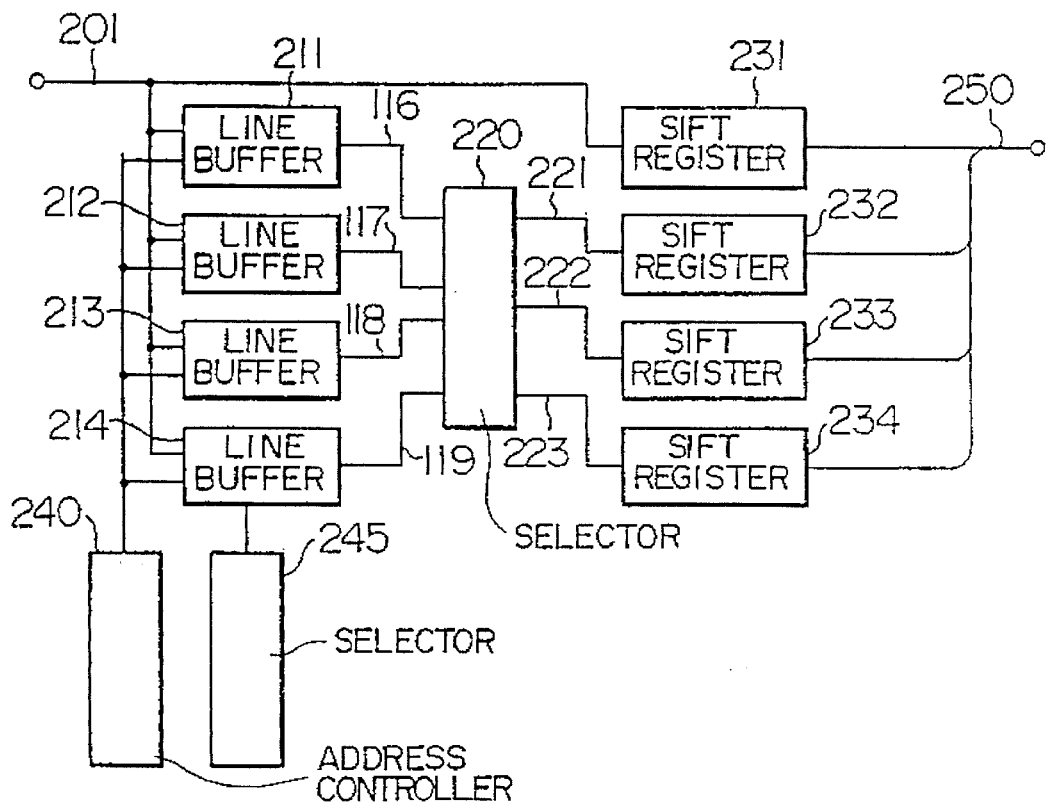
FIG. 10 is a block diagram showing an example of a scan window by which density data are restored.

FIG. 10 shows an example of the detail of the internal circuit arrangement of the image data buffer 200. In this circuit, it is assumed that the image processing requires image data corresponding in amount to four scan lines by way of example. Line buffers 211, 212, 213 and 214 each store image data for one scan line. A selector 220 selects three of the outputs from the four line buffers, and outputs them to respective signal lines 221, 222 and 223. Shift registers 231, 232, 233 and 234 each store a predetermined amount of binary data. An address counter 240 is used for the four line buffers 211 to 214. A selector 245 selects one of the four line buffers to which image data are written. The data bus 250 is used for parallel transfer of image data from the shift registers.

In operation, image data are inputted via a signal line to the shift register 231 and to one of the four line buffers 211 to 214, selected by the selector 245. An output of the selector 245 changes every time image data of one scan line are inputted so that the line buffer with image data written therein is sequentially changed. Inputted image data are hereinafter called original image data.

It is assumed that the selector selects the line buffer 214, and image data P(i, j) is inputted. The image data P(i, j) is inputted to the shift register 231 and line buffer 214. Image data at y=j−3, y=j−2 and y=j−1 have already been stored in the line buffers 211 to 213, respectively.

After the image data P (i, j) has been written, data are read out from each line buffer. At this time, an output from the address counter is i same as that when the image data now concerned was written. Therefore, P(i, j−3), P(i, j−2), P(i, j−1) and P(i, j) are sent to the selector 220 via signal lines 216 to 219.

The selector 220 selects P(i, j−3), P(i, j−2) and P(i, j−1) among the four pixel image data and sends them to the shift registers 232, 233 and 234. Consequently, the shift registers 231 to 234 have P(i, j), P(i, j−1), P(i, j−2) and P(i, j−3) inputted therein, respectively.

The selector 220 always operates such that a pixel image data is sent to the shift registers 234, 233 and 232 in this order starting from a smaller y address. Therefore, for instance, if an image data P(i, j+1) is sent via the signal line 201, the shift registers 231, 232, 233 and 234 have P(i, j+1), P(i, j), P(i, j−1) and P(i, j−2) inputted therein, respectively.

The four shift registers 231 to 234 constitute a latch train for storing image data having pixels necessary for the process to be described later. The number of stages of each shift register is determined in accordance with the size of a window to be used. In this embodiment, a shift register composed of 17 stages is used by way of example. Thus, the four shift registers 231 to 234 store binary image data of 68 pixels. For instance, if an image data P (i, j) is inputted to the shift register 231 via the signal line 201, the four shift registers 231 to 234 have image data P(m, n) where i−16≦m≦i and j−3≦n≦j, the image data being sequentially sent in parallel to the data bus 250.

Using the image data sent via the data bus 250, image processing is performed by the image processor 300, line image processing unit 500 and discrimination unit 700.

Next, the dither image processing unit 300 which is the gist of the present invention will be described in detail.

Figure 11:
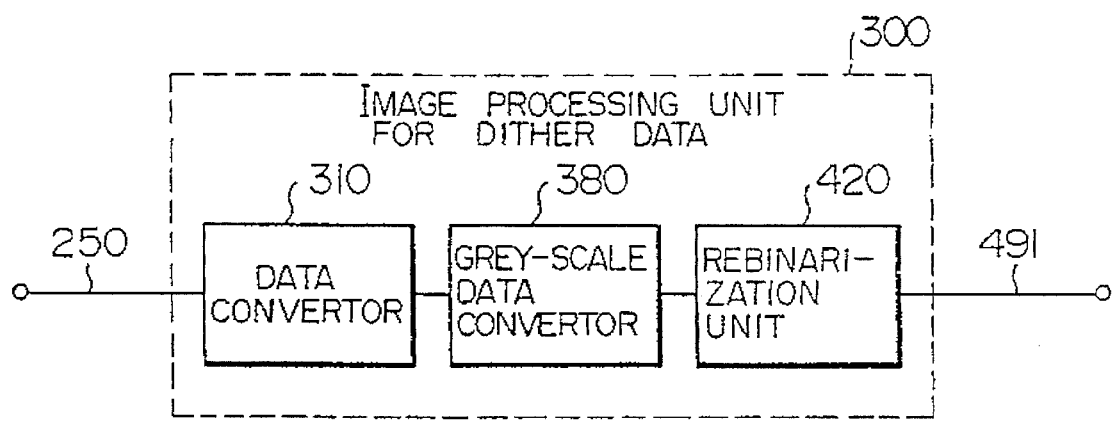
FIG. 11 is a block diagram showing the circuit arrangement of a dither image processing unit.

FIG. 11 shows the internal circuit arrangement of the dither image processing unit 300 according to the present invention. The data converter 310 obtains multivalued half tone image data Sp(x, y) representative of the density information of each pixel, based on the binary image data P(i, j) of a plurality of pixels. The grey scale data converter 380 makes the half tone image data Sp(x, y) undergo grey scale conversion to thus obtain multivalued grey scale converted image data $S_2(x, y)$. The re-binarization unit 420 converts again the half tone image data Sq(x, y) outputted from the grey scale data converter 380 through pseudo half tone process to thus obtain binary image data $Q_1(x, y)$. The binarized data are outputted to a signal line 491 as the output image data.

Figure 2:
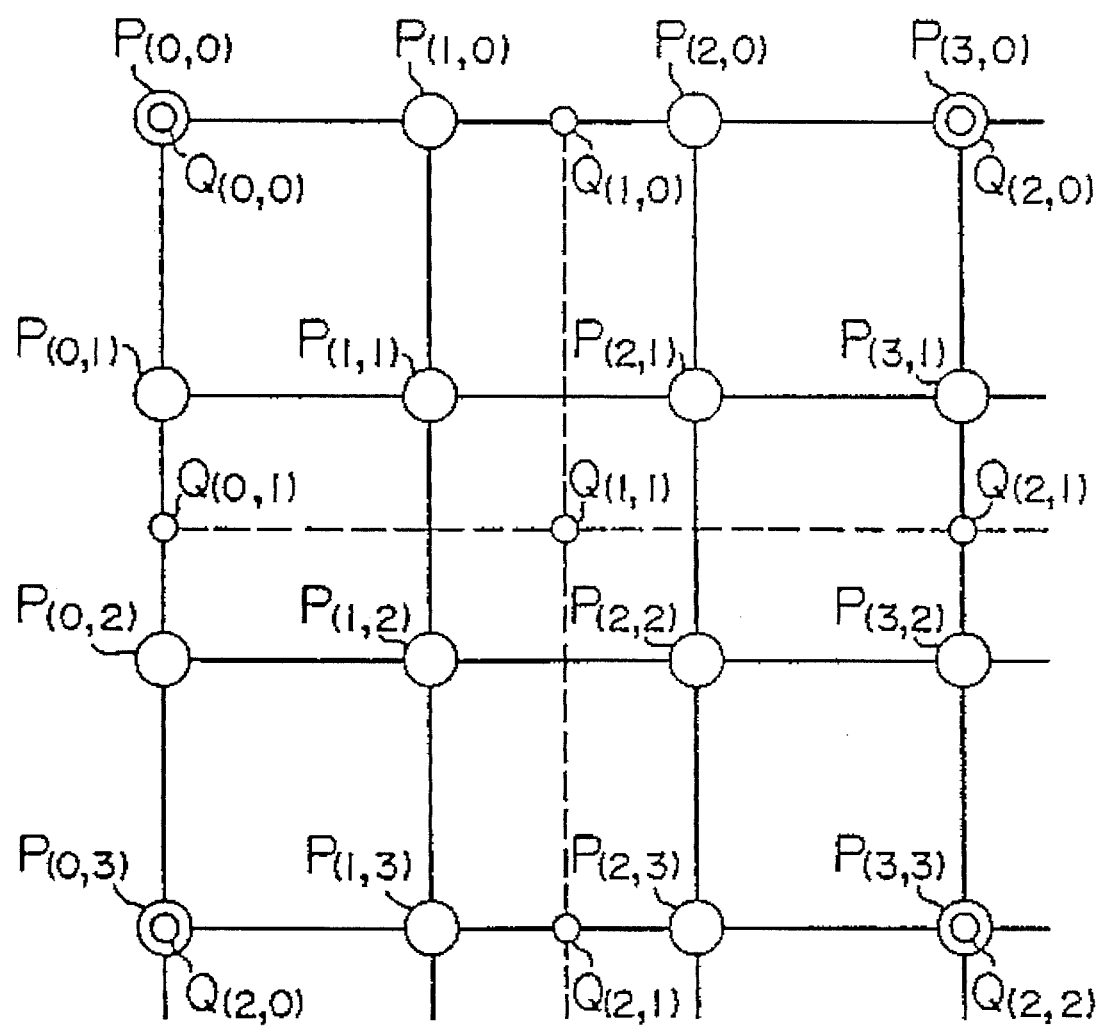
FIG. 2 shows the positional relationship between an original image and a reproduced image during a line density conversion process.

The function of the above units will be described taking as an example the case where a pseudo half tone image P(i, j) is subjected to a reduction process which is one type of affine transformation to thus output a pseudo half tone image Q(i, j). The positional relation between the original image P(i, j) and the output result Q(i, j) is assumed to be that shown in FIG. 2.

(1) Data converter 310: It scans the original binary image data P(i, j) within a scan window of M×N pixels, and calculates the distribution of black pixels within the scan window at each re-sampling point (at points Q in FIG. 2) at a certain conversion factor, to thereby output a multivalued half tone image Sp.

(2) Grey Scale Data Converter 380: It performs multivalued half image processings such as density conversion for the multivalued half tone image Sp. The content of a conversion table is changed in accordance with the device connected to the system, e.g., by down loading the content of the conversion table 85 shown in FIG. 1.

(3) Re-binarization Unit 420: It binarizes the processed result of the half tone image data through a pseudo half tone process to obtain binarized image data Q. The pseudo half tone process is arranged to be selectable from a plurality of such processes in accordance with an output device or an image to be processed.

Next, the grey scale data converter 310 of the dither image processing unit 300 will be described.

The principle of restoring a half tone image from original binary image data will be described first. The density of a point on a pseudo half tone image is, when a person observes it, dependent upon the distribution of black pixels near the point. As a result, while an original image is scanned within a scan window of a certain size, the density at each re-sampling point of the image can be determined if the distribution of black pixels near the re-sampling point is detected. For instance, the case shown in FIG. 12 will be described wherein the size of a scan window is 4×4 pixels and the re-sampling points take the positions shown in FIG. 12 relative to the original image data. In this case, the density at point A is determined based on the distribution of black pixels within the scan window of point A. The scan window moves in units of pixel of the original image so that the scan window is positioned such that it includes re-sampling point A within central four points $W_{22}$, $W_{23}$, $W_{32}$ and $W_{33}$. The density at re-sampling point A is obtained as the sum of values $P(x-1, y-1)$ to $P(x+2, y+2)$ of the original image within the scan window each weighted in correspondence with its position. The weight coefficient is determined in accordance with the distance between re-sampling point A and each pixel. FIG. 13 shows an example of weight coefficients.

Figure 12:
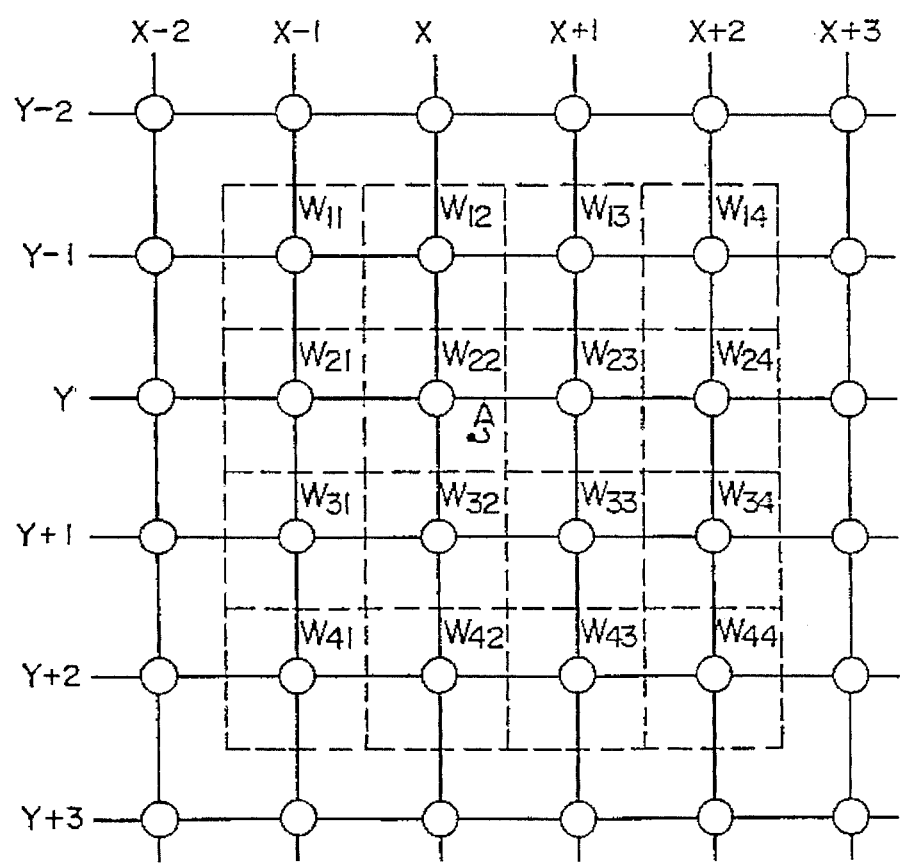
FIG. 12 illustrates a region of image data referred to during half tone image conversion.
Figure 15A:
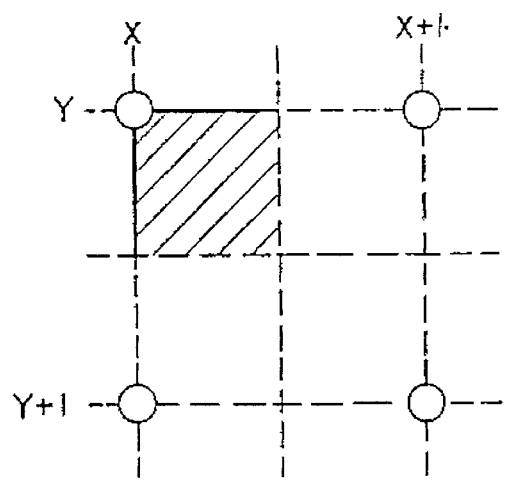
FIGS. 15A to 15D illustrate the positional relationship between selected weight coefficients and the relative position of an output image relative to an input image.
Figure 15B:
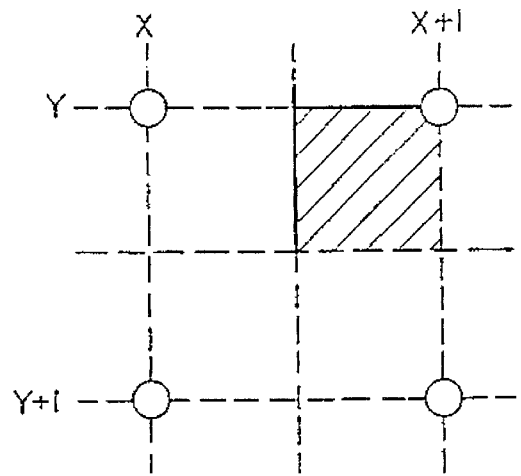
Figure 15C:
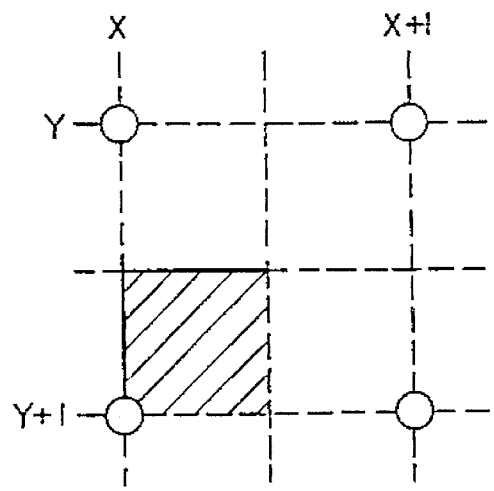
Figure 15D:
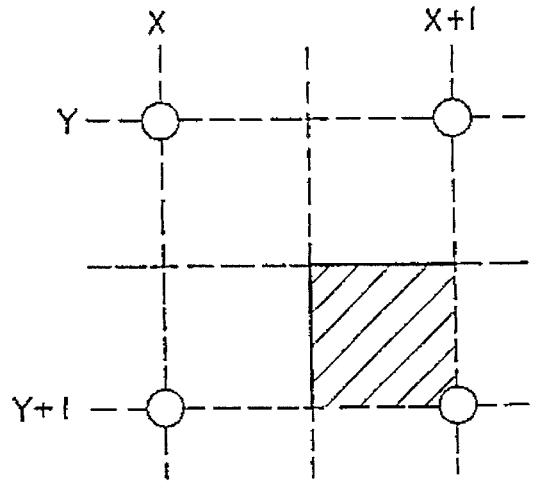

In obtaining a restored image data $Sp(x_1, y_1)$ at point A shown in FIG. 12, data of 16 pixels around the center coordinate point $(x_1, y_1)$ of the original image as shown in FIGS. 14A to 14D are referred to. Thus, the dither image processing unit 300 receives image data of 16 pixels on 16 lines of the data bus 250 sent from the image data buffer 250. The received image data are 16 pixel data $P(x_1, y_1)$ where $i-10 \leq x_1 \leq i-7$ and $j-3 \leq y_1 \leq j$ (hereinafter, these data are indicated as $W_{11}$ to $W_{44}$ as shown in FIG. 12).

A more precise grey scale data converter can be realized by changing weight coefficients at each re-sampling point. In such a case, the dither image processing unit 300 uses 16 pixel image data as well as the small value portion of the calculated result at each re-sampling point.

The binary image data ($W_{11}$ to $W_{44}$) of 16 pixels are inputted to the data converter 310. The data converter 310 calculates the restored image data $Sp(i_1, j_1)$ of the re-sampling point A, based upon the binary data of 16 pixels and the weight coefficients determined by relative position of the re-sampling point A to the original image.

The relationship between the weight coefficients and the relative position of the re-sampling point relative to the original image will be described with reference to FIGS. 14A to 14D and FIGS. 15A to 15D, taking as an example the case where the position of the re-sampling point A within the central four points $W_{22}$, $W_{23}$, $W_{32}$ and $W_{33}$ within the scan window is identified using a resolution factor of ½ of the original image. If the position of the re-sampling point A is within the hatched portions in FIGS. 15A to 15D, the weight coefficients take the values as shown in FIGS. 14A to 14D, respectively. As to the border lines of each region shown in FIGS. 15A to 15D, a point on a solid line is included within the corresponding region, and a point on a broken line is not included within the corresponding region. In this case, the data converter 310 uses one bit, in both X and Y directions, of the small value portion of the calculation result at the resampling point A.

Figure 16:
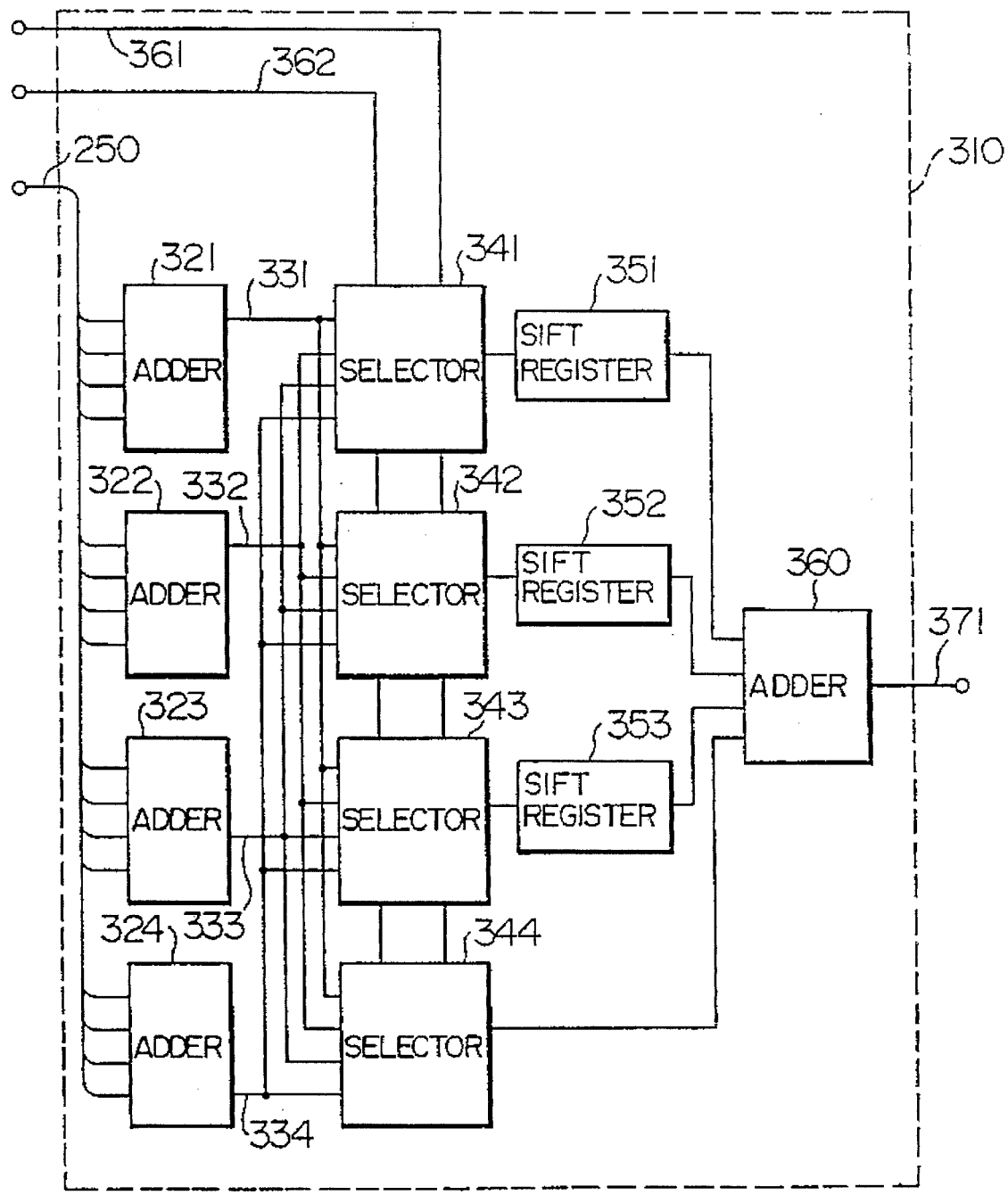
FIG. 16 is a block diagram showing an example of the arrangement of a data converter.

FIG. 16 shows an example of a detailed circuit arrangement of the data converter which changes the weight coefficients. The binary data ($W_{11}$ to $W_{44}$) of 16 pixels are grouped into four sets of data at the data converter 310 and inputted to four adders 321 to 324 which calculate the inputted binary data of 16 pixels to obtain multivalued data $Sp(i_1, j_1)$, $Sq(i_1, j_1)$, $S_3(i_1, j_1)$ and $S_4(i_1, j_1)$ using the following equations:

$$Sp(i_1, j_1) = W_{11} + 2 \times (W_{12} + W_{21}) + 4 \times W_{22}$$

$$Sq(i_1, j_1) = W_{14} + 2 \times (W_{13} + W24) + 4 \times W_{23}$$

$$S_3(i_1, j_1) = W_{41} + 2 \times (W_{31} + W_{42}) + 4 \times W_{32}$$

$$S_4(i_1, j_1) = W_{44} + 2 \times (W_{34} + W_{43}) + 4 \times W_{33}$$

The adders each are constructed of a same logical circuit.

The outputs $Sp(i_1, j^1)$, $Sq(i_1, j_1)$, $S_3(i_1, j_1)$ and $S_4(i_1, j^1)$ from the adders 321 to 324 are sent via signal lines 331 to 334 to four selectors 341 to 344.

An output from the selector 341 is shifted by 2 bits by a shift register 351, the outputs from the selectors 342 and 343 are shifted by one bit by selectors 352 and 353, respectively, and an output from the selector 344 is not shifted. All the outputs are sent to an adder 360.

The adder 360 adds the inputted data together and outputs the restored density data $Sp(i_1, j_1)$ at the re-sampling point A to signal line 371.

The selectors 341 to 344 are controlled in accordance with the position of the re-sampling point A, and operates in accordance with the small value portion of the address calculation result inputted via signal lines 361 and 362 from the address counter 600.

With the above processes, the multivalued half tone image data Sp can be obtained, with binary image data of 16 pixels near each re-sampling point multiplied by weight coefficients shown in FIGS. 14A to 14D.

The above processes may be conducted using a single read-only memory (ROM) by using signal lines 250, 361 and 362 as address lines thereof. The capacity of the ROM will be 7 bit×$2^{18}$.

If the weight coefficients are held at fixed values, the coordinate information of a re-sampling point is not needed and the binary image data only are inputted.

The size and shape of a window used in obtaining restored image data is optional as described above. For example, for a rotation process with rotary angle θ, a parallelogram suitable for angle θ may be used.

The line density conversion such as magnification and reduction may be realized by controlling the operation timing of the data converter. For instance, in a conversion process at a conversion factor r/R in the X direction, the restored density data are outputted r times while the image data are inputted to the image data buffer 200 R times. The same process is performed also for the Y direction.

Figure 17:
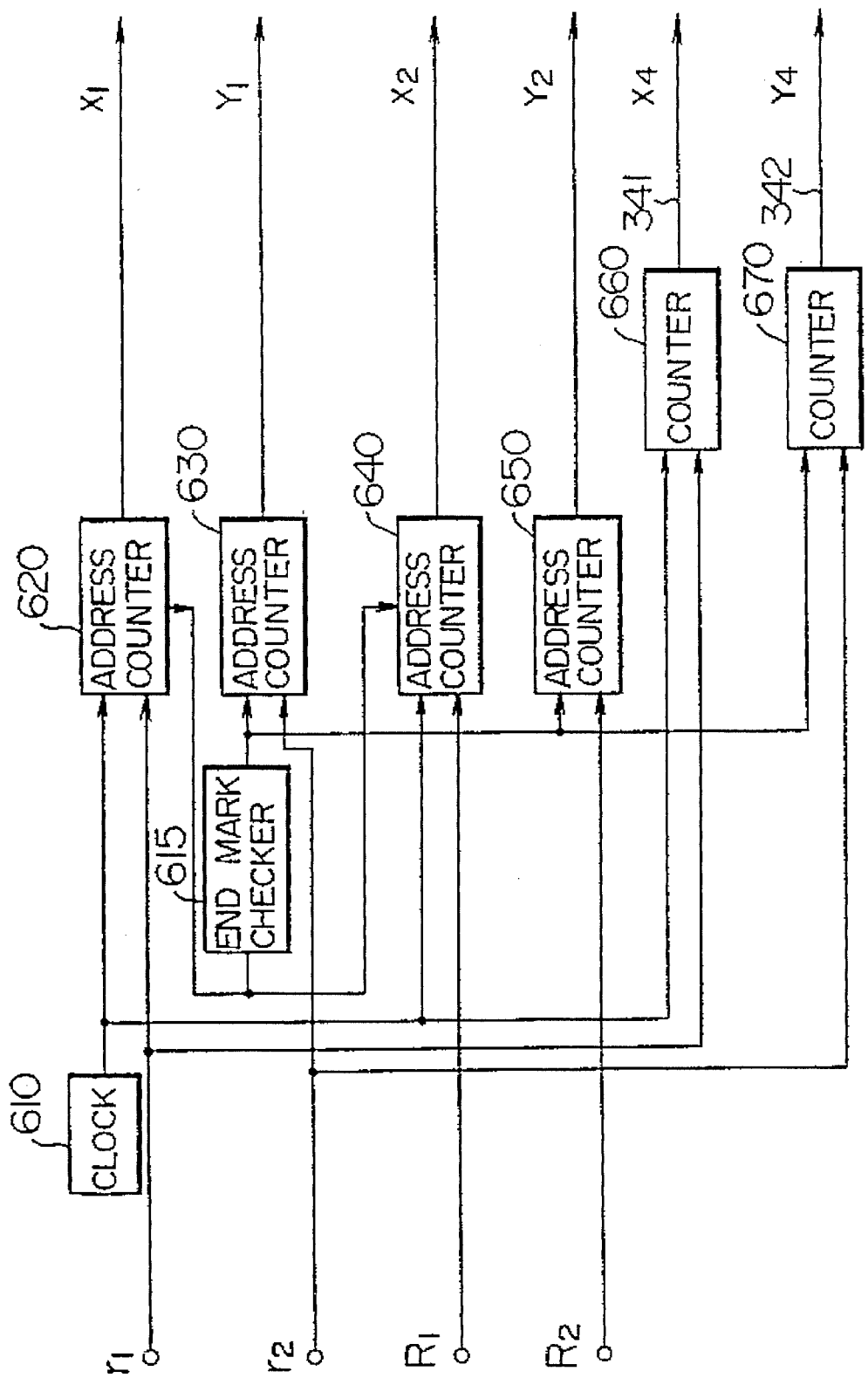
FIG. 17 is a block diagram showing an example of the circuit arrangement of an address controller of the image processor.

In particular, for the reduction process where a reproduced image of $x_1 \times y_1$ pixels is reduced in size at a reduction factor of $r_1/R_1$ in x direction and $r_2/R_2$ in y direction to obtain a reduced image of $x_2 \times y_2$ pixels, the operation of the address controller 600 will be described with reference to FIG. 17. In FIG. 17, a clock 670 outputs master clocks, and address counters 620 and 630 count addresses $x_2$ and $y_2$ of the multivalued data to be outputted, whereas address counters 640 and 650 count addresses of $x_1$ and $y_1$ of the inputted multivalued data, respectively. In the case of the reduction process at a reduction factor of $r_1/R_1$ in x direction and $r_2/R_2$ in y direction, the multivalued data are inputted every $r_1$-th reference pulse, and the multivalued data to be outputted are determined every $R_1$-th reference pulse. Therefore, the address counters 620 and 640 operate every $r_1$-th and $R_1$-th reference pulses, respectively. It is also necessary to advance the address of the output multivalued data in the sub scan direction by $R_2/r_2$ every time the input multivalued data of one scan line are read. Therefore, after the address counter 620 completes the count operation of addresses for one scan line, an end mark checker 615 outputs pulse signals $r_2$ times. The pulse signal from the end mark checker 615 is called a line pulse hereinafter. The address counters 630 and 650 operate once for $r_2$ and $R_2$ line pulses, respectively. It is to be noted that in order to determine the output multivalued data $Sq(x_2, y^2)$, it is necessary that the input multivalued data $Sp(x_1+1, y_1+1)$ have already been inputted. Thus, it is necessary to read the input multivalued data, one pixel before an output from the address counter 620 and one line before an output from the address counter 630. To allow an optional conversion factor, it is necessary to make it possible to externally set all the values of $r_1$, $R_1$, $r_2$ and $R_2$. However, in practical use, the values of $r_1$ and $r_2$ may be set at relatively large fixed values without any problem. Therefore, in this embodiment, the values of $R_1$ and $R_2$ only are arranged to be externally set. Counters 660 and 670 are incremented in response to the reference pulse and line pulse, respectively, and reset to 0 when $r_1$ and $r_2$ pulses are inputted thereto, respectively. Taking the outputs from the counters 660 and 670 as $x_4$ and $y_4$, the weight coefficients $\beta(\Delta x, \Delta y)$ are given by:

$$\Delta x = x_4/r_1$$

$$\Delta y = y_4/r_2$$

if the values $r_1$ and $r_2$ are constant, the values $x_4$ and $y_4$ themselves can be supplied via signal lines 341 and 342 to the coefficient determining unit 340 to determine the weight coefficients.

The reduction process can be realized with the above construction. The circuit arrangement and operation of a magnification process are quite the same as those of the reduction process.

Next, the grey scale data converter 380 will be described in detail. The grey scale data converter 380 changes the densities of the multivalued image data, and adjusts the density characteristic of a pseudo half tone image of an output device for example.

A method of realizing the grey scale conversion process will be described in detail. In the grey scale conversion, restored image data $S_1(x, y)$ are converted into nonlinear image data $S_2(x, y)$. The relation between both data can be determined previously in accordance with the characteristic of each input/output device, user's preference or the like. An example of a conversion formula is given in the following:

$$S_2(x, y) = f\{S_1(x, y)\}$$

$$f(u) = v \times (u/v)^\gamma$$

where $v \leq S_1 \max (u)$

This process can be realized using a conversion table in a memory. If the variable $\gamma$ is assumed constant, then the process can be realized using a ROM, logical circuits or the like.

If the content of a conversion table is made changeable by using a RAM or the like, the values of the table can be down loaded from the external conversion 85 shown in FIG. 1. In this case, the conversion table 85 may be arranged to store such values as can adjust the density characteristic of a device likely to be connected to the system. With such arrangement, the density characteristic of a unit actually connected to the system can be compensated by using the values for that particular unit.

It is also possible, upon external designation of the variable $\gamma$, to use the calculation result as the conversion table, make uniform the histogram at a part of image region, emphasize a particular region having a certain density, freely control the region of image data $S_2$ to be converted, or etc. Such process may be performed simultaneously when the affine transformation is performed.

If the number of bits are same for both the restored density data $S_1$ and converted image data $S_2$ after the grey scale conversion, there occurs sometimes that the grey scale of the image is lowered. For instance, assuming that the number of bits is 4 for both the restored density data $S_1$ and converted image data $S_2$ and the conversion table shown in FIG. 18 is designated, the restored density data $S_1$ having 16 grey scales results in a converted image data $S_2$ having 10 grey scales. The reason for this is that as seen from the region of $S_1$ smaller than 6, there is a region where an increment of the inputted value $S_1$ by 1 correspond to an increment of the output value $S_2$ by more than 2.

Figure 19:
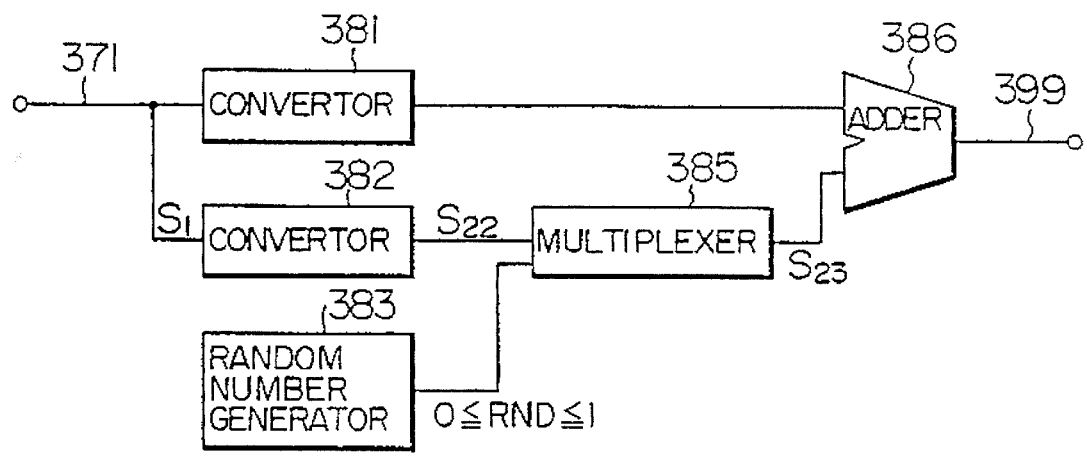
FIG. 19 is a block diagram showing an example of a circuit arrangement used for preventing degrading a grey scale during grey scale data conversion.

An example of a method of avoiding such lowering of a grey scale will be described next. According to this method, with the input/output relation shown in FIG. 18 for example, the value of the output $S_2$ for the input $S_1$ is fixed at 4 or changed to 5. An example of the circuit arrangement of the grey scale data converter 380 performing such function is shown in FIG. 19. In FIG. 19, reference numerals 381 and 382 denote converters which store conversion tables in a memory or the like, reference numeral 383 denotes a random number generator for generating a random number by known means, 385 a multiplexer, 386 an adder, and 399 a signal line from which converted image data are outputted.

The process performed by the circuit arrangement shown in FIG. 19 will be described with the table shown in FIG. 18 being used for the conversion. The converter 31 receives a value $S_1$ and outputs:

$$S_{21} = f(S_1)$$

The converter 382 receives a value $S_1$ and outputs:

$$S_{22} = f(s_1+1) - f(S_1)$$

The random number generator 383 generates a real value RND in the range of $0 \leq RND \leq 1$.

The adder 385 adds the integer $S_{22}$ and a real number RND to output an integer $S_{23}$. Thus, with an input of $S_1=1$, a value of 0 or 1 is inputted to the adder 386 as $S_{23}$. Therefore, the adder 386 adds $S_{21}=4$ and $S_{23}$ together and outputs the converted density data $S_2$ of 4 or 5. With the above method, it is possible to prevent lowering the grey scale of an image during the grey scale conversion.

Contrary to the above, the number of bits in the succeeding processes may be reduced by lowering the grey scale after the conversion.

Figure 20:
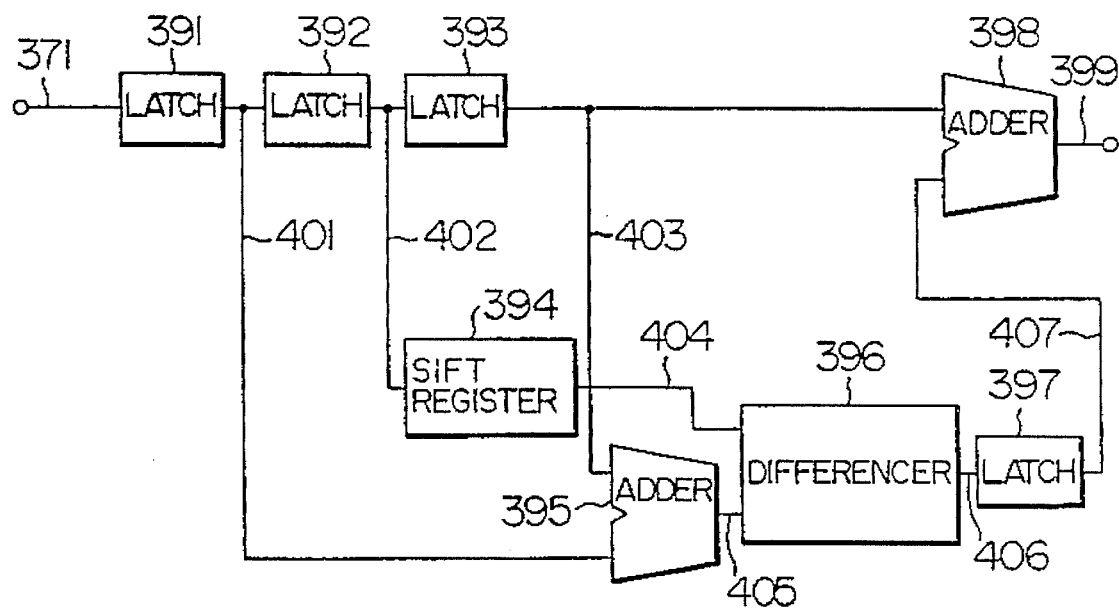
FIG. 20 is a block diagram showing an example of a circuit arrangement for performing a contour emphasis of an output from the data converter.

A local region of a half tone image may be temporarily stored in the grey scale conversion process, an example of which is shown in FIG. 20. Latches 391, 392, 393 and 397 hold multivalued image data for one clock time, and a shift register 394 shifts the multivalued image data to multiply it by 2. Reference numerals 395 and 398 denote an adder, 396 a differencer, and 399 a signal line for outputting the processed result.

In operation, as the restored image data $S_1(x, y)$ is inputted from the signal line 371, the latches 391, 392 and 393 output $S_1(x-1, y)$, $S_1(x-2, y)$ and $S_1(x-3, y)$ to signal lines 391, 392 and 393, respectively.

The adder 395 adds $S_1(x-1, y)$, and $S_1(x-3, y)$ together to output the result $S_{12}$ to a signal line 405, which is given by:

$$S_{12} = S_1(x-1, y) + S_1(x-3, y)$$

The shift register 392 shifts $S_1(x-2, y)$ from the latch 392 to output a multivalued data $S_{22}$ to a signal line 404, which is given by:

$$S_{22}=2\times S_1(x-2, y)$$

The differencer 396 receives $S_{12}$ and $S_{22}$ from signal lines 404 and 405 to output $S_{23}$ which is given by:

$$S_{23}=S_{21}-S_{22}=2\times S_1(x-2, y)-S_1(x-1, y)+S_1(x-3, y)$$

The output $S_{23}$ is latched by the latch 397 for one clock time. The adder 398 adds $S_{23}$ and $S_1(x-2, y)$ and outputs the converted data $S_2$ to the signal line 399. The converted data $S_2$ is outputted with a delay of three clocks relative to the inputted image data.

In this embodiment, the output result $S_2$ (x-3, y) becomes:

$$S_2(x-3, y)=3\times S_1(x-3, y)-S_1(x-2, y)+S_1(x-4, y)$$

Next, the operation of the re-binarization unit 420 will be described in detail, wherein the multivalued image data after the data conversion process are binarized to obtain binarized image data. In binarizing the data conversion result, conventional various binarization processes may be applied. Therefore, by preparing various binarization processes and selectively using a suitable one upon external designation thereof or by other means, it becomes possible to obtain an image matching the characteristic of an output device or a user's preference.

Figure 21:
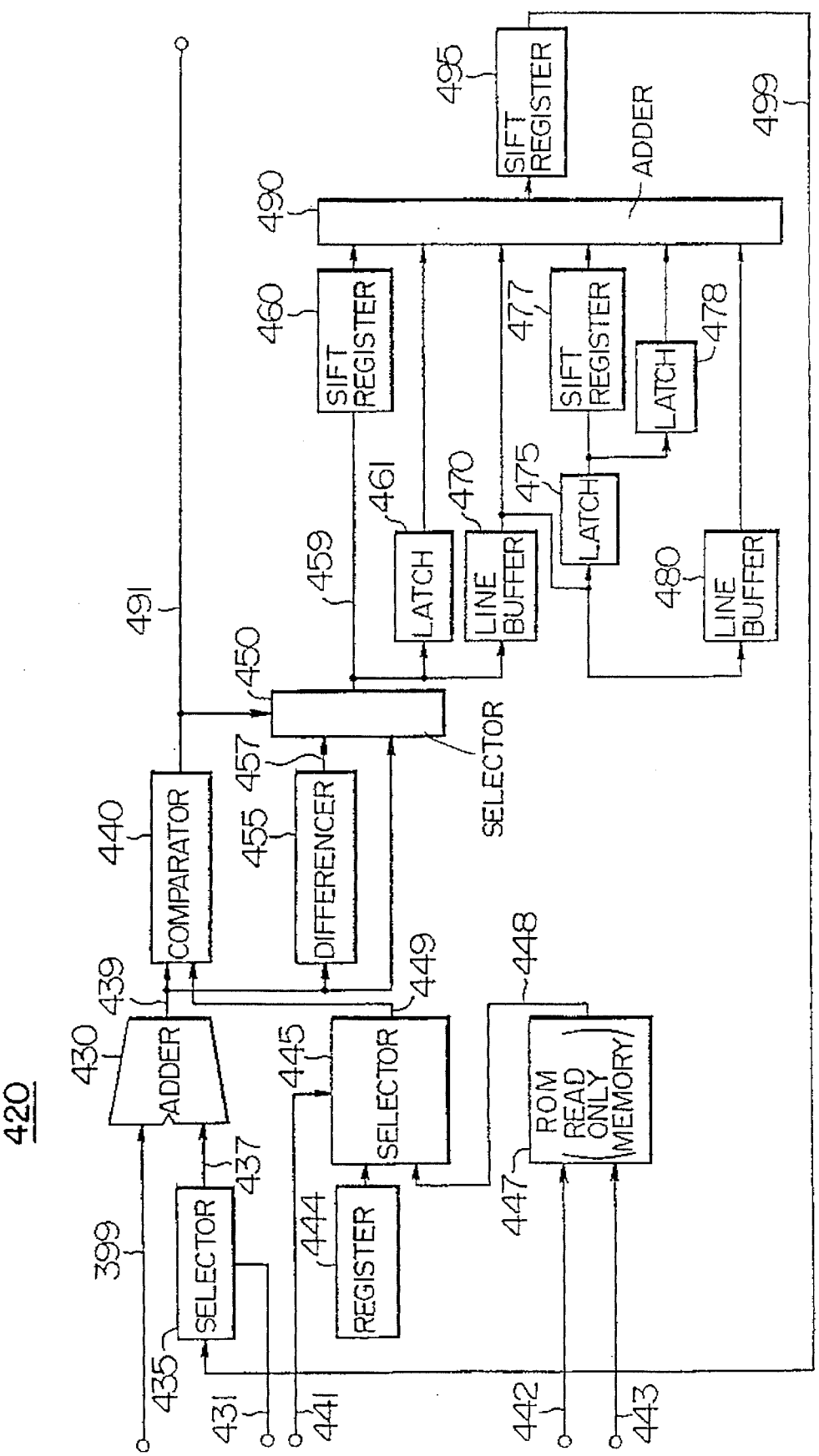
FIG. 21 is a block diagram showing an example of a circuit arrangement of a re-binarization unit.

An example of a practical means for realizing such performance will be described in detail with reference to FIG. 21 which shows an example of a circuit arrangement of the binarization unit used in the present system. In this circuit arrangement, as the binarization process, one of the pseudo half tone process through an ordered dither method, the pseudo half tone process through an average error minimum method, and the binarization process through a fixed threshold can be selectively used. In FIG. 21, the multivalued image data $S_2$ is inputted from signal line 399, the signals designating pseudo half tone image processes from signal lines 431 and 441, and the lower bits of the address of the output image in the main and sub scan directions from signal lines 442 and 443. The multivalued image data $S_2(x, y)$ is inputted via the signal line 399 to an adder 430. The adder 430 adds together $S_2(x, y)$ and an error data E(x, y) inputted from a selector 435, to output a multivalued data F(x, y). The error data E(x, y) ordinarily takes a value 0. The value inputted from a signal line 499 is used as the error data only when the average error minimum method is adopted as the binarization process. Therefore, the selector 435 outputs a value 0 except when the average error minimum method is designated from a signal line 431. The multivalued data F(x, y) on a signal line 439 is inputted to a comparator 440 to compare it with a threshold value T. The comparison result determines a binary image data Q(x, y). The threshold value T is also changed in accordance with the type of binarization process. The selection of the threshold value is effected through external designation via a signal line 441. In case of the ordered dither method, the threshold value is periodically changed in accordance with the position of pixel to be outputted. In this case, for instance, the lower bits of the address of the output image in the main and sub scan directions are inputted via the signal lines 442 and 443 to ROM 447 whose output is used as the threshold value. If a fixed threshold value is used, a fixed value from the register 444 is selected.

It is necessary to calculate the error data E(x, y) for the binarization process through the average error minimum method. The error data E (x, y) is the sum of errors $\epsilon$ at the time of binarization of multivalued data F near the point (x, y) multiplied by weight coefficients $\delta$. An example of the weight coefficients is shown in FIG. 22 wherein an asterisk mark corresponds to a pixel at coordinate (x, y) to be binarized at that time.

The operation at each circuit element will then be described. With the weight coefficients shown in FIG. 22, the error data E(x, y) is obtained by the following equation:

$$E(x, y)=1.8[\epsilon(x-1, y-1)+\epsilon(x+1, y-1)+\epsilon(x-2, y)+\epsilon(x, y-2)+2\{\epsilon(x, y-1)+\epsilon(x-1, y)\}]$$

The error $\epsilon$ of each pixel is the difference between a multivalued data F and 0, or the difference between F and a maximum value $F_{max}$ among values F. The error is obtained as in the following. Assuming that the comparator 440 binarizes a multivalued data $F(x_2-1, y_2)$ at a coordinate $(x_2-1, y_2)$, the value $F(x_2-1, y_2)$ is also supplied to the differencer 455 and selector 450. The and the maximum value $F_{max}$ among multivalued image differencer 445 outputs a difference between $F(x_2-1, y_2)$ and the maximum value $F_{max}$ among multivalued image values F(x, y), and sends it to the selector 450. If $S_2(x, y)$ takes a value from 0 to 63, it becomes $F_{max}=63$ so that the differencer 455 outputs $63-S_2(x_2-1, y_2)$. If $F(x_2-1, y_2) > F_{max}$, then the differencer 455 outputs 0. The selector 450 outputs as the error $(x_1-1, y_1)$ either $F(x_2-1, y_2)$ or $F_{max}-F(x_2-1, y_2)$ in accordance with the following conditions:

$$\epsilon(x, y)=F(x, y):Q(x, y)=0$$

$$F_{max}-F(x, y):Q(x, y)=1$$

The outputted $\epsilon(x_2-1, y_2)$ is sent via a signal line 459 to a line buffer 470 and etc. The process of obtaining E(x, y) based on the error e, is performed by latches 461, 475 and 478 and shift registers 460 and 477. The operation of circuit elements will be further described taking as an example the case of obtaining E(x, y). By the time when the binary data Q(x-1, y) is determined through the binarization process, the selector 450, the latches 461, 475 and 478 and the line buffers 470 and 480 have outputted errors $\epsilon(x-1, y)$, $\epsilon(x-2, y)$, $\epsilon(x, y-1)$, $\epsilon(x-1, y-1)$, $\epsilon(x+1, y-1)$ and $\epsilon(x, y-2)$. The error data $\epsilon(x-1, y)$ and $\epsilon(x, y-1)$ outputted from the selector 450 and the latch 478 are inputted to the shift registers 460 and 477 which output $2\times\epsilon(x-1, y)$ and $2\times\epsilon(x, y-1)$. An adder 490 adds six multivalued error data to obtain $8\times E(x, y)$ and sent it to a shift register 495. The shift register 495 shifts the inputted multivalued error data to obtain E(x, y) which is sent via the signal line 499 to the selector 435. The selector 435 sends E(x, y) or 0 to the adder 430, depending upon F flag supplied externally via signal line 431. If the selector 435 outputs E(x, y), the final output Q represents a pseudo half tone image, whereas if it outputs 0, the final output Q represents an image simply binarized through a fixed threshold value.

If x=1 or y=1, there occurs a case that some $\epsilon$ necessary for obtaining E(x, y) is not present. In this case, E(x, y) is determined reading a value stored beforehand in the differencer 455 through the selector 450.

As described in the foregoing, the present system can selectively use a suitable binarization process in accordance with the image or system configuration to be adopted. For example, if the system is connected with an output device which is difficult to display a dot of 1 pixel×1 pixel, the binarization is performed using a screened type dither matrix so that even the binarized image through an average error minimum method, which essentially contains dots of 1 pixel×1 pixel, can be clearly displayed.

Further, if the ordered dither method is applied to the re-binarization process during an affine transformation for an ordered dither image, lowering the image quality may occur. This is resulted from moire caused by interference between the period of the dither matrix for an original image and the period of the dither matrix for the re-binarization process. This problem can be solved, in the case of an ordered dither image, by performing re-binarization through a process without cyclic nature such as the average error minimum method.

It is accordingly possible to further broaden the selection range of binarization processes by preparing at least one of the pseudo half tone image processes having no cyclic nature for application to an image input device connected to the system.

Next, the line image processing unit 500 will be described. An affine transformation such as magnification, reduction, rotation or the like is performed as the line image processing. Conventionally, there are known the logical sum method, the nearest point or pixel method, the division-by-9 method and the like. In the present system, these known processing methods are employed for line image processing. An example of a circuit arrangement for realizing a line image processing of this invention using the nearest pixel method is shown in FIG. 23. In FIG. 23, a signal line 250 is used for inputting image data from the image data buffer. Signal lines 341 and 342 are used for inputting the small value portion ($x_4$, $y_4$) of the coordinate value of an output image calculated by the address calculation unit (FIG. 17). A conversion table 510 composed of a ROM or the like is used for outputting binary data using the inputted image data and coordinate data. A shift register 520 is used for temporarily storing an output image data in order to synchronize the operation of the line image processing unit 500, dither image processing unit 300 and discrimination unit 700. A signal line 591 is used for outputting binary image data. Since the nearest pixel can be determined in accordance with the value of the small value portion ($x_4$, $y_4$) of the output coordinate, the values of an output image can be stored in the shift register 520 whose size may suffice if it is at least $2^8$ bit length.

In the present system, one of the outputs from the dither image processing unit 300 and line image processing unit 500 described so far is selected and outputted therefrom. The discrimination unit 700 determines which one of the two outputs is to be selected for each portion of the inputted image.

Next, the discrimination unit 700 will be described in detail.

Generally, contrary to a line image, a pseudo half tone image is outputted as a fine pattern of black pixels. Therefore, it is possible to discriminate an image region by checking the dispersion of black pixels near a re-sampling point. Apart from the above, if a large dither matrix such as 8×8 pixels in an ordered dither method is used, a pseudo half tone image having a relatively small dispersion can be outputted. However, such a pseudo half tone image has an extremely high periodicity. In view of the above, in the present embodiment, two types of discrimination methods are employed, one using the dispersion of black pixels near a re-sampling point to be discriminated, and the other using the periodicity of black pixel on a scan line. It is judged as a pseudo half tone image region if one of the two methods discriminates the region as such.

FIG. 24 is a block diagram showing an example of a circuit arrangement of the discrimination unit 700. In FIG. 24, the data bus 250 is used for transfer of original image data, to be used for discrimination, from the image data buffer. A dispersion value detector 710 performs discrimination of original image data by determining the dispersion value of black pixels. A periodicity detector 800 performs discrimination of original image data based on the periodicity of black pixels. Reference numeral 895 denotes a logic gate, and reference numeral 899 denotes a signal line to which the final discrimination result is outputted.

Figure 25:
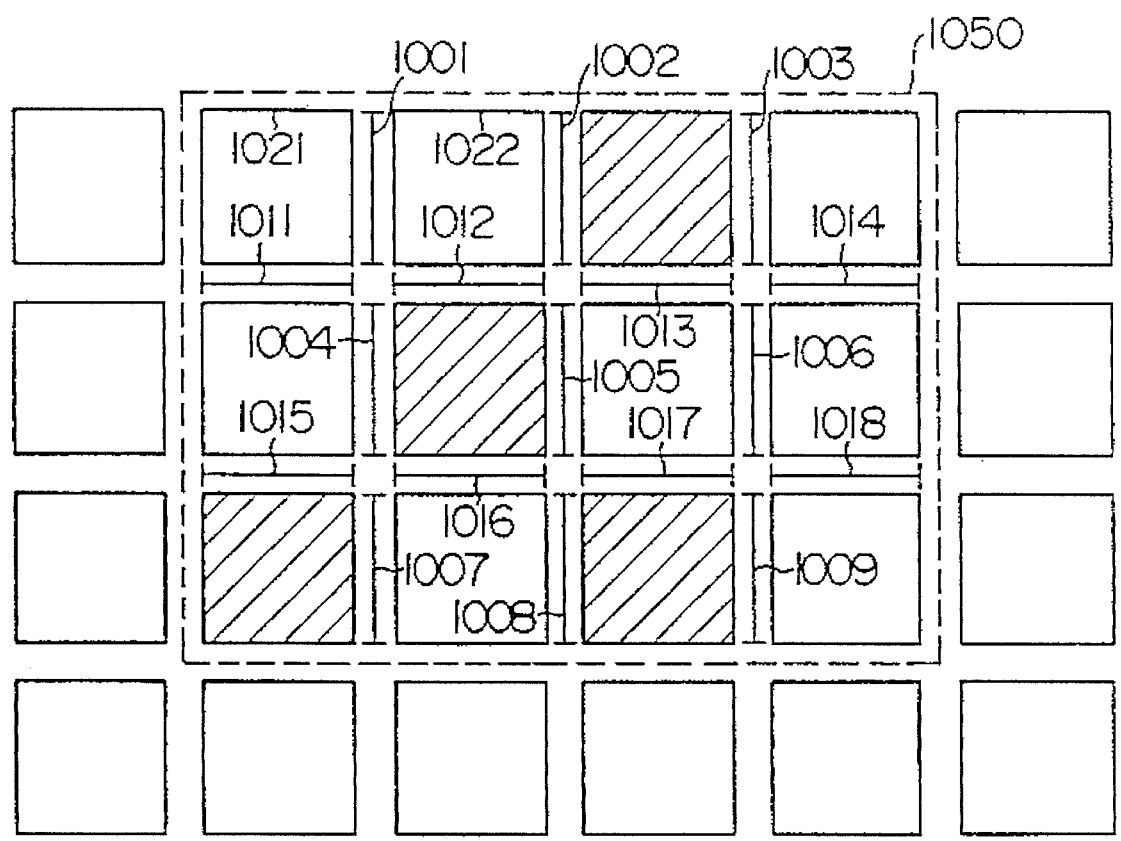
FIG. 25 illustrates the fundamental operation principle of the discrimination unit.

First, the dispersion value detector 710 will be described. First of all, the operation principle thereof will be described with reference to FIG. 25. The dispersion value is determined based on the contour line length of black pixels within a scan window having a certain size, and based on the number of black pixels. The contour line length is the sum of border line lengths between white and black pixels within a fixed region. For instance, referring to FIG. 25, assuming that each pixel is represented by a rectangular indicated by 1021, 1022 and so on, each border line between pixels is indicated by 1001 to 1009 and 1011 to 1018. The hatched rectangular in FIG. 25 indicates a black pixel. Since the scan window 1050 in this case is 4×3 pixels, the sum of border lines between pixels is 17. The contour line length is the sum of border lines between white and black pixels such as between 1003 and 1012. Therefore, the contour line length shown in FIG. 25 is 12. Of border lines, the border line such as 1001 to 1009 between pixels along the scan line is called a vertical border line, while the border line such as 1011 to 1018 between two scan lines is called a horizontal border line. Of the contour line length, the number of contour lines among the vertical border lines is called a vertical contour line number, whereas the number of contour lines among the horizontal border lines is called a horizontal contour line number. In the example shown in FIG. 25, of the contour line number 12, the vertical contour line number is 7 and the horizontal contour line number is 5. The number of black pixels among 12 pixels within the scan window is 4.

In the present embodiment, the scan window is assumed of 16×4 pixels. In this case, the border line number is 108 and the pixel number is 64. The variables are defined as follows:

BNO(n): the number of black pixels among 16 pixels at the n-th scan line among 4 scan lines within the scan window.

BNOX: BNO(1)+BNO(2)+BNO(3)+BNO(4)

HEG(n): the vertical contour line length among 15 vertical border lines between 16 pixels at the n-th scan line.

HEGX: HEG(1)+HEG(2)+HEG(3)+HEG(4)

VEG(n): the horizontal contour line length among 16 horizontal border lines between n-th and n+1-th scan lines

VEGX: VEG(1)+VEG(2)+VEG(3)+VEG(4)

EG(n): HEG(n)+HEG(n)

IEGX: EG(1)+EG(2)+EG(3)+EG(4)

Discrimination is conducted by referring to a predetermined table, using two feature parameters BNOX and IEGX as indexes. The n-th scan line among 4 scan lines is hereinafter represented by LN(n).

Figure 26:
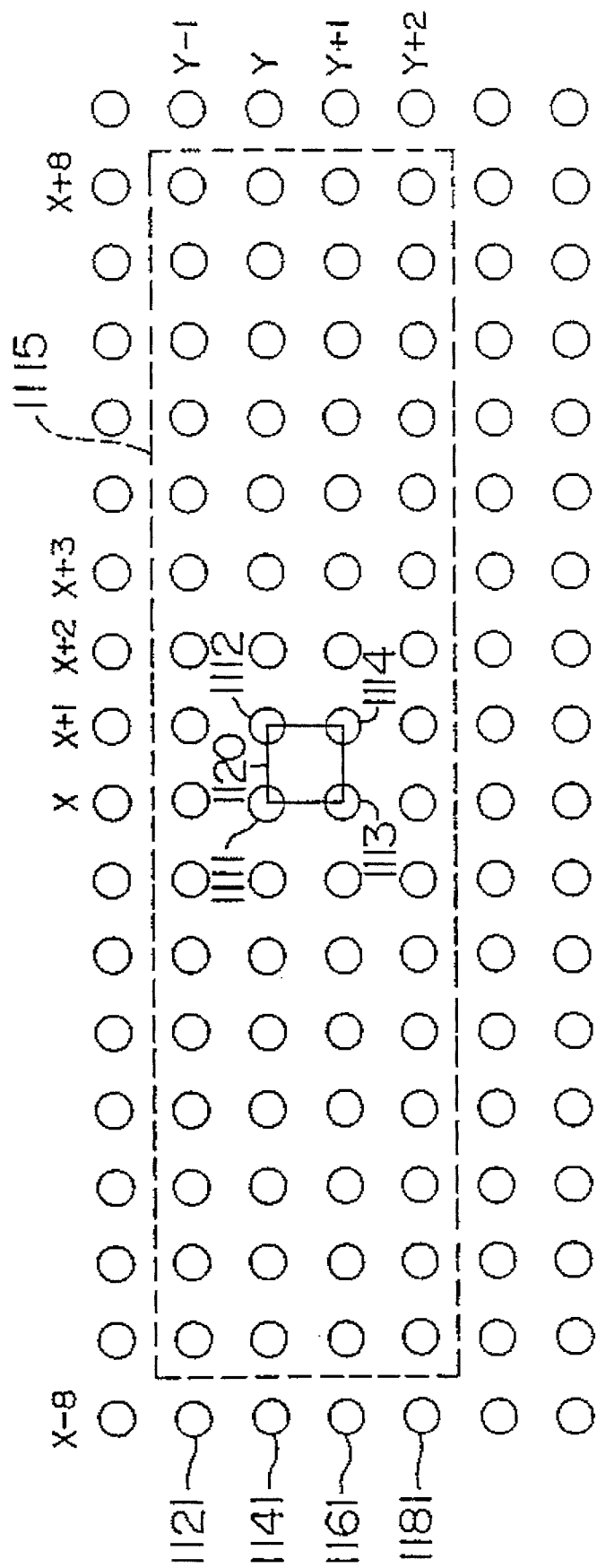
FIG. 26 illustrates the region of image data used in image region discrimination.

Next, a method of determining each variable will be described. FIG. 26 shows a part of an original image which undergoes the discrimination. A circle in FIG. 26 indicates a pixel. An objective re-sampling point is contained in a rectangular 1120 defined by four pixels 1111 to 1114, and the scan window of 16×4 pixels to be used for the discrimination is shown by a rectangular 1115. The coordinates of the pixels 1111, 1112, 1113 and 1114 are (x, y), (x+1, y), (x, y+1) and (x+1, y+1), respectively.

For the dispersion detection, image data to be referred to are of 68 pixels, i.e., 64 pixels within the rectangular 1115 and 4 pixels 1121, 1141, 1161 and 1181 one pixel before the scan window at respective scan lines.

Figure 27:
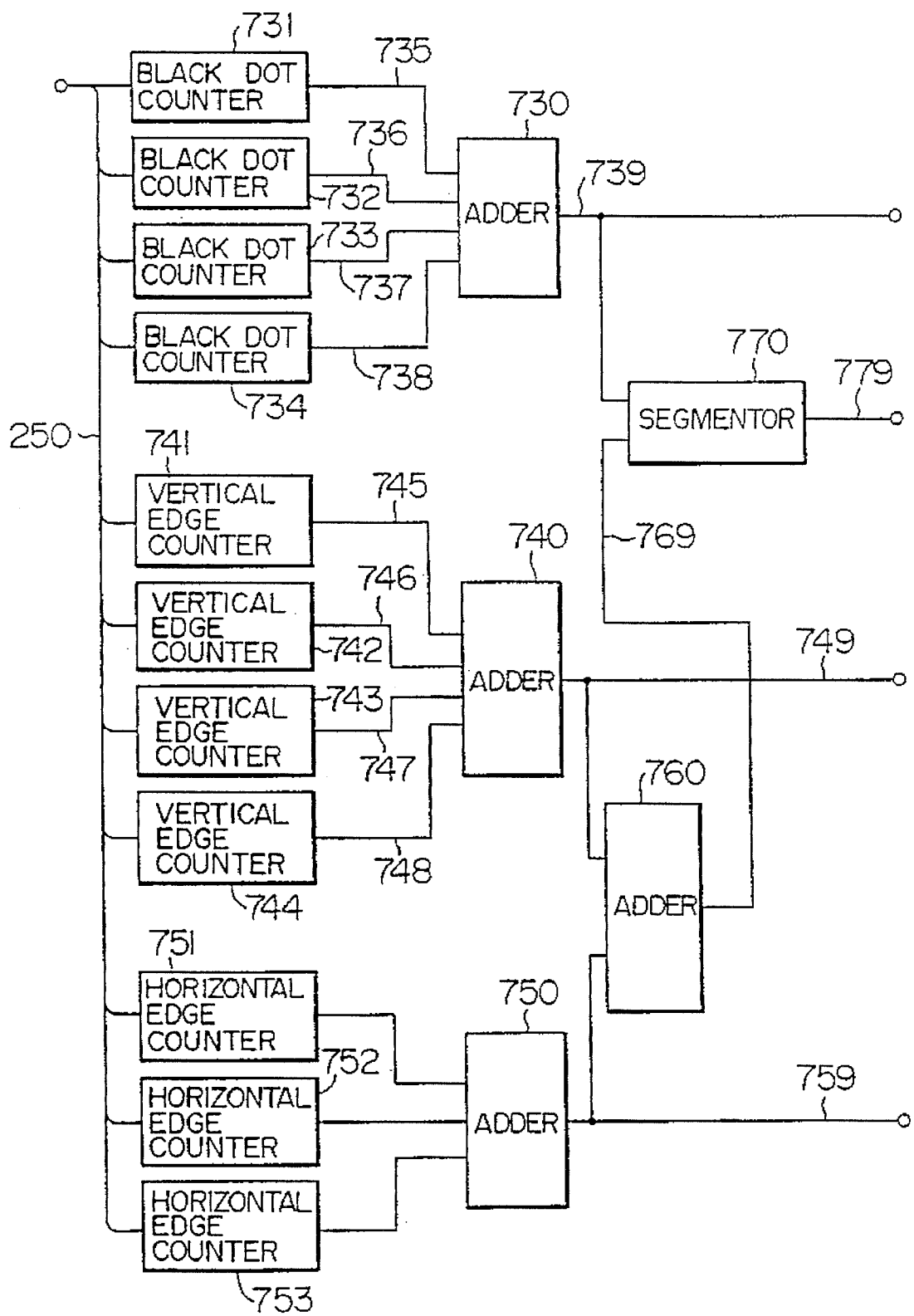
FIG. 27 is a block diagram showing an example of a circuit arrangement of the dispersion value detector in the discrimination unit.

FIG. 27 is a block diagram showing a circuit arrangement realizing the dispersion detection. The data bus 250 is used for transfer of image data, to be used in discrimination, from the image data buffer 200. Black data counters 731, 732, 733 and 734 count black pixels BNO(n) at respective scan lines within the scan window. An adder 730 adds together four outputs from the counters 731 to 734 and outputs the feature parameter BNOX which is delivered to a signal line 739. Vertical edge or border line counter 741, 742, 743 and 744 detect the vertical contour line length HEG(n) at each scan line. An adder 700 adds together four outputs from the counters 741 to 744 and outputs the feature parameter HEGX which is delivered to a signal line 749. Horizontal edge or border line counter 751, 752 and 753 detect the horizontal border line length VEGX. An adder 750 adds together three outputs from the detectors 751 to 753 and outputs the feature parameter VEGX which is delivered to a signal line 759. An adder 760 adds together two types of contour line lengths. A segmentor 770 receives the contour line length and the black pixel number and outputs a discrimination result which is delivered to a signal line 779.

Figures 28, 30:
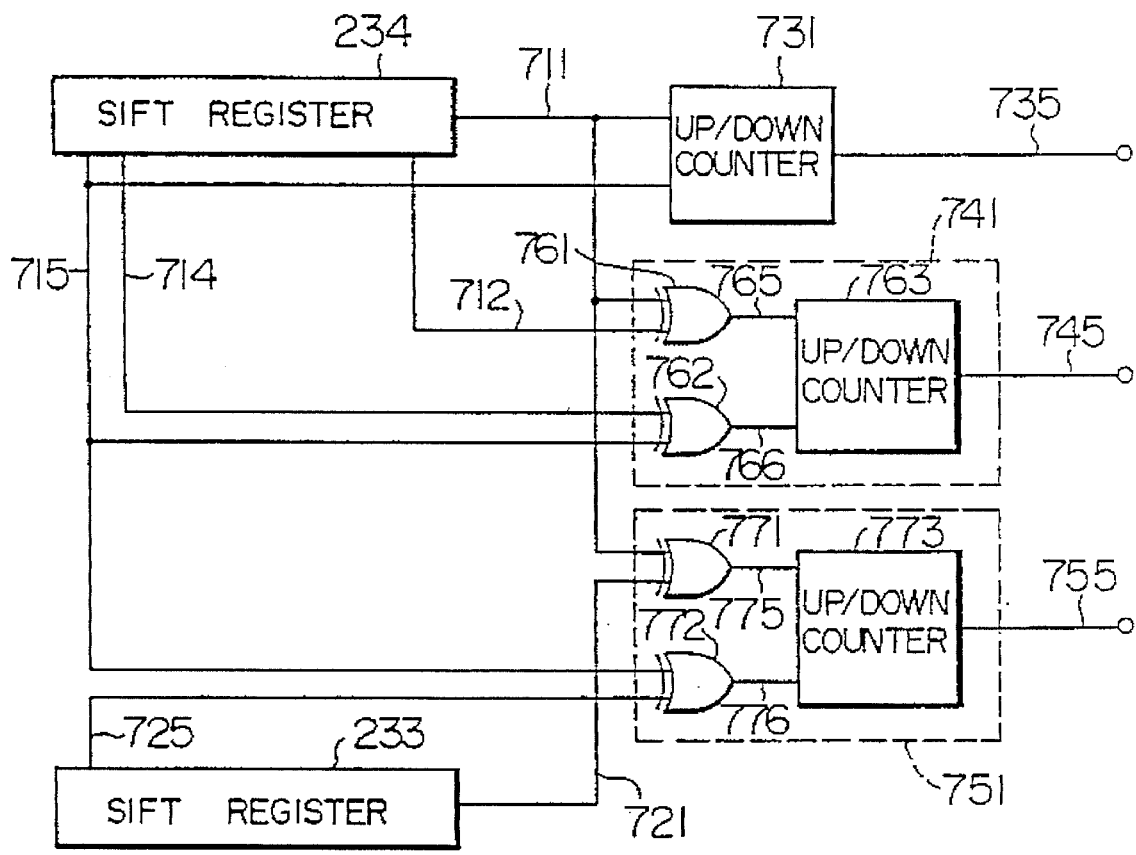
FIG. 28 is a block diagram showing an example of a circuit arrangement of the part of the dispersion value detector for detecting each feature parameter.
FIG. 30 illustrates the relationship between discrimination results and two types of feature parameters obtained by the periodicity detector.

The operation will be described in detail as to the black dot counter 731, vertical edge counter 741 and horizontal edge counter 757 by way of example. The black dot counter 731 counts the number of black pixels at the first scan line within the scan window of 16×4 pixels, and the vertical edge counter 747 counts the vertical contour line length at the first scan line. The horizontal edge counter 751 counts the horizontal contour line length between the first and second scan lines. The shift registers 234 and 233 shown in FIG. 28 are contained in the above-described image data buffer 200. Assuming that the scan window is located at the position as shown in FIG. 26, the shift register 233 holds image data of 17 pixels at coordinates (i, y−1) where x−8≦i≦x+8, and the shift register 234 holds image data of 17 pixels at coordinates (i, y) where x−8≦i≦x+8. Image data at coordinates (x+8, y−1), (x+7, y−1), (x−7, y−1) and (x−8, y−1) are outputted from signal lines 711, 712, 714 and 715, while image data (x+8, y) and (x−8, y) are outputted from signal lines 721 and 725. Black image data is represented by "1" and white image data by "0". The black dot counter 731 is an up/down counter which counts up when "1" is inputted from signal line 711 and counts down when "1" is inputted from signal oine 715. Therefore, an output of the counter 731 indicates the black pixel number among 16 pixels from (x+8, y−1) to (x−7, y−1).

As shown in FIG. 28, the vertical edge counter 741 is constructed of exclusive OR gates 761 and 762 and an up/down counter 763. The exclusive OR gate 761 outputs an exclusive OR of two pixel data P(x+8, y−1) and P(x+7, y−1). Therefore, if there is a contour line between two pixels P(x+8, y−1) and P(x+7, y−1), outputted from signal line 765. The exclusive OR gate 762 operates similarly such that if a contour line is present between two pixels P(x−8, y−1) and P(x−7, y−1), "1" is outputted from signal line 765. Thus, upon reception of these two signals, the up/down counter 763 outputs the vertical contour line length HEG(1) among 16 pixels from (x+8, y−1) to (x−7, y−1) in the similar manner as the case of the above-described black dot count.

The horizontal edge counter 751 outputs the horizontal contour line length VEG(1) based on the contents of the two shift registers 234 and 233. The operation principle is similar to the case of the horizontal edge counter 741. Namely, the two exclusive OR gates 771 and 772 indicate the presence or absence of the contour line between (x+8, y−1) and (x+8, y), and between (x−8, y−1) and (x−8, y), respectively, so that the up/down counter 773 outputs the vertical contour line length VEG(1). VEG(1) is the count result of horizontal contour lines between LN(1) and LN(2) among 16 pixels from "x−7" to "x+8".

The dispersion discrimination unit shown in FIG. 27 can be realized by using a plurality of circuit portions just described above. The discrimination is carried out as in the following. First, a contour line length EGX is obtained by adding respective contour line lengths. The counts of black pixel numbers by the four black dot counters are added together by the adder 730 to output the result as the black pixel number within the scan window. The contour line length EGX and the black pixel number BNOX are inputted to the segmentor 770 to obtain a discrimination result FLG1(x, y). The FLG1 is a one-bit signal which is "1" for a dither image region and "0" for a line image region.

The segmentor 770 may be realized by using a memory with its address designated by the input signal lines. For example, in this embodiment, the number of black pixels ranges from 0 to 64 so that a value 0 represents all black pixels and a value 64 represents all white pixels. Thus, six signal lines are required to identify the numbers of black and white pixels. On the other hand, the maximum value of contour line length is 108 so that seven signal lines are required. Thus, the segmentor 770 can be realized by using a memory having 13 bit address lines. The content of the memory can be determined such that it discriminates as the dither image region if the contour line length is greater than a smaller one of the white and black pixel numbers.

With the above method, it is possible to precisely perform discrimination of a pseudo half tone image having relatively large dispersion of white and black pixels such as in the case of an average error minimum method. However, a pseudo half tone image having small dispersion such as in the case of an ordered dither method using a relatively large dither matrix of, e.g., 8×8 pixels can not attain a high precision discrimination.

However, such an ordered dither image through a relatively large dither matrix has a very high periodicity in units of matrix size. Therefore, the periodicity detector 800 is used to detect a periodicity for the purpose of discrimination of such a pseudo half tone image.

FIG. 29 is a block diagram showing an example of a circuit arrangement of the periodicity detector 800. In the periodicity detector 800, periodicity counters 810, 820, 830 and 840 detect a periodicity at a corresponding scan line in units of a predetermined number of pixels. A similarity counter 850 counts the number DLN of scan lines having a periodicity among LN(1), LN(2), LN(3) and LN(4). A background detector 870 counts the number LNC of scan lines having all white or black 16 pixels among LN(1), LN(2), LN(3) and LN(4). A logic 890 outputs a region discrimination result based on the two signals DLN and LNC.

The periodicity counter is constructed of exclusive OR gates 801 and 802 and an up/down counter 805, similar to the dispersion value detector. The periodicity counters are inputted with data from the shift registers 231 to 234 in the image data buffer 200.

It is assumed that a periodicity in units of 8 pixels is checked. The exclusive OR gate 801 outputs an exclusive OR of two pixel data P(x−8, y−1) and P(x, y−1), whereas the exclusive OR gate 802 outputs an exclusive OR of two pixel data P(x−1, y−1) and P(x+7, y−1). The two signals are inputted to the up/down counter 805 which in turn outputs the number of coincidences of black/white pixels between 8 pixels from (x–8, y–1) to (x–1, y–1) and 8 pixels from (x, y–1) to (x+8, y–1). This coincidence value is called herein ID(1). If the preceding and succeeding 8 pairs of pixels coincide with each other, then ID(1) takes a value of 8.

ID(1) outputted from the periodicity counter 820 is inputted to a comparator 851 in the similarity counter 857 to compare it with a predetermined threshold value IDDT and output a one-bit signal IDT(1) to a signal line 855 depending upon the following conditions:

IDT(1)=1: ID(1)≧IDDT (with periodicity)

0: ID(1)<IDDT (without periodicity)

Outputs from the other periodicity counters 820, 830 and 840 are also inputted to the comparators 852, 853 and 854 to obtain signals IDT(2), IDT(3) and IDT(4).

The adder 860 adds together the inputted signals IDT(1), IDT(2), IDT(3) and IDT(4) to output a 3 bit signal DLN. This signal DLN indicates how many scan lines among LN(1), LN(2), LN(3) and LN(4) have a periodicity.

The signal DLN includes that for a scan line having all 16 white or black pixels which scan line has been judged that it has a periodicity. In such a case, a white region such as the background of a text document is also discriminated as a pseudo half tone image having periodicity. In view of this, it is possible to reduce the number of discrimination errors by checking the number of scan lines which have all black or white pixels only. The background detector 870 shown in FIG. 29 is provided for this purpose.

In the background detector 870, comparators 871, 872, 873 and 874 receive the horizontal contour line lengths HEG(1), HEG(2), HEG(3) and HEG(4) to discriminate if they are 0 or not. For instance, if HEG(1) is 0, it indicates that there is no vertical contour line at the first scan line and hence 16 pixels are all black or white. An one-bit output signal ILC(1) from the comparator 871 is determined based on the signal HEG(1) as in the following:

ICL(1)=1: HEG(1)=0

0: HEG(1)>0.

Each comparator may be replaced by a logical gate.

An adder 880 adds together the signals ILC(1), ILC(2), ILC(3) and ILC(4) outputted from the comparators 871 to 874 to output a 3-bit signal LNC to a signal line 889. This signal LNC indicates how many scan lines among four scan lines are constructed of all black or white pixels.

The signals DLN and LNC are inputted via signal lines 869 and 889 to the logic 890 which outputs a one bit signal FLG2 as the periodicity detection result based on the two 3 bit signals DLN and LNC. The relationship between signals DLN and LNC and the periodicity detection result is shown in FIG. 30 by way of example.

With the above methods, the dispersion detection result FLG1 is outputted from the dispersion value detector 710, and the periodicity detection result FLG2 is outputted from the periodicity detector 800. The two detection signals are inputted to the logic gate 895 shown in FIG. 24 to then output the final discrimination result FLG to the signal line 899. The logic gate 895 may be replaced by an OR gate for example.

Using the above circuits, it is possible to judge at each re-sampling point which one of the outputs from the dither image processing unit 300 and line image processing unit 500 is to be selected in the image processing of a composite image containing line images and pesudo half tone images. As discussed previously, in the image processor 100, the dither image processing unit 300, line image processing unit 500 and discrimination unit 700 should operate synchronously with each other. In view of this, it becomes necessary to provide shift registers or the like for temporarily storing data from the three units 300, 500 and 700.

The image processor 100 performing the functions described above can be realized by the foregoing circuit arrangements, and the image processing system described with this invention can be realized using the image processor 100 thus constructed.

In the above embodiment, a composite image has been used in describing the invention. However, an image composed of only a line image or a pseudo half tone image can be processed in the same manner. Also, selection between the outputs from the line image processing unit 300 and dither image processing unit 500 is determined on the basis of an output from the discrimination unit 700. However, it is obvious that such selection may be made upon external designation, or one of the outputs may be selected fixedly. For instance, a flag which discriminates a region is written in the header (indicated by 2000 in FIG. 6) of data in the image storage memory. In this condition, for the image data composed of only a pseudo half tone image, it is possible to fix the discrimination result as the pseudo half tone image region. Such fixed discrimination result may be carried out by an external switch.

Further, after once an objective image is displayed, a region may be designated using a mouse or the like to perform image processing for the designated region.

Figure 31:
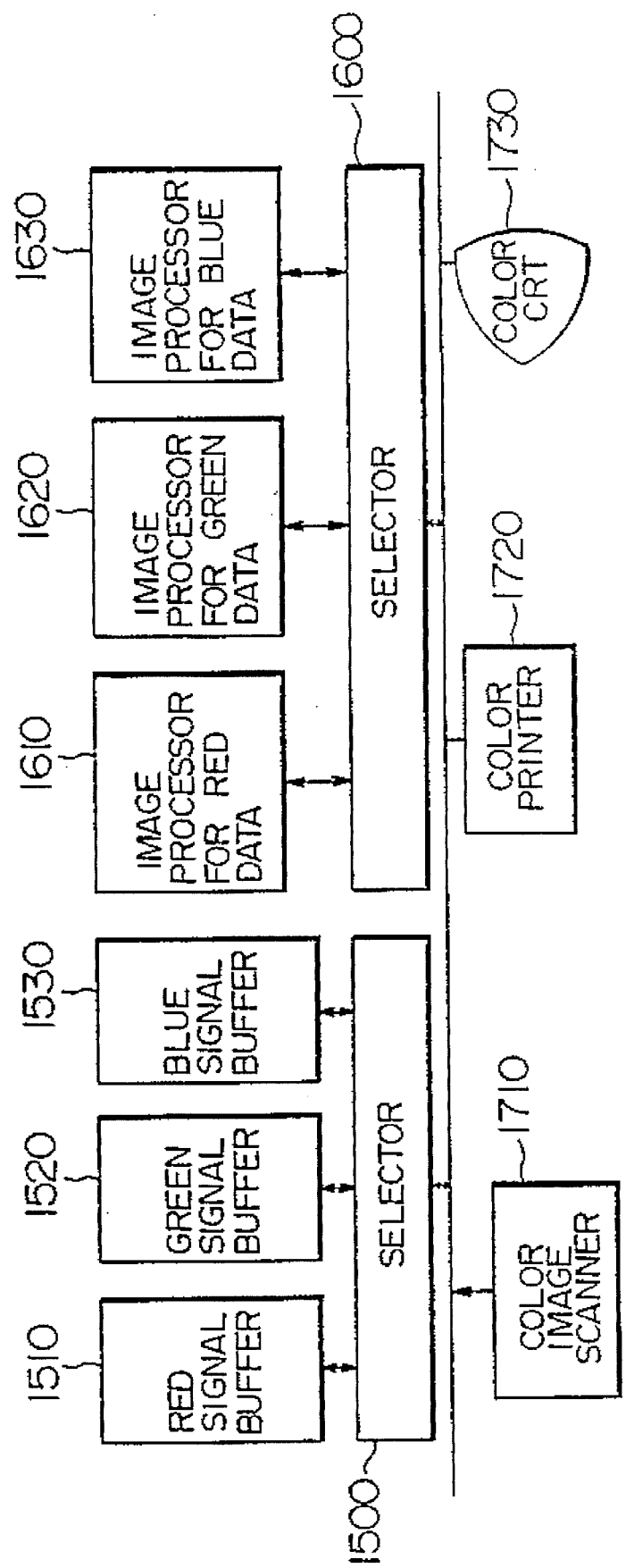
FIG. 31 is a block diagram showing an example of a circuit arrangement of a color image processing unit of this invention.

In the above embodiment, a monochrome image has been used as an objective image. However, three image processors (indicated 100 in FIG. 1) for red, blue and green colors may be used to process a color image. An embodiment for this is shown in FIG. 31. Image processors 1610, 1620 and 1630 for each color data are constructed in a similar manner to the image processor 100 in FIG. 1 described previously. Buffer memories 1510, 1520 and 1530 store three color binary image data. Selectors 1500 and 1600 select respective color data and output them to the destination device. A color image scanner 1710 reads a document or the like and outputs R, G and B three color image data. Reference numeral 1720 denotes a color printer, and 1730 a color display. As another means of processing a color image, three color image data may be processed time sequentially. In this case, one image processor may suffice.

Furthermore, in the above embodiment, the description has been directed to the case where a pseudo half tone image is subjected to data conversion and, thereafter, rebinarized data are outputted. However, multivalued half tone image data resulted through binary data conversion or grey scale data conversion may be outputted at the image processor 100. In such a case, obviously, various image processing for multivalued image data can be carried out, or various output devices for multivalued image data can be used for the output of multivalued image data.

Another embodiment of the image processor 100 will further be described.

In this embodiment, binary data of an original image are converted into multivalued data, and the multivalued data are binarized through conversion into the black pixel concentration over the entire region of the original image, to obtain reproduced binary image data.

First, the operation principle of this embodiment will be described. In the case where an original binary image of $x_1 \times y_1$ pixels is subjected to a line density conversion at a conversion factor r/R to obtain a reproduced image of $x_2 \times y_2$ pixels, the present embodiment performs the following two processes:

(1) By using binary data of $x_1 \times y_1$ pixels, multivalued data of $x_2 \times y_2$ pixels corresponding to the respective pixels of an image to be reproduced are generated.

(2) By binarizing the multivalued data for $x_2 \times y_2$ pixels, binarized reproduced image data of $x_2 \times y_2$ pixels are obtained.

The description for the first process (1) will be given first. In the first process (1), the process of determining a multivalued data of each pixel with reference to a plurality of binary data is carried out simultaneously with the process of interpolating image data.

In order to determine a multivalued data for a pixel ($x_2$, $y^2$), a plurality of original image data are referred to. Assuming that the origins (0, 0) of the original image and reproducing image are the same, the pixel ($x_1$, $y_1$) which is the center of the original image to be referred to is defined by:

$$x_1 = [R/(r \times x_2)]$$

$$y_1 = [R/(r \times y_2)]$$

where [x] is a largest integer not exceeding x. For instance, in case where an original image is reduced by ⅔, they are given by:

$$x_1 = [3/(2 \times x_2)]$$

$$y_1 = [3/(2 \times y_2)]$$

Figure 32:
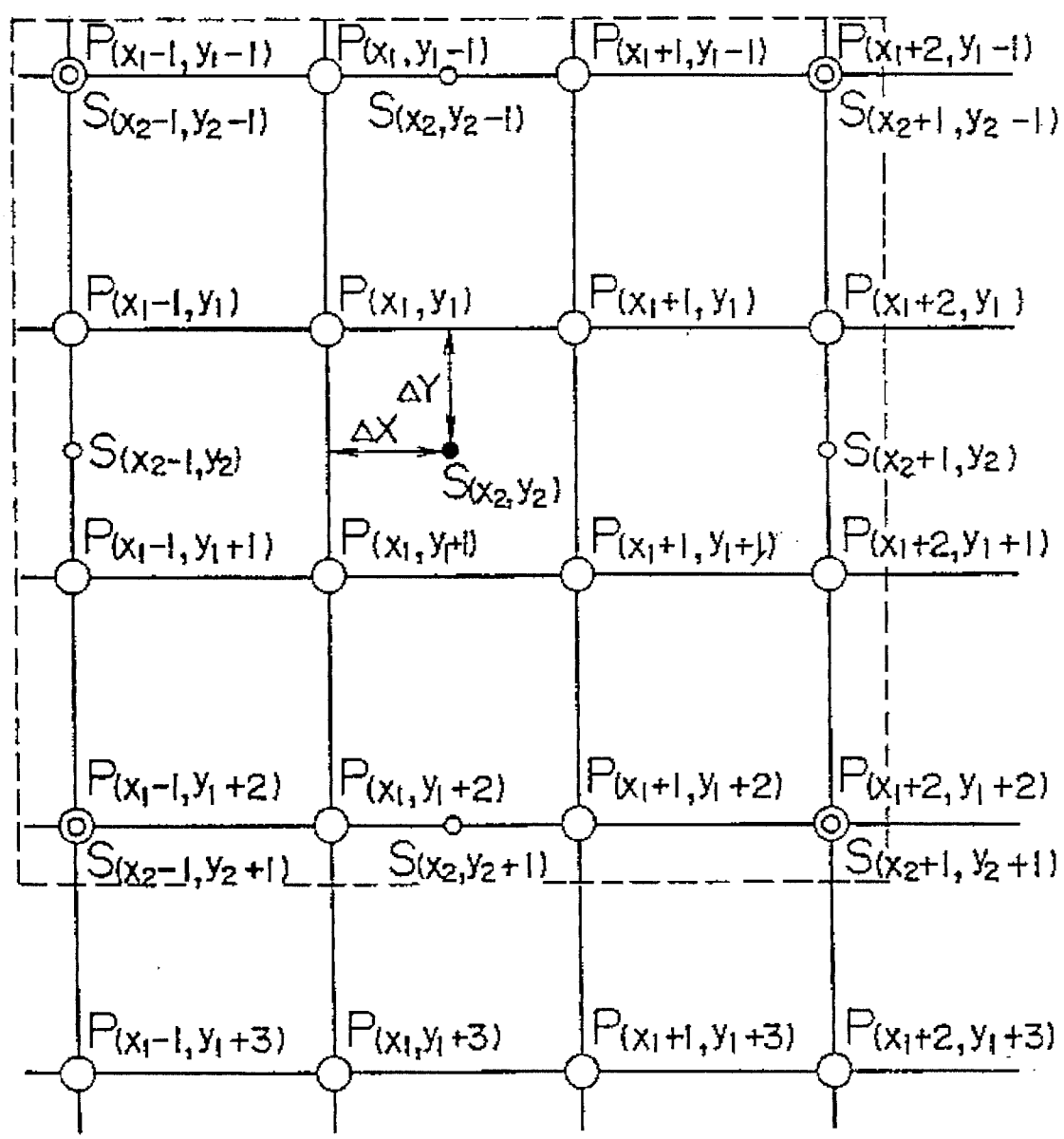
FIG. 32 illustrates the positional relationship between multivalued data and original image data referred to for determination of the multivalued data.

The positional relationship between ($x_1$, $y_1$) and ($x_2$, $y_2$) is shown in FIG. 32 is given by:

In this embodiment, a multivalued data S(x, y) is determined in accordance with the number of black pixels within the original image data of m×n pixels surrounding the corresponding point (x, y). The values and n are arbitrary. For instance, assuming that the number of pixels to be referred to is 4×4=16, the most fundamental equation for obtaining S($x_2$, $y_2$) shown in FIG. 32 is given by:

$$S(x_2, y_2) = \sum_{i=1}^{4} \sum_{j=1}^{4} P(x_{3+i}, y_{3+j})$$

where  $x_3 = x_1 - 2$ $y_3 = y_1 - 2$

The above equation indicates that the number of black pixels among 16 pixels surrounded by a broken line in FIG. 32 is the multivalued data S($x_2$, $y_2$). Therefore, the value of a multivalued data S takes 17 steps from 0 to 16.

In a practical process, the values of 16 referenced pixels are weighted in accordance with a distance between the multivalued data S and respective original image data P. The weight coefficients α and j are represented by a 4×4 matrix, and are a function of a relative position of the multivalued data and respective original image data. The relative position of the multivalued data ($x_2$, $y_2$) with respect to original data is defined by Δx and Δy shown in FIG. 32. Thus, a multivalued data S($x_2$, $y_2$) can be determined as:

$$S(x_2, y_2) = \sum_{i=1}^{4} \sum_{j=1}^{4} \alpha, j(\Delta x, \Delta y) \times P(x_{3+i}, y_{3+j})$$

where  $x_3 = x_1 - 2$ $y_3 = y_1 - 2$

The above process is repeated to obtain multivalued data of $x_2 \times y_2$ pixels same in number as that of the reproducing image.

Next, the principle of the process of determining the reproducing binary image data Q in accordance with the multivalued data will be described using two typical such processes by way of example. In this embodiment, conventional various binarization processes may be used for such a process.

Figures 33A, 33B:
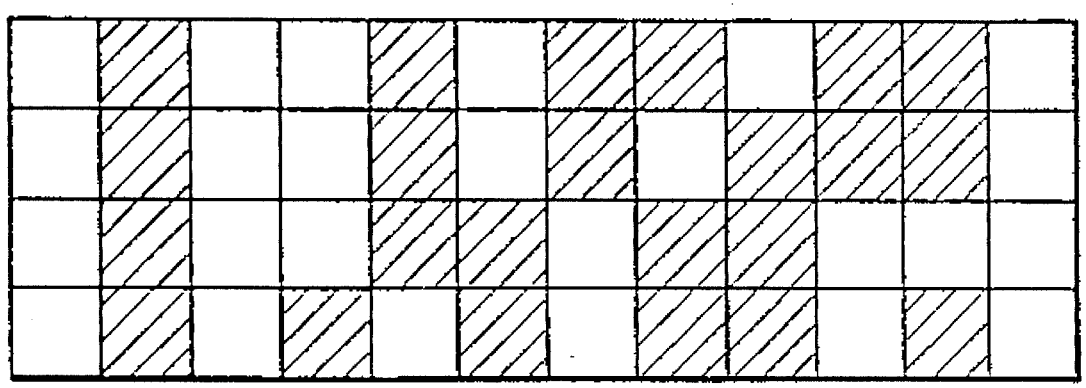
FIGS. 33A and 33B illustrate the principle of one of the binarization processings of multivalued data.

According to the first process, binary data are determined so as to always make minimum the accumulated value of rounding errors generated during binarization of multivalued data. FIG. 33A shows an example of multivalued data S (x, y) having 17 density steps from 0 to 16. During binarization of each pixel, a rounding error ε will occur at $1 \leq S(x, y) \leq 15$ except S=0 and S=16. The accumulated value of rounding errors can be made minimum by extracting the rounding error e and adding it to the multivalued data of a pixel not still subjected to binarization. For instance, if a threshold value T=8 is used in binarizing the multivalued data shown in FIG. 33A, the binarized data Q(1, 1) for the multivalued data S(1, 1) at pixel (1, 1) becomes 0 since S(1, 1)=7≤8(=T). Thus a rounding error ε occurs which takes a value 7. This rounding error is added to the multivalued data S(2, 1) at next pixel (2, 1) for binarization thereof. Therefore, the original value S(2, 1)=5 is changed to 12 by addition of the rounding error 7 so that it is judged that the binary data Q(2, 1)=1. In other words, after the pixel with the density of 7 is determined as white, the resultant rounding error is added to the next pixel as its density. Thus, the next pixel becomes likely to be judged as black. Upon repetition of the above process, the density of the multivalued data can be changed into the binary black pixel density. FIG. 33B shows the binarization result of the multivalued data shown in FIG. 33A. A rounding error generated during binarization may be dispersed to a plurality of neighbouring pixels of multivalued data. In this case, for example, the rounding error 7 generated at the pixel at (1, 1) shown in FIG. 33A is distributed to neighbouring pixels at (2, 1), (3, 1), (1, 2), (2, 2) and so on.

Figures 34A, 34B, 35:
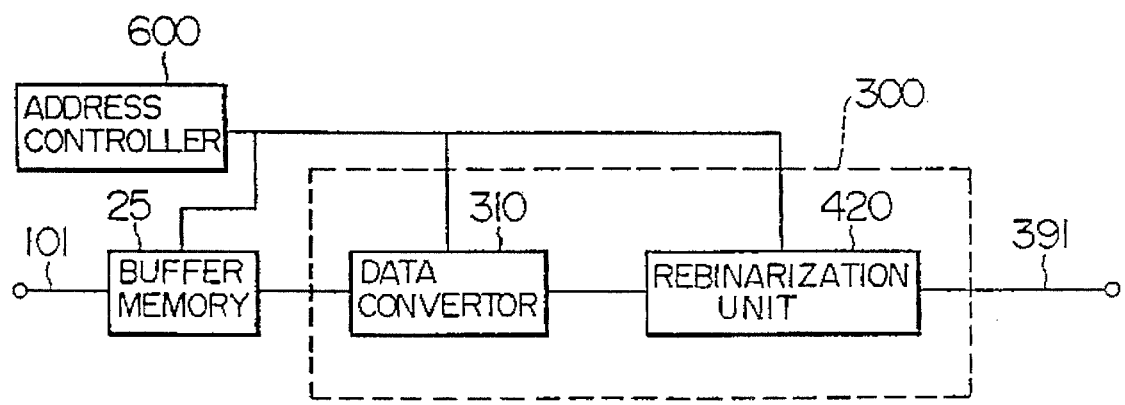
FIGS. 34A and 34B illustrate the principle of another of the binarization processings of multivalued data.
FIG. 35 is a block diagram showing an example of a fundamental circuit arrangement of the image processor of this invention.

According to the second binarization process, the sum of densities in a local region is used in determining the number of black pixels to be assigned in that region, to accordingly dispose pixels in the region in the order starting from a pixel having a higher density. For instance, consider now the case where the multivalued data having 17 density steps from 0 to 16 as shown in FIG. 34A are scanned with a scan window of 2×2 pixels. The number N of black pixels to be assigned to one or more of four pixels and a remainder n are determined by the following equation:
ti Sm=N×C+n where the scan window is positioned at A in FIG. 34A, Sm is the sum of densities of four pixels within the window, and C is the maximum value obtainable by each pixel of multivalued data. In this example, Sm=45, C=16, N=2, and n=13. Consequently, two pixels among four pixels within the scan window are assigned 16, one pixel 13, and the remaining pixel 0. The result is shown in FIG. 34B. As a result, most of pixels are separated as 0 and 16 without changing the sum of densities within the scan window. The above process is repeated while the scan window is shifted one pixel after another so that each pixel will be subjected to replacement four times. An original multivalued data S(x, y) results in $S_1(x, y)$ after one replacement process, and $S_4(x, y)$ after four replacement processes. Thereafter, the multivalued data $S_4(x, y)$ are binarized. In most cases, $S_4(x, y)$ include only 0 or 16 so that rounding errors through binarization will not occur. However, if the multivalued data $S_4(x, y)$ include a value within the range of $1 \leq S_4(x, y) \leq 15$, the resultant error is added to the sum of densities at the next position of the scan window. This is done for the purpose of minimizing the accumulated value of rounding errors similar to the above-described first process. With the above processes, the multivalued density can be converted into the black pixel concentration while always minimizing the rounding errors generated during binarization.

With the above-described two processes (1) and (2), original binary image data P(x, y) can be converted into binary reproduced image Q(x, y) after subjecting the binary image data to a line density conversion.

FIG. 35 is a block diagram showing the fundamental structure of the above embodiment. In FIG. 35, binary data are sent from a signal line 101 and stored in a buffer memory 25 and, thereafter processed by the dither image processing unit 300. The processed result is outputted to a signal line 391 as a reproduced image data. In other words, a process of determining multivalued data as many as that suitable for forming a reproducing image is performed based on binary image data, by using the buffer memory 25, data converter 310 and re-binarization unit 420. A process of binarizing multivalued data is performed at the re-binarization unit 420. The difference of the number of pixels between the original image and the reproducing image is regulated by an address controller 600. For instance, in case of a line density conversion at a conversion factor of r/R, the multivalued data calculation is carried out every R-th reference clock outputted from the address controller, and original image data input is carried out every r-th clock. However, in order to make coincide the start timings of the original image and a reproducing image with each other, the start operation of both the processes is performed at the first clock. Thus, an original image of X pixels in the main scan direction and Y pixels in the sub scan direction is converted into multivalued data having X x r/R pixels in the main scan direction and Y x r/R pixels in the sub scan direction. The obtained multivalued data are binarized to obtain a reproduced image having X x r/R pixels in the main scan direction and Y x r/R pixels in the sub scan direction. A pixel at coordinate (x, y) on the reproduced image corresponds to a pixel at coordinate (x x R/r, y x R/r) on the original image. In the following description, a binary data at coordinate $(x_1, y_1)$ on the original image is represented by $P(x_1, y^1)$, and a binary data at coordinate $(x_2, y_2)$ on the reproduced image is represented by $Q(x_2, Y^2)$.

Figure 36:
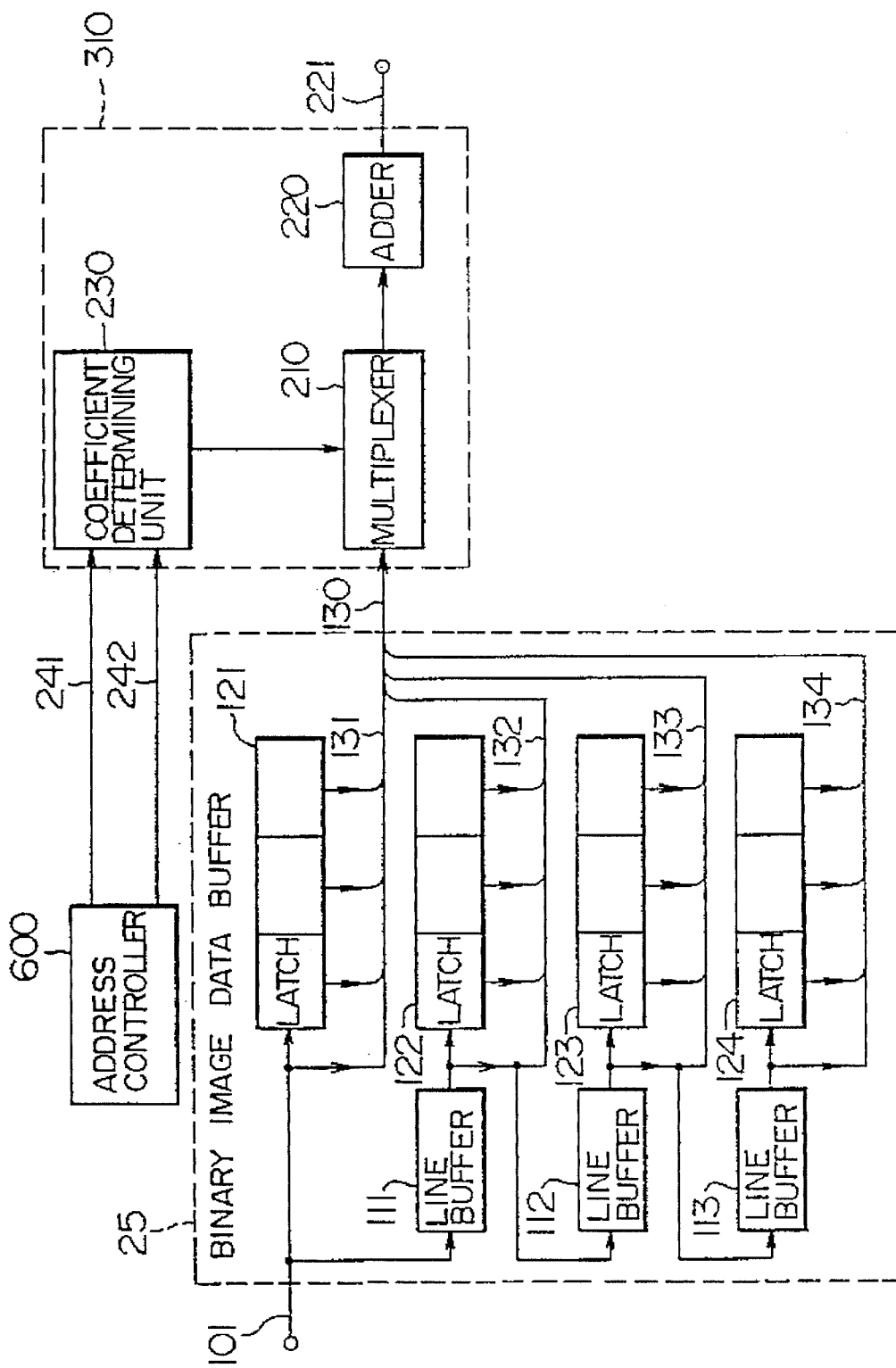
FIG. 36 is a block diagram showing an example of a circuit arrangement of a binary image data buffer and a multivalued data determining unit.

The circuit element will be described in detail taking a line density conversion process as an example. First, the circuit portion will be described by which multivalued data S(x, y) are obtained from original binary image data P(x, y). Such a circuit portion for obtaining multivalued data S(x, y) is shown in the block diagram of FIG. 36, which portion corresponds to the buffer memory 25 and data converter 310 shown in FIG. 35. Although the number of pixels referred to in determining multivalued data is arbitrary, it is assumed that binary data of 4×4 pixels are referred to. It is further assumed that the conversion factors of the line density conversion process are $r_1/R_1$ in the x direction and $r_2/R_2$ in the y direction, and that the coordinate $(x_1, y_1)$ of a pixel at the center of original image data to be referred to in determining data at coordinates $(x_2, y_2)$ of a reproducing image are defined by:

$$x_1 = [x_2 \times R_1/r_1]$$

$$y_1 = [y_2 \times R_2/r_2]$$

In the ordinary conversion process, the conversion factors are often given by:

$$r_1/R_1 = r_2/R_2$$

In determining multivalued data S $(x_2, y_2)$, original image binary data of 16 pixels including a pixel at coordinate $(x_1, y_1)$ are referred to as shown in FIG. 32. By the time when an original image data $P(x_{1+2}, y_{1+2})$ is inputted from signal line 101, three latches of a latch group 121 have already stored $p(x_{1+1}, y_{1+2})$, $p(x_1, y_{1+2})$ and $P(x_{1-1}, y_{1+2})$. Therefore, the three pixel binary data and $P(x_{1+2}, y_{1+2})$ inputted at that time are outputted to four output lines 131. Similarly, respective four pixel binary data are outputted via signal lines 132, 133 and 134 to the data converter 310. Thus, data of 16 pixels from coordinate $(x_{1-1}, y_{1-1})$ to $(x_{1+2}, y_{1+2})$ are outputted to 16 signal lines in total. The 16 pixel data are used in determining multivalued data $S(x_2, y_2)$ as shown in FIG. 32. In this case, $\Delta x$ and $\Delta y$ are defined by:

$$\Delta x = x_2 \times R_1/r_1 - x_1$$

$$\Delta y = y_2 \times R_2/r_2 - y_1$$

Data on a signal line 130 are inputted to the data converter 310 which determines $S(x_2, y_2)$ based on the 16 pixel binary data inputted from signal line 130 and weight coefficients $\alpha(\Delta x, \Delta y)$ of 4×4 pixels determined by $\Delta x$ and $\Delta y$. The 16 pixel binary data inputted from signal line 130 are multiplied by respective weight coefficients $\alpha(\Delta x, \Delta y)$ at a multiplexer 210. The weight coefficients are determined at a coefficient determining unit 230 in accordance with $\Delta x$ and $\Delta y$. The weight coefficients $\alpha$ may be those shown in FIG. 13 for example. The $\Delta x$ and $\Delta y$ are counted at the internal counter of the address controller 600 and inputted to signal lines 241 and 242. Instead of using $\Delta x$ and $\Delta y$, $x_4$ and $y_4$ obtained by the following equations may be inputted together with $r_1$ and $r_2$:

$$x_4 = mod(x_2 \times R_1, r_1)$$

$$y_4 = mod(y_2 \times R_2, r_2)$$

so that $\alpha x$ and $\Delta y$ can be determined by:

$$\Delta x = x_4/r_1$$

$$\Delta y = y_4/r_2$$

Figure 37:
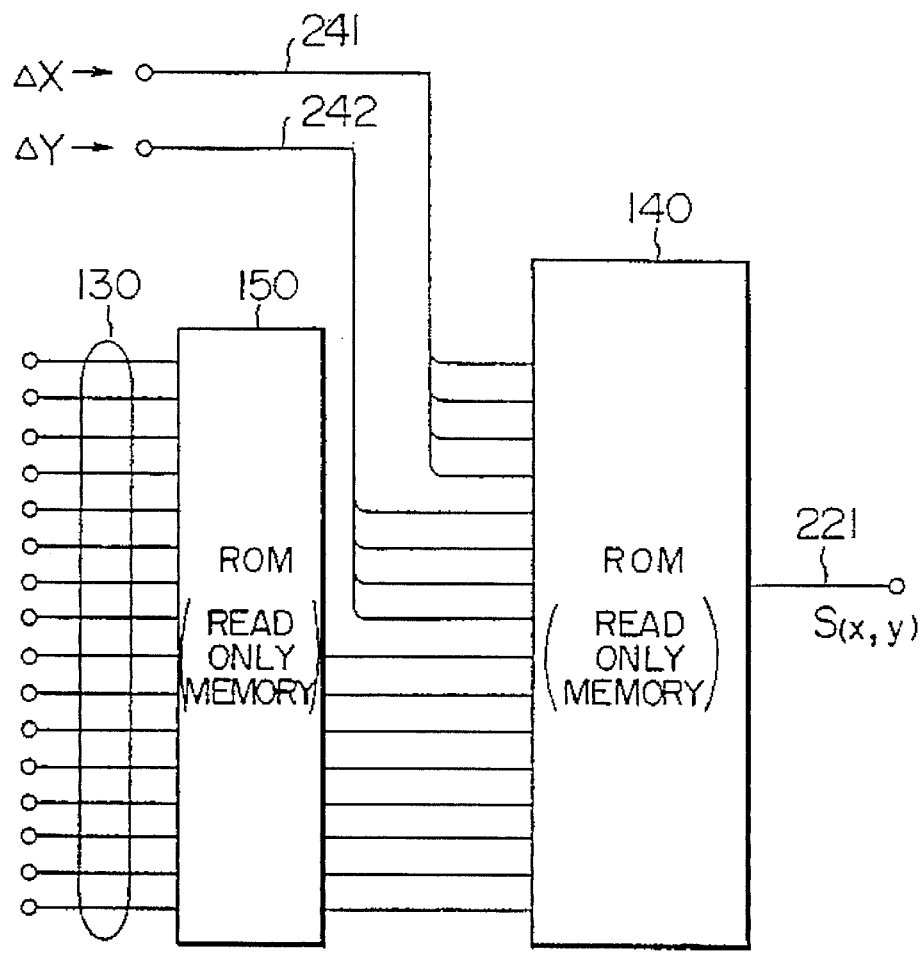
FIG. 37 is a block diagram showing an example of a simplified circuit arrangement for determining multivalued data.

The coefficient determining unit 230 may be realized generally by using a ROM. An adder 220 outputs an added multivalued data $S(x_2, y_2)$. Using signal lines 130, 241 and 242 as address lines, the data converter 310 may be realized using a single ROM, which is shown in the block diagram of FIG. 37. If the 16 pixel binary data lines are all used as address line, the capacity of a ROM constituting the data converter 310 becomes very large. Therefore, it is effective to reduce the number of such address lines by grouping them into several units. A data converter 150 shown in FIG. 37 is used for such purpose. A data converter 40 may be realized also by using a ROM whose address signals are supplied from an output of the converter 50 and from signal lines 241 and 242.

Figure 38:
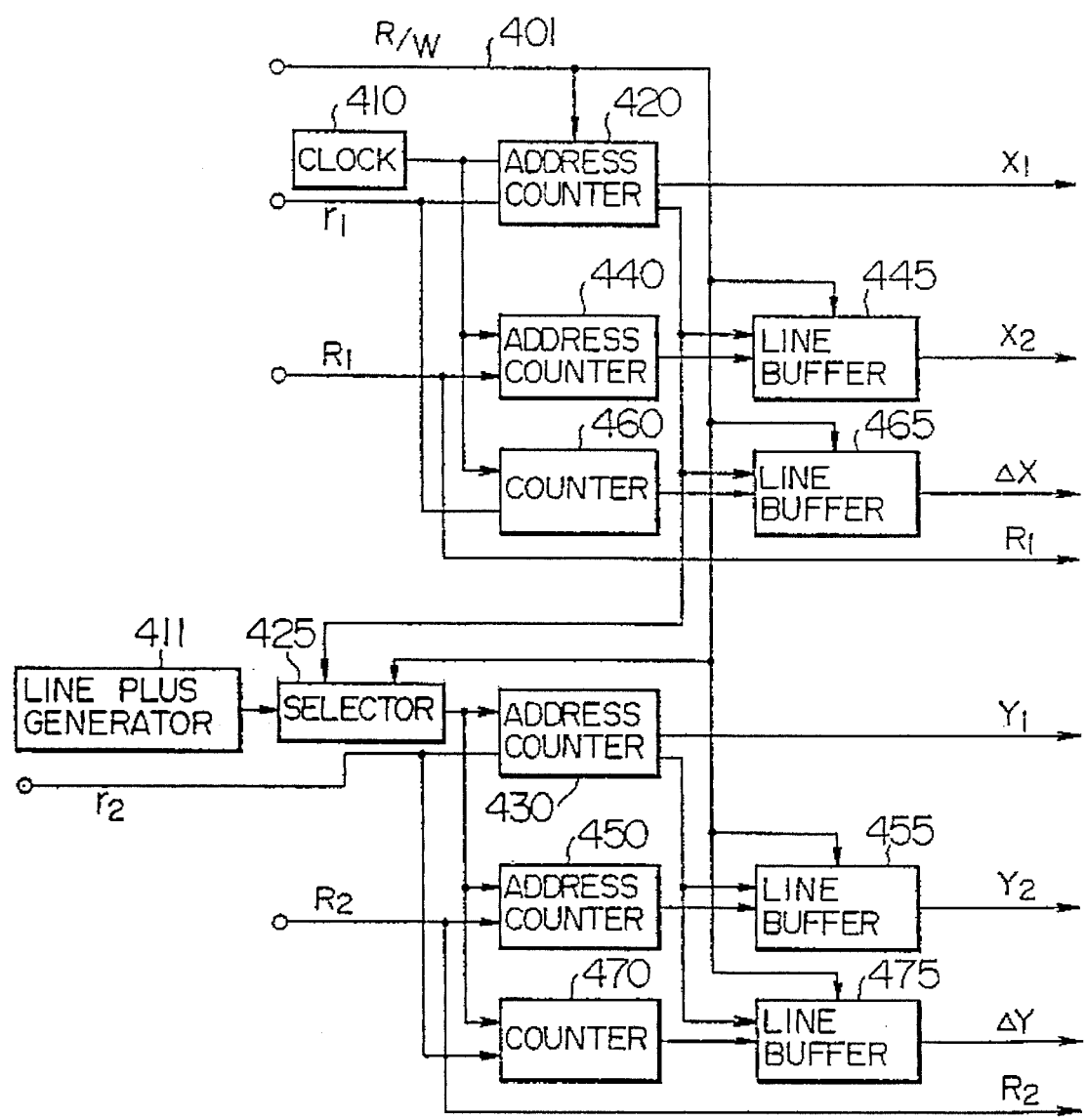
FIG. 38 is a block diagram showing an example of a circuit arrangement of the address controller for performing a high speed processing.

An example of the address controller 600 is shown in FIG. 17. Another example thereof will be described with reference to FIG. 38. In this example, there are provided two modes, one being a preparatory mode for determining $x_2$, $y_2$, $\Delta x$ and $\Delta y$, and the other being an image processing mode for actually processing an image. First, a signal indicating the preparatory mode is sent from a signal line 401. Then, a clock 410 outputs reference clocks for the time corresponding to one scan line. The outputs from an address counter 440 and a counter 460 are written in corresponding line buffers 445 and 465 every $R_1$-th reference clocks. At the same time, a line pulse generator 411 outputs line pulses for the time corresponding to scan lines of an image concerned. The outputs from an address counter 450 and a counter 470 are written in corresponding line buffers 455 and 475 every $R_2$-th line pulses. The line pulse generator 411 operates only in the preparatory mode so that the clock 410 may be used in place of the line pulse generator 411. Thereafter, the actual image processing mode starts when a signal indicating such effect is supplied from signal line 401. The overall circuit is then controlled by reference clocks outputted from the clock 410. Thus, an address counter 420 operates while reference clocks smaller in number than $R_1$ clocks are inputted thereto. The process can be carried out accordingly at higher speed without changing the frequency of reference clock. When an output of the address counter 420 changes, the line buffers 445, 455, 465 and 475 output corresponding $x_2$, $y_2$ $\Delta x$ and $\Delta y$ to the data converter 230. The addresses of data outputted from the line buffers 445 and 455 are controlled by the address counter 420, whereas the addresses of data outputted from the line buffers 465 and 475 are controlled by another address counter 430 which is caused to operate, in the image processing mode, each time the address counter 420 has operated for the time corresponding to one scan line. A selector selects as a line pulse one of the outputs from the address counter 420 and the line pulse generator 411, which selector is controlled by a signal from signal line 401.

Figure 40:
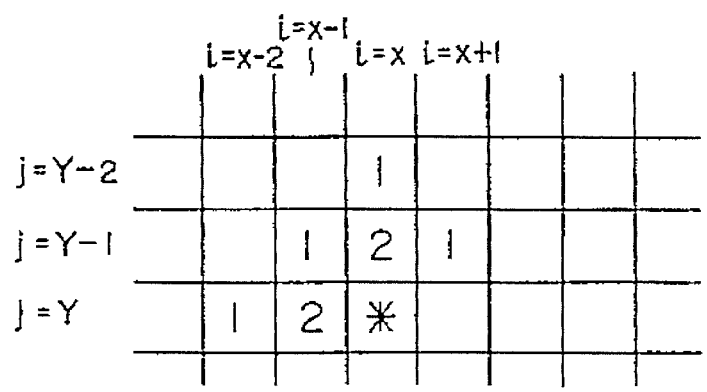
FIG. 40 shows an example of weight coefficients used for determining an error adjustment quantity.
Figure 39:
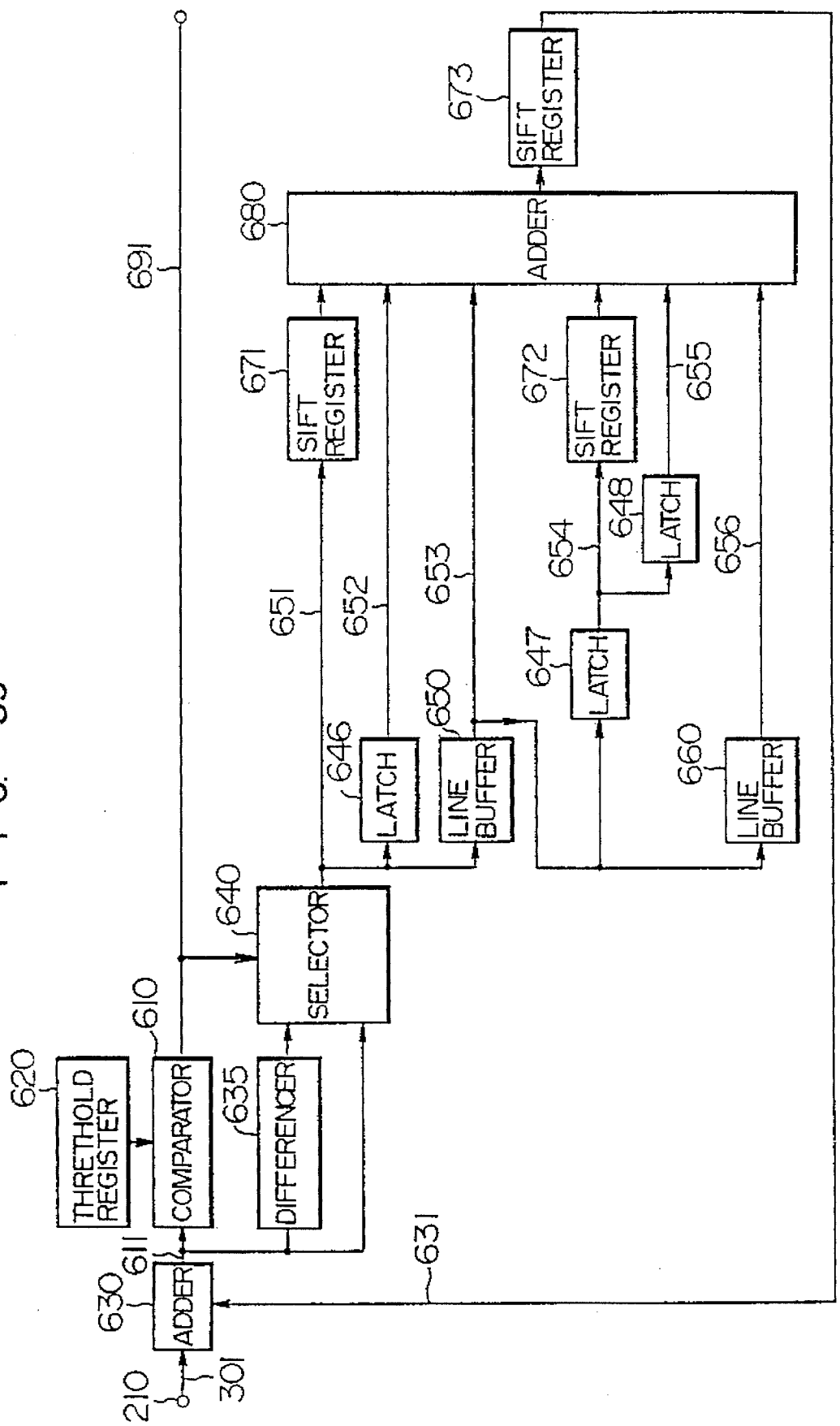
FIG. 39 is a block diagram showing an example of a circuit arrangement of the binarization unit.

Next, the operation of the re-binarization unit 420 will be described in detail. The re-binarization unit 420 executes a process of binarizing multivalued data and reproducing binary image data. The circuit arrangement thereof will be described in detail. First, a circuit arrangement realizing the above-mentioned first binarization process will be described with reference to FIG. 39. Multivalued data $S(x, y)$ are inputted via a signal line 301 to an adder 630. The adder 630 adds together $S(x, y)$ and multivalued data $E(x, y)$ calculated in the manner as will be described later to thereafter output multivalued data $F(x, y)$. The multivalued data $E(x, y)$ are inputted through a signal line 631. The multivalued data $F(x, y)$ are inputted via a signal line 611 to a comparator 610 and compared with a predetermined threshold value T. Binary data $Q(x, y)$ of a reproducing image are determined in accordance with the comparison result. The multivalued data $E(x, y)$ are the sum of errors $\epsilon$, generated during binarization of multivalued data F near a pixel at $(x, y)$, multiplied by predetermined weight coefficients $\beta$. An example of weight coefficients is shown in FIG. 40. An asterisk in FIG. 40 is a pixel to be binarized, and corresponds to a pixel at $(x, y)$. The multivalued data $E(x, y)$ are given by:

$$E(x, y)=\frac{1}{8}[(\epsilon(x-1, y-1)+\epsilon(x+1, y-1)+\epsilon(x-2, y)+\epsilon(x, y-2)+2\{\epsilon(x, y-1)+\epsilon(x-1, y)\}]$$

The error $\epsilon$ of each pixel is a difference between the multivalued data F and 0, or a difference between F and a maximum value of F. This error is obtained as in the following. When the adder 630 outputs a multivalued data $F(y_{2-1}, y_2)$ at coordinate $(x_{2-1}, y_2)$, this multivalued data is inputted to the comparator 610 as well as a differencer 635 and a selector 640. The differencer 635 sends a difference between $F(x_{2-1}, y_2)$ and a maximum value of multivalued data $S(x, y)$ to the selector 640. For instance, in this embodiment, the multivalued data $S(x, y)$ takes a value from 0 to 4 so that the maximum value is 4. Thus, the differencer 635 outputs $4-S(x_{2-1}, y_2)$. If $F(x_{2-1}, y_2)$ is larger than the maximum value, then the subtracter 635 outputs 0. As an error $\epsilon(x_{1-1}, y_1)$, the selector 640 outputs $F(x_{2-1}, y_2)$ or the maximum value $-F(x_{2-1}, y_2)$ in accordance with the following conditions:

$\epsilon(x, y)=F(x, y)$: $Q(x, y)=0$

Maximum value$-F(x, y)$: $Q(x, y)=1$

The outputted error $\epsilon(x_{2-1}, y_2)$ is sent via a signal line 651 to a line buffer 650 and the like. A process of obtaining $E(x, y)$ based on the error $\epsilon$ temporarily stored in the line buffer 650 is carried out by latches 646, 647 and 648 and shift registers 671 and 672. The operation of the circuit elements will be described taking as an example the case where $Q(x, y)$ is obtained. At the time when the binarized data $Q(x-1, y)$ is determined by the binarization process, an error $\epsilon(x-1, y)$ is outputted from the selector 640 to a signal line 651, errors $\epsilon(x-2, y)$, $\epsilon(x, y-1)$ and $\epsilon(x-1, y-1)$ from the latches 646, 647 and 648 to signal lines 652, 654 and 655, and errors $\epsilon(x+1, y-1)$ and $\epsilon(x, y-2)$ from the line buffers 650 and 660 to signal lines 653 and 656. The errors $\epsilon(x-1, y)$ and $\epsilon(x, y-1)$ on signal lines 651 and 654 are inputted to shift registers 671 and 672 which output $2\times\epsilon(x-1, y)$ and $2\times\epsilon(x, y-1)$. An adder 680 adds together six errors to output $8\times E(x, y)$ which is sent to a shift register 673. The shift register 673 shifts the inputted data to thus obtain $E(x, y)$. The obtained $E(x, y)$ is inputted via a signal line 631 to the adder 630. If $x=1$ or $y=1$, a part of errors necessary for obtaining $E(x, y)$ is not present. In such a case, the values previously stored in the line buffers 650 and 660 are used to determine $E(x, y)$.

With the above first binarization process, since a fixed threshold value is used, even an image with high periodicity nature can be reduced in size and converted into an image of high quality and without moire.

Figure 41:
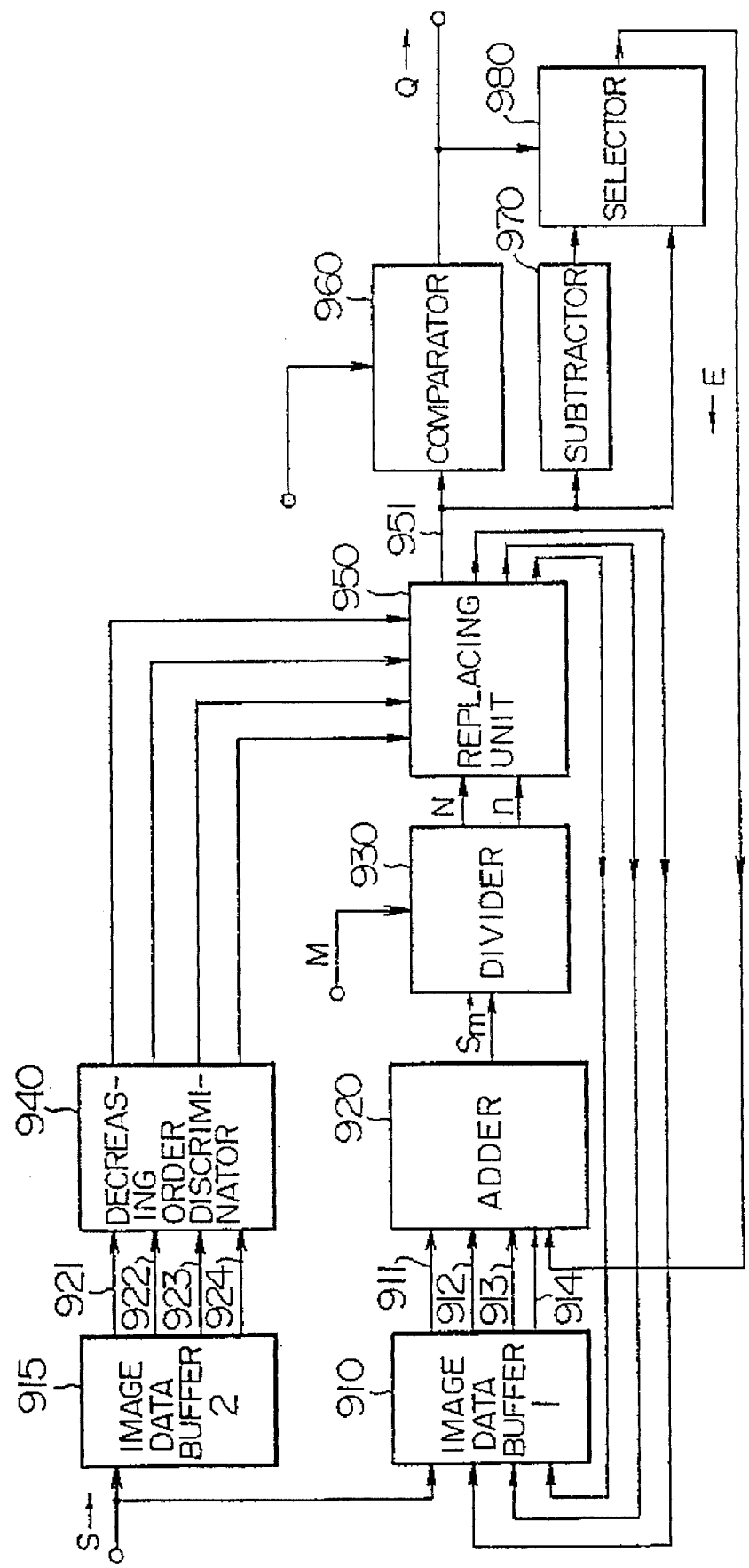
FIG. 41 is a block diagram showing another example of a circuit arrangement of the binarization unit.

Next, the second binarization process will be described which is realized by the block diagram shown in FIG. 41. Multivalued data $S(x, y)$ are temporarily stored in a first image data buffer 910 and second image data buffer 915 which each have a capacity of storing two scan line data. The first image data buffer is constructed of a combination of line buffer and latch for example. The variable of the line buffer and the number of latch stages are determined based on the number of pixels to be referred to at a time. The number of pixels to be referred to is arbitrary. In this embodiment, it is assumed that 2×2 pixels are referred to. The second image data buffer 915 holds the inputted multivalued data, whereas the data in the first image data buffer 910 are sequentially replaced with new data. The result after replacements of m times is represented hereinafter by Sm. By the time when $S(x_5, y_5)$ is inputted from a signal line 201, multivalued data $S_3(x_{5-1}, y_{5-1})$, $S_2(x_5, y_{5-1})$, $S_1(x_{5-1}, y_5)$ and $S(x_5, y_5)$ have already been stored in the first image data buffer 910 at coordinates $(x_{5-1}, y_{5-1})$, $(x_5, y_{5-1})$, $(x_{5-1}, y_5)$ and $(x_5, y_5)$. The multivalued data $S_3(x_{5-1}, y_{5-1})$, $S_2(x_5, y_{5-1})$, $S_1(x_{5-1}, y_5)$ and $S(x_5, y_5)$ are sent via signal lines 911 to 914 to an adder 920. The adder 920 adds together the four multivalued data and error correction amount E inputted from a signal line 990 to thus output multivalued data $Sm(x_{5-1}, y_{5-1})$ which are then subjected to division by a divider 930 to obtain an integer N and a remainder n as shown by the following equation:

$$Sm(x_{5-1}, y_{5-1})N \times M+n$$

where M is a predetermined constant which ordinarily takes a maximum value of multivalued data $S(x, y)$. On the other hand, the second image data buffer 915 sends multivalued data $S_4(x_{5-1}, y_{5-1})$, $S_3(x_5, y_{5-1})$, $S_2(x_{5-1}, y_5)$ and $S_1(x_5, y_5)$ via signal lines 921 to 924 to a decreasing order discriminator 940 which determines the order of the inputted four multivalued data starting from the largest density. The discrimination result by the decreasing order discriminator 940 and the outputs N and n from the divider 930 are supplied to a replacing unit 950. Based on the decreasing order discriminated by the discriminator 940, the replacing unit 950 gives a value M to N pixels, n to (N+1)-th pixel and 0 to the remaining pixels. As a result, the multivalued data $S_3(x_{5-1}, y_{5-1})$, $S_2(x_5, y_{5-1})$, $S_1(x_{5-1}, y_5)$ and $S(x_5, y_5)$ are replaced respectively by $S_4(x_{5-1}, y_{5-1})$, $S_3(x_5, y_{5-1})$, $S_2(x_{5-1}, y_5)$ and $S_1(x_5, y_5)$. The multivalued data $S_3(x_5, y_{5-1})$, $S_2(x_{5-1}, y_5)$ and $S_1(x_5, y_5)$ are left in the first image data buffer 910 since they are again subjected to the succeeding replacement process. However, the multivalued data $S_4(x_{5-1}, y_{5-1})$ is not remained stored in the first image data buffer 915 but sent to a comparator 960 since the pixel at coordinate $(x_{5-1}, y_{5-1})$ is not referred to in the succeeding replacement process. The comparator 960 compares $S_4(x_{5-1}, y_{5-1})$ with a predetermined threshold value T to thus determine a binary data $Q(x_{5-1}, y_{5-1})$. With $S_4(x_{5-1}, y_{5-1})$ taking a value n, an error during binarization will occur. Therefore, similar to the first binarization process, the error is referred to at the succeeding binarization process. The multivalued data $S_4(x_{5-1}, y_{5-1})$ is supplied to the comparator 960 as well as a subtracter 970 and a selector 980. The subtracter 970 sends a difference $G(x_{5-1}, y_{5-1})$ between $S_4(x_{5-1}, y_{5-1})$ and T to the selector 980. The selector selects $S_4(x_{5-1}, y_{5-1})$ or $G(x_{5-1}, y_{5-1})$ based on the binary data $Q(x_{5-1}, y_{5-1})$ to output the error correction amount E in accordance with the following conditions:

$E = S_4(x, y)$: $Q(x, y) = 0$ $G(x, y)$: $Q(x, y) = 1$

The obtained E is an error correction amount to be added to $Sm(x_5, y_{5-1})$ which is the sum of multivalued data used for determining the next binary data $Q(x_5, y_{5-1})$.

As described so far, according to the present invention, various binarization processes are applicable to multivalued data. Therefore, the system structure has a large degree of freedom, and a processing apparatus suitable for particular output devices including CRTs, printers and the like can be realized.

The processing apparatus as described above can obtain a reproduced image of high quality with relatively simple circuit arrangement.

What is claimed is:

1. An image processing system for processing a digital binary image, comprising:

image memory means for temporarily storing first binary image data;

determining means for determining, on the basis of the first binary image data stored in said image memory means, one of a line image area and a pseudo gray scale image area to which a point to be processed of the image belongs;

means for scanning, when it is determined by said determining means that said point to be processed belongs to the pseudo gray scale image area, said first binary image data in said image memory means with a first scan window of m1×n1 pixel where is m1×n1 is greater than 1, on an arbitrary coordinate system;

means for converting said first binary image data of m1×n1 pixels scanned with said first scan window into multivalued gray scale image data;

means for scanning, when it is determined by said determining means that said point to be processed belongs to the line image area, said first binary image data in said image memory means with a second scan window of m2×n2 pixel where m2×n2 is greater than 1, on a arbitrary coordinate system; and means for converting said first binary image data of m2×n2 pixels scanned with said second scan window into second binary image data.

2. An image processing system according to claim 1, further comprising means for controlling independently the operation timing of said means for scanning said original image data P in said image memory means with a scan window of $m_1 \times n_1$ pixels where $m_1 \times n_1$ is greater than 1 and $n_1$ is 1 or larger, using an arbitrary coordinate system, and the operation timing of said means for determining multivalued gray scale image data Sp based on the binary image data of $m_1 \times n_1$ within said scan window.

3. An image processing system according to claim 2, wherein said means for independently controlling the operation timing of said scan window and the operation timing of outputting said multivalued gray scale image data Sp comprises means for detecting small value portions $\Delta x$ and $\Delta y$ of relative positions of said scan window to pixels within said scan window at the time of outputting said multivalued gray scale image data Sp; and said means for determining said multivalued gray scale image data Sp comprises means for multiplying binary data of respective pixels within said scan window by associated weight coefficients corresponding to said outputs $\Delta x$ and $\Delta y$ from said detection means, and means for adding together said multiplied results.

4. An image processing apparatus for processing a digital, binary image comprising:

image memory means for temporarily storing binary image data P of an original image;

means for scanning said binary image data P in said image memory means with a scan window of M1 pixels ($M_1 > 1$);

means for determining multivalued data S based on said binary image data of M1 pixels within said scan window; and means for binarizing said multivalued data S;

wherein said means for binarizing said multivalued data S comprises:

means for adding an error adjustment quantity E to said multivalued data S to obtain multivalued data F, and means for comparing said multivalued data F with a predetermined value C and outputting binary data Q which are given by:

if F>C, then Q=1 if F<C, then Q=0 and wherein said error adjustment quantity E is the sum of values of, rounding errors $\epsilon$ generated during binarization of neighboring pixels within a predetermined region, multiplied by predetermined coefficients.

5. An image processing apparatus according to claim 4, wherein said means for determining said binary data Q from said multivalued data S comprises:

first and second image memory means for storing said multivalued data S;

means for scanning said first memory means with a first scan window of $M_2$ pixels and obtaining the sum Sm of said multivalued data S within said scan window;

means for obtaining a sum F of said Sm and said error adjustment quantity E;

means for calculating an integer N by an equation F=C× N+n using a predetermined value C and said sum F;

means for scanning said second image memory means with a second scan window in synchro with scanning of said first image memory means with said first scan window;

means for adding a predetermined adjustment value to respective multivalued data of $M_2$ pixels within said scan window and assigning a number to each of the resultant multivalued data in ascending number or descending number order;

means for replacing, in accordance with said number, the resultant multivalued data of N pixels in said first image memory means within said first scan window by said C, the resultant multivalued data of (N+1)-th number pixel by said n, and the remaining resultant multivalued data by 0; and means for repeating the above operation to perform said replacement process $M_2$ times for each pixel, and determining said binary data Q and an error adjustment quantity $E_2$ which is to be added at the following pixel binarization process, by using multivalued data Sx in said first image storage means corresponding to pixels subjected to $M_2$ time replacements, said binary data Q and said quantity $E_2$ being given by:

if $Sx \geq V$, then Q=1 and $E_1$=C-Sx if $Sx < V$, then Q=0 and $E_1$=Sx where V is a predetermined value.

* * * * *